United States Patent
Ashworth et al.

(10) Patent No.: US 11,095,359 B2
(45) Date of Patent: *Aug. 17, 2021

(54) MULTIPLE ANTENNA REPEATER ARCHITECTURE

(71) Applicant: Wilson Electronics, LLC, St. George, UT (US)

(72) Inventors: Christopher Ken Ashworth, Toquerville, UT (US); Michael James Mouser, Wylie, TX (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/888,609

(22) Filed: May 29, 2020

(65) Prior Publication Data
US 2020/0295818 A1  Sep. 17, 2020

Related U.S. Application Data

(63) Continuation of application No. 16/288,695, filed on Feb. 28, 2019, now Pat. No. 10,673,517, which is a
(Continued)

(51) Int. Cl.
*H04B 7/155* (2006.01)
*G06F 1/16* (2006.01)
(Continued)

(52) U.S. Cl.
CPC .......... *H04B 7/155* (2013.01); *G06F 1/1635* (2013.01); *G06F 1/1683* (2013.01); *H04B 1/18* (2013.01); *H04B 7/04* (2013.01)

(58) Field of Classification Search
CPC . H04B 7/155; H04B 1/18; H04B 7/04; H04B 7/15535; H04B 7/15571; G06F 1/1635; G06F 1/1683
See application file for complete search history.

(56) References Cited

U.S. PATENT DOCUMENTS

| 4,776,032 A | 10/1988 | Odate et al. |
| 5,303,395 A | 4/1994 | Dayani |

(Continued)

FOREIGN PATENT DOCUMENTS

| EP | 1525678 | 7/2008 |
| KR | 101488743 B1 | 2/2015 |
| WO | WO 2005025078 A2 | 3/2005 |

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.
(Continued)

*Primary Examiner* — Dominic E Rego
(74) *Attorney, Agent, or Firm* — Thorpe North & Western

(57) ABSTRACT

Technology for a desktop signal booster is disclosed. The desktop signal booster can include a cellular signal amplifier, an integrated device antenna coupled to the cellular signal amplifier, an integrated node antenna coupled to the cellular signal amplifier, and wireless charging circuitry. The cellular signal amplifier can be configured to amplify signals for a wireless device, and the wireless device can be within a selected distance from the desktop signal booster. The integrated device antenna can be configured to transmit signals from the cellular signal amplifier to the wireless device. The integrated node antenna can be configured to transmit signals from the cellular signal amplifier to a base station. The wireless charging circuitry can be configured to wirelessly charge the wireless device when the wireless device is placed in proximity to the desktop signal booster.

30 Claims, 30 Drawing Sheets

Related U.S. Application Data continuation-in-part of application No. 15/814,223, filed on Nov. 15, 2017, now Pat. No. 10,348,392.

(60) Provisional application No. 62/422,505, filed on Nov. 15, 2016.

(51) Int. Cl.
*H04B 1/18* (2006.01)
*H04B 7/04* (2017.01)

(56) References Cited

U.S. PATENT DOCUMENTS

| | | | |
|---|---|---|---|
| 5,737,687 A | 4/1998 | Martin | |
| 5,777,530 A | 7/1998 | Nakatuka | |
| 5,835,848 A | 11/1998 | Bi | |
| 5,937,332 A | 8/1999 | Karabinis | |
| 6,005,884 A | 12/1999 | Cook | |
| 6,671,502 B1 | 12/2003 | Ogawa | |
| 6,711,388 B1 | 3/2004 | Neitiniemi | |
| 6,889,033 B2 | 5/2005 | Bongfeldt | |
| 6,990,313 B1 | 1/2006 | Yarkosky | |
| 6,993,287 B2 | 1/2006 | O'Neill | |
| 7,035,587 B1 | 4/2006 | Yarkosky | |
| 7,221,967 B2 | 5/2007 | Van Buren et al. | |
| 7,408,898 B1 | 8/2008 | Brown | |
| 7,684,838 B2 | 3/2010 | Wilson | |
| 7,974,573 B2 | 7/2011 | Dean | |
| 8,559,869 B2 | 10/2013 | Ash, Jr. et al. | |
| 8,583,033 B2 | 11/2013 | Ashworth et al. | |
| 8,867,572 B1 | 10/2014 | Zhan | |
| 9,048,940 B2 | 6/2015 | Wilhite | |
| 9,832,295 B2 | 11/2017 | Ash, Jr. et al. | |
| 2002/0044594 A1 | 4/2002 | Bongfeldt | |
| 2002/0072339 A1 | 6/2002 | Hamalainen | |
| 2003/0081694 A1 | 5/2003 | Wieck | |
| 2003/0123401 A1 | 7/2003 | Dean | |
| 2003/0236067 A1 | 12/2003 | Hasarchi et al. | |
| 2004/0087334 A1 | 5/2004 | Nishiyama | |
| 2004/0137854 A1 | 7/2004 | Ge | |
| 2004/0146013 A1 | 7/2004 | Song et al. | |
| 2004/0157551 A1 | 8/2004 | Gainey et al. | |
| 2004/0166802 A1 | 8/2004 | McKay, Sr. et al. | |
| 2004/0204105 A1* | 10/2004 | Liang | H04B 7/0808 455/562.1 |
| 2004/0219876 A1 | 11/2004 | Baker et al. | |
| 2004/0235417 A1 | 11/2004 | Dean | |
| 2005/0118949 A1 | 6/2005 | Allen et al. | |
| 2005/0215204 A1 | 9/2005 | Wallace et al. | |
| 2005/0227619 A1 | 10/2005 | Lee et al. | |
| 2006/0019603 A1 | 1/2006 | Pergal | |
| 2006/0058029 A1 | 3/2006 | Lee et al. | |
| 2006/0084379 A1 | 4/2006 | O'Neill | |
| 2006/0148401 A1 | 7/2006 | Roper et al. | |
| 2006/0172781 A1 | 8/2006 | Mohebbi | |
| 2006/0205342 A1 | 9/2006 | McKay et al. | |
| 2007/0001766 A1 | 1/2007 | Ripley | |
| 2007/0071128 A1 | 3/2007 | Meir et al. | |
| 2007/0188235 A1 | 8/2007 | Dean | |
| 2007/0197207 A1 | 8/2007 | Carstens et al. | |
| 2007/0247376 A1 | 10/2007 | Kim et al. | |
| 2007/0291668 A1 | 12/2007 | Duan | |
| 2008/0081555 A1 | 4/2008 | Kong et al. | |
| 2008/0096483 A1 | 4/2008 | Van Buren et al. | |
| 2008/0161076 A1 | 7/2008 | Min et al. | |
| 2008/0278237 A1 | 11/2008 | Blin | |
| 2009/0131131 A1 | 5/2009 | Wilson | |
| 2009/0181735 A1 | 7/2009 | Griffin, Jr. et al. | |
| 2009/0201201 A1 | 8/2009 | Foster | |
| 2009/0207776 A1 | 8/2009 | Baik et al. | |
| 2009/0270027 A1 | 10/2009 | O'Neill | |
| 2010/0234071 A1 | 9/2010 | Shabtay et al. | |
| 2010/0321114 A1 | 12/2010 | Okada et al. | |
| 2011/0151775 A1 | 6/2011 | Kang et al. | |
| 2011/0312269 A1 | 12/2011 | Judd et al. | |
| 2012/0013296 A1 | 1/2012 | Heydari et al. | |
| 2012/0027054 A1 | 2/2012 | Palanki et al. | |
| 2012/0309293 A1* | 12/2012 | Kummetz | H04B 7/2606 455/11.1 |
| 2013/0121505 A1 | 5/2013 | Duraiswami et al. | |
| 2013/0149957 A1 | 6/2013 | Desclos et al. | |
| 2013/0157720 A1 | 6/2013 | Schiff | |
| 2013/0195467 A1 | 8/2013 | Schmid et al. | |
| 2014/0015642 A1 | 1/2014 | White | |
| 2014/0065949 A1 | 3/2014 | Wilhite | |
| 2014/0176635 A1 | 6/2014 | Portela Mata et al. | |
| 2014/0266424 A1 | 9/2014 | Ashworth et al. | |
| 2014/0273816 A1 | 9/2014 | Ashworth et al. | |
| 2014/0370887 A1 | 12/2014 | Wyler | |
| 2015/0009889 A1 | 1/2015 | Zhan | |
| 2015/0011157 A1 | 1/2015 | Terry | |
| 2015/0214904 A1 | 7/2015 | Lozhkin | |
| 2016/0126625 A1 | 5/2016 | Gurewitz | |
| 2016/0141908 A1 | 5/2016 | Jakl et al. | |
| 2016/0181984 A1 | 6/2016 | Petrucelli et al. | |
| 2016/0198347 A1 | 7/2016 | Zhan | |
| 2016/0308276 A1 | 10/2016 | Chang et al. | |
| 2016/0315653 A1 | 10/2016 | Saji et al. | |
| 2017/0055215 A1 | 2/2017 | Cook et al. | |
| 2017/0055231 A1 | 2/2017 | Cook et al. | |
| 2017/0077592 A1 | 3/2017 | Tsai et al. | |
| 2017/0093374 A1 | 3/2017 | Yatsenko et al. | |
| 2017/0094608 A1 | 3/2017 | Langer et al. | |
| 2017/0206329 A1 | 7/2017 | Capocasale et al. | |
| 2018/0041234 A1 | 2/2018 | Klopfer et al. | |

OTHER PUBLICATIONS

ADL5513; "1 MHz to 4 GHz, 80 dB Logarithmic Detector/Controller"; Data Sheet; (2008); 12 pages; Analog Devices, Inc.
HMC713LP3E; "54 dB, Logarithmic Detector / Controller, 50-8000 MHz"; Data Sheet; (2010); 12 pages.
HMC909LP4E; "RMS Power Detector Single-Ended, DC—5.8 GHz"; Data Sheet; (2010); 21 pages.
PIC16F873; "28/40-Pin 8-Bit CMOS FLASH Microcontrollers"; (2001); Data Sheet; 218 pages.

\* cited by examiner

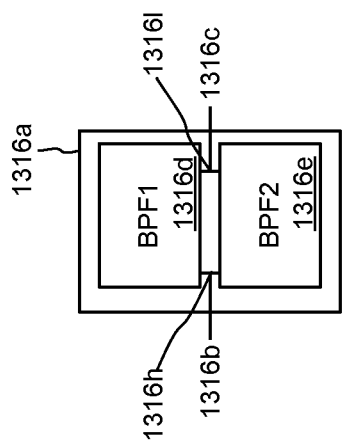
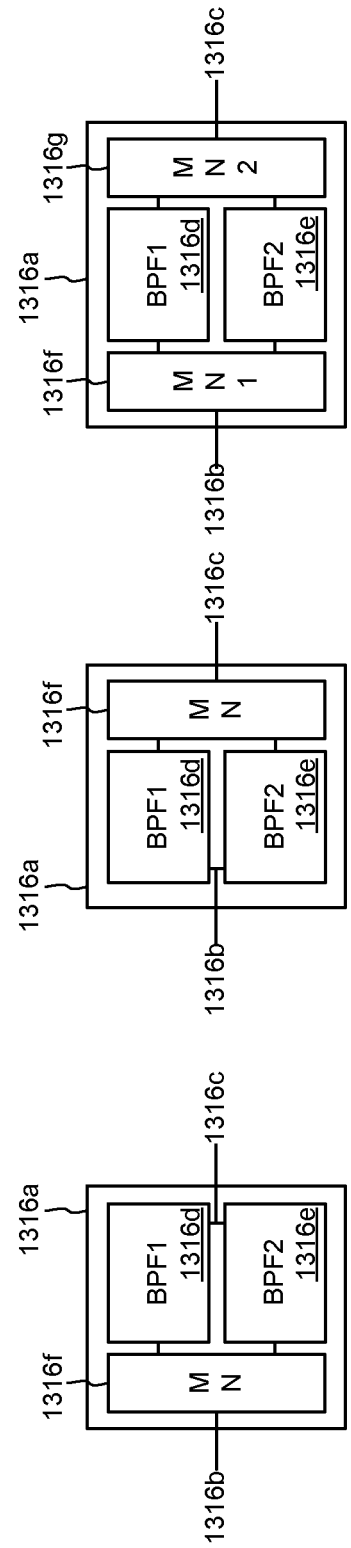

MULTIPLE ANTENNA REPEATER ARCHITECTURE

RELATED APPLICATIONS

The present application is a continuation of U.S. patent application Ser. No. 16/288,695, filed Feb. 28, 2019 with a docket number of 3969-108.NP.US.CIP which is a continuation-in-part of U.S. patent application Ser. No. 15/814,223, filed Nov. 15, 2017 with a docket number of 3969-108.NP.US, which claims the benefit of U.S. Provisional Patent Application No. 62/422,505, filed Nov. 15, 2016 with a docket number of 3969-108.PROV.US, the entire specification of which is hereby incorporated by reference in its entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIGS. 13f to 13i illustrate multi-filter packages in accordance with an example;

FIG. 13l illustrates a multiband repeater with a receive diversity antenna port in accordance with an example;

Figure 1:
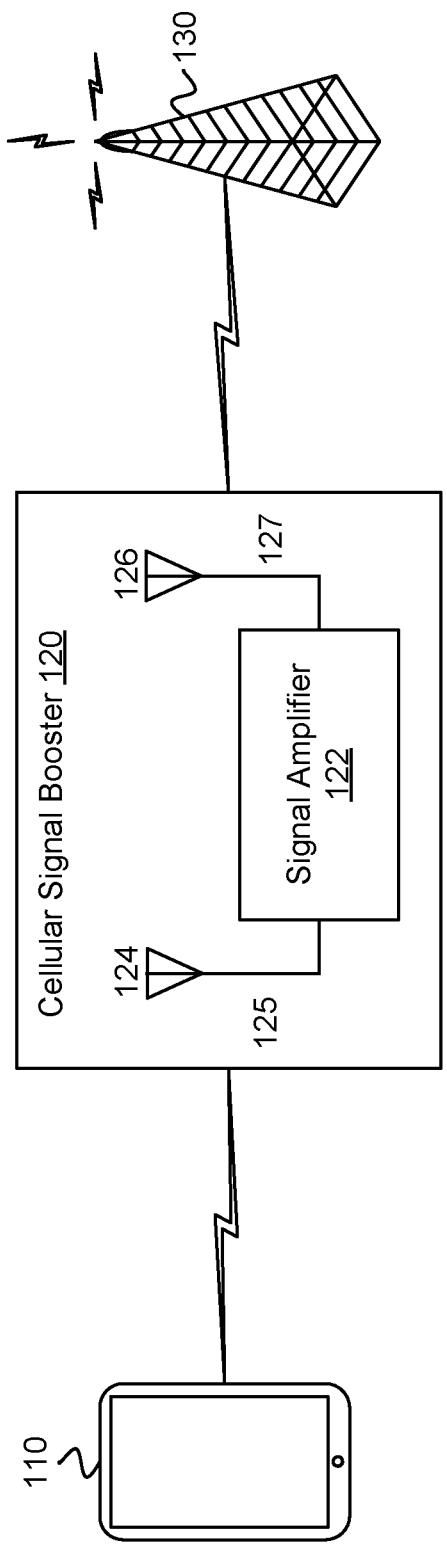
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21. It should be noted that these FCC regulations apply to FCC-compatible consumer repeaters and may not be applicable to a user equipment (UE) in communication with an FCC-compatible consumer repeater. While a repeater that is compatible with FCC regulations is provided as an example, it is not intended to be limiting. The repeater can be configured to be compatible with other governmental regulations based on the location where the repeater is configured to operate.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, 13, 14, 15, or 16 standards or Institute of Electronics and Electrical Engineers (IEEE) 802.16. In one configuration, the signal booster 120 can boost signals for 3GPP LTE Release 16.0.0 (January 2019) or other desired releases. The signal booster 120 can boost signals from the 3GPP Technical Specification 36.101 (Release 16 Jan. 2019) bands or LTE frequency bands. For example, the signal booster 120 can boost signals from the LTE frequency bands: 2, 4, 5, 12, 13, 17, 25, 26, and 71. In addition, the signal booster 120 can boost selected frequency bands based on the country or region in which the signal booster is used, including any of 3GPP LTE frequency bands 1 through 85, 3GPP 5G frequency bands 1 through 86, 3GPP 5G frequency bands 257 through 261, or other frequency bands, as disclosed in 3GPP TS 36.104 V16.0.0 (January 2019) or 3GPP TS 38.104 v15.4.0 (January 2019). In addition, the signal booster 120 can boost time division duplexing (TDD) and/or frequency division duplexing (FDD) signals.

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 100 and transmit DL signals to the wireless device 100 using a single antenna. Alternatively, the integrated device antenna 124 can receive UL signals from the wireless device 100 using a dedicated UL antenna, and the integrated device antenna 124 can transmit DL signals to the wireless device 100 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the integrated node antenna 126 can communicate over Very High Frequency (VHF) communications directly with integrated node antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, 5.9 GHz, or 6.1 GHz. This configuration can allow data to pass at high rates between multiple wireless devices with signal boosters. This configuration can also allow users to send text messages, initiate phone calls, and engage in video communications between wireless devices with signal boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other signal boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, 5.9 GHz, or 6.1 GHz.

Figure 2:
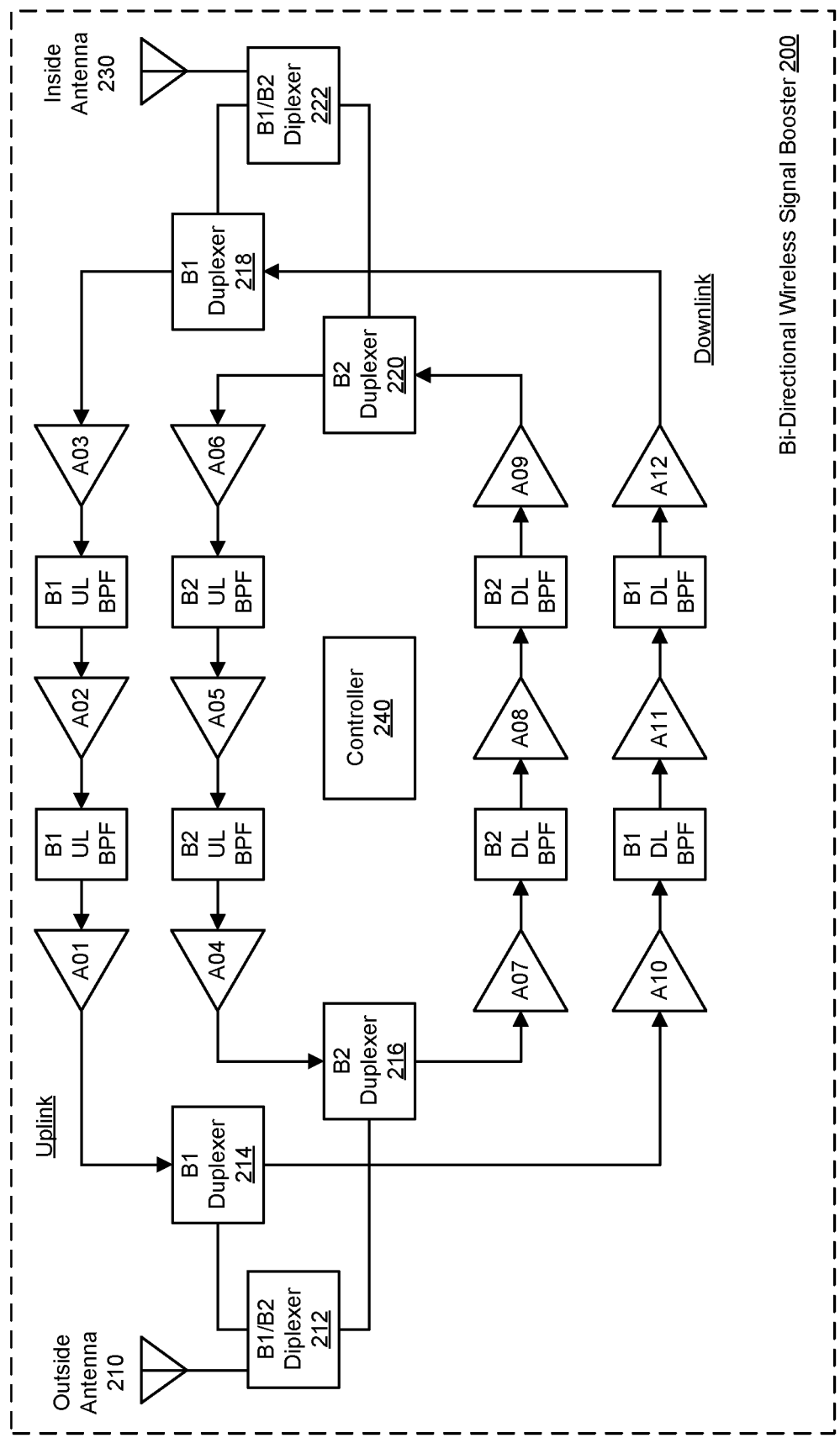
FIG. 2 illustrates a cellular signal booster configured to amplify uplink (UL) and downlink (DL) signals using one or more downlink signal paths and one or more uplink signal paths in accordance with an example.

FIG. 2 illustrates an exemplary bi-directional wireless signal booster 200 configured to amplify uplink (UL) and downlink (DL) signals using a separate signal path for each UL frequency band and DL frequency band and a controller 240. An outside antenna 210, or an integrated node antenna, can receive a downlink signal. For example, the downlink signal can be received from a base station (not shown). The downlink signal can be provided to a first B1/B2 diplexer 212, wherein B1 represents a first frequency band and B2 represents a second frequency band. The first B1/B2 diplexer 212 can create a B1 downlink signal path and a B2 downlink signal path. Therefore, a downlink signal that is associated with B1 can travel along the B1 downlink signal path to a first B1 duplexer 214, or a downlink signal that is associated with B2 can travel along the B2 downlink signal path to a first B2 duplexer 216. After passing the first B1 duplexer 214, the downlink signal can travel through a series of amplifiers (e.g., A10, A11 and A12) and downlink band pass filters (BPF) to a second B1 duplexer 218. Alternatively, after passing the first B2 duplexer 216, the downlink can travel through a series of amplifiers (e.g., A07, A08 and A09) and downlink band pass filters (BFF) to a second B2 duplexer 220. At this point, the downlink signal (B1 or B2) has been amplified and filtered in accordance with the type of amplifiers and BPFs included in the bi-directional wireless signal booster 200. The downlink signals from the second B1 duplexer 218 or the second B2 duplexer 220, respectively, can be provided to a second B1/B2 diplexer 222. The second B1/B2 diplexer 222 can provide an amplified downlink signal to an inside antenna 230, or an integrated device antenna. The inside antenna 230 can communicate the amplified downlink signal to a wireless device (not shown), such as a mobile phone.

In one example, the inside antenna 230 can receive an uplink (UL) signal from the wireless device. The uplink signal can be provided to the second B1/B2 diplexer 222. The second B1/B2 diplexer 222 can create a B1 uplink signal path and a B2 uplink signal path. Therefore, an uplink signal that is associated with B1 can travel along the B1 uplink signal path to the second B1 duplexer 218, or an uplink signal that is associated with B2 can travel along the B2 uplink signal path to the second B2 duplexer 222. After passing the second B1 duplexer 218, the uplink signal can travel through a series of amplifiers (e.g., A01, A02 and A03) and uplink band pass filters (BPF) to the first B1 duplexer 214. Alternatively, after passing the second B2 duplexer 220, the uplink signal can travel through a series of amplifiers (e.g., A04, A05 and A06) and uplink band pass filters (BPF) to the first B2 duplexer 216. At this point, the uplink signal (B1 or B2) has been amplified and filtered in accordance with the type of amplifiers and BFFs included in the bi-directional wireless signal booster 200. The uplink signals from the first B1 duplexer 214 or the first B2 duplexer 216, respectively, can be provided to the first B1/B2 diplexer 212. The first B1/B2 diplexer 212 can provide an amplified uplink signal to the outside antenna 210. The outside antenna can communicate the amplified uplink signal to the base station.

In one example, the bi-directional wireless signal booster 200 can be a 6-band booster. In other words, the bi-directional wireless signal booster 200 can perform amplification and filtering for downlink and uplink signals having a frequency in bands B1, B2, B3 B4, B5 and/or B6.

In one example, the bi-directional wireless signal booster 200 can use the duplexers to separate the uplink and downlink frequency bands, which are then amplified and filtered separately. A multiple-band cellular signal booster can typically have dedicated radio frequency (RF) amplifiers (gain blocks), RF detectors, variable RF attenuators and RF filters for each uplink and downlink band.

Figure 3:
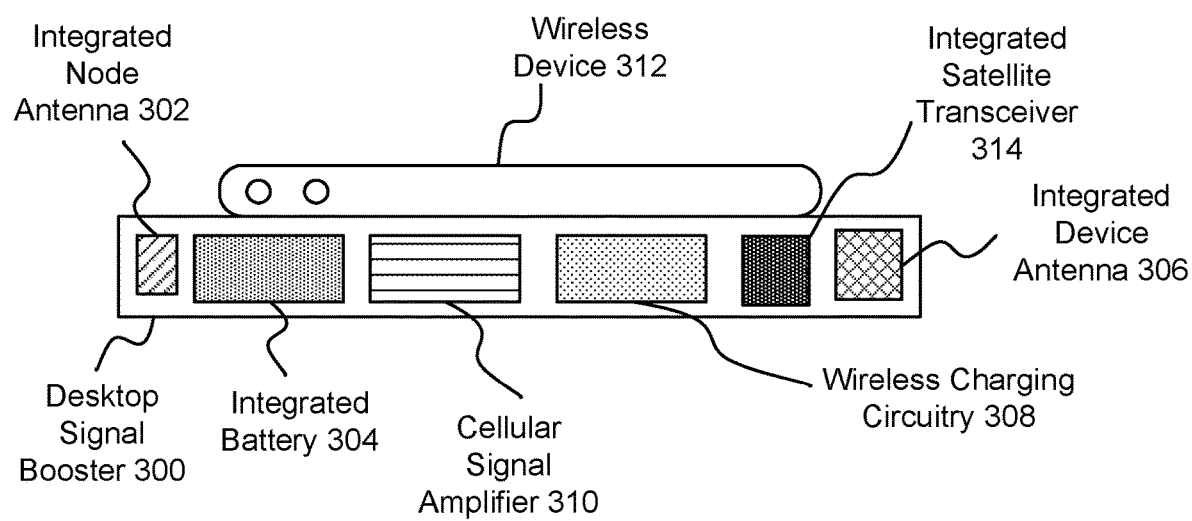
FIG. 3 illustrates a desktop signal booster in accordance with an example.

FIG. 3 illustrates an exemplary configuration of a desktop signal booster 300. The desktop signal booster 300 can include a cellular signal amplifier 310, and the cellular signal amplifier 310 can be configured to amplify signals for a wireless device 312 in proximity to the desktop signal booster 300. For example, the wireless device 312 can be physically coupled to the desktop signal booster 300, the wireless device 312 can be less than 5 centimeters (cm) from the desktop signal booster 300, the wireless device 312 can be less than 20 cm from the desktop signal booster 300, the wireless device 312 can be less than 1 meter from the desktop signal booster 300, etc. The cellular signal amplifier 310 can amplify downlink signals received from a base station (not shown), and then forward the amplified downlink signals to the wireless device 312. Similarly, the cellular signal amplifier 310 can amplify uplink signals received from the wireless device 312, and then forward the amplified uplink signals to the base station. In one example, the cellular signal amplifier 310 can provide up to a 6 decibel (dB) improvement to the signal. In addition, the desktop signal booster 300 can include an integrated satellite transceiver 314 that can communicate signals to one or more satellites.

In one example, the desktop signal booster 300 can include an integrated node antenna 302 for transmitting signals to the base station and receiving signals from the base station. The desktop signal booster 300 can include an integrated battery 304 to provide power to the cellular signal amplifier 310 and/or the wireless device 312, thereby enabling unplugged operation of the desktop signal booster 300. The desktop signal booster 300 can include an integrated device antenna 306 for transmitting signals to the wireless device 312 and receiving signals from the wireless device 312. The desktop signal booster 300 can include wireless charging circuitry configured to wirelessly charge the wireless device 312 when the wireless device 312 is placed in proximity to the desktop signal booster 300. The integrated node antenna 302, the integrated battery 304, the integrated device antenna 306, the wireless charging circuitry 308 and the cellular signal amplifier 310 can be incorporated into the desktop signal booster 300 in a single, portable form-factor.

In addition, the integrated node antenna 302 and the integrated device antenna 306 can be positioned at a selected distance from each other to increase isolation. For example, the integrated node antenna 302 can be placed at a first end of the desktop signal booster 300 and the integrated device antenna 306 can be placed at a second end of the desktop signal booster 300 in order to increase the isolation between the integrated node antenna 302 and the integrated device antenna 306.

In previous solutions, wireless charging docks fail to incorporate an integrated signal booster, and particularly not a Federal Communications Commission (FCC)-compatible consumer signal booster. In contrast, as shown, the desktop signal booster 300 can incorporate the wireless charging circuitry 308 to wirelessly charge the wireless device 312, and the desktop signal booster 300 can be an FCC-compatible consumer signal booster.

In one example, the desktop signal booster 300 can detect and mitigate unintended oscillations in uplink and downlink bands. The desktop signal booster 300 can be configured to automatically power down or cease amplification when the wireless device 312 has approached an affected base station.

In one example, the desktop signal booster 300 can enable a cellular connection, increase data rates and/or increase performance in otherwise poor-connection areas. In order to improve performance, the desktop signal booster 300 can be used in series with a standard signal booster and/or a sleeve that amplifies signals for a wireless device placed in the sleeve.

Typically, mobile devices can have an increased noise figure (e.g., 5-6 dB) when the mobile devices do not use low-noise amplifiers (LNAs) on their radio frequency (RF) front-end receiving paths. However, the handheld booster 300 can lower the noise figure (e.g., to approximately 1-2 dB) by using one or more LNAs.

In one example, the wireless device 312 can be placed in a sleeve that functions to amplify signals for the wireless device 312, and both the wireless device 312 and the sleeve can be placed in proximity to the desktop signal booster 300. In other words, both the desktop signal booster 300 and the sleeve can be utilized to improve performance. In another example, Bluetooth headsets, wired headsets and speaker phones can allow a user to interface with or use the wireless device 312 when the wireless device 312 is placed on the desktop signal booster 300. In yet another example, the desktop signal booster 300 can include a node antenna (not shown), and the node antenna can be extendable (e.g., telescoping) or moveable to improve positioning and/or performance of the desktop signal booster 300. In addition, the desktop signal booster 300 can include arms, a rubber cover or other means for holding the wireless device 312 in position (e.g., on top of the desktop signal booster 300).

In one example, a coaxial cable can run from an outside antenna/booster unit to a dock/charging unit, which can allow for improved positioning for the consumer. The outside antenna/booster unit and the dock/charging unit can connect together or detach as desired. In another example, a consumer can have a 'permanent' outside antenna in a home or office, and a personal desktop booster can be 'docked' upon arrival at that location.

In one configuration, the integrated device antenna 306 can communicate with the wireless device 312 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

Figure 4:
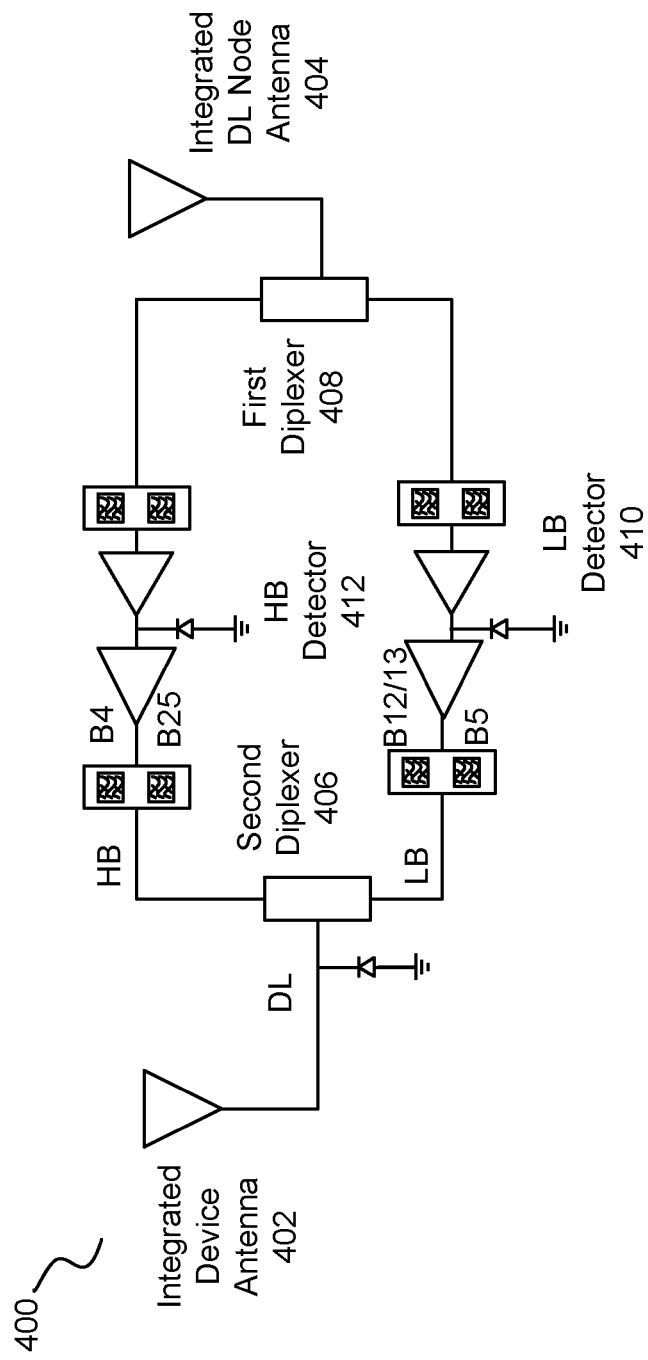
FIG. 4 illustrates a cellular signal amplifier configured to amplify DL signals in accordance with an example.

FIG. 4 illustrates an exemplary cellular signal amplifier 400 configured to amplify downlink (DL) signals. An integrated DL node antenna 404 can receive a DL signal from a base station (not shown). The DL signal can be directed to a first diplexer 408, which can direct the DL signal to a DL high band (HB) signal path or a DL low band (LB) signal path. The DL high band signal path and the DL low band signal path can each include one or more single input single output (SISO) bandpass filters and one or more amplifiers. For the DL high band signal path, the SISO bandpass filter(s) can filter signals in LTE frequency bands 4 and 25. For the DL low band signal path, the SISO bandpass filter(s) can filter signals in LTE frequency bands 5, 12 and 13. The DL signal can be filtered and amplified in either the DL high band signal path or the DL low band signal path. The amplification of the DL signals can be limited to a gain of less than or equal to 9 dB. Then, the DL signal can be passed to a second diplexer 406. The second diplexer 406 can direct the DL signal to an integrated device antenna 402, which can transmit the DL signal to a wireless device (not shown).

In one example, the DL high band signal path can include a HB detector 412. The HB detector 412 can be a diode. The HB detector 412 can detect a DL signal received from the integrated DL node antenna 404 via the first diplexer 408. The HB detector 412 can detect a power level of the DL signal, and when the power level of the DL signal is greater than a selected threshold, the cellular signal amplifier 400 can be turned off. In other words, the DL signal may not need to be amplified, so the cellular signal amplifier 400 can be turned off to conserve power. When the HB detector 412 detects that the power level of the DL signal is less than a selected threshold, the cellular signal amplifier 400 can be turned on. Therefore, the cellular signal amplifier 400 can be engaged or disengaged depending on the power level of the DL signal.

Similarly, the DL low band signal path can include a LB detector 410. The LB detector 410 can be a diode. The LB detector 410 can detect a DL signal received from the integrated DL node antenna 404 via the first diplexer 404. The LB detector 410 can detect a power level of the DL signal, and when the power level of the DL signal is greater than a selected threshold, the cellular signal amplifier 400 can be turned off. When the LB detector 410 detects that the power level of the DL signal is less than a selected threshold, the cellular signal amplifier 400 can be turned on.

In one configuration, the mobile device can include a primary antenna and a secondary antenna. For example, the mobile device can use the secondary antenna when the primary antenna is not working. In addition, when the primary antenna is used for a DL-only signal amplification and filtering path (as shown in FIG. 4), the mobile device can use the secondary antenna to transmit UL signals. In other words, the primary antenna can be used for DL signals, and the secondary antenna can be used for UL signals. In this configuration, the UL signal transmitted from the mobile device may not be amplified by the cellular signal amplifier 400.

In one example, the lack of UL amplification can lead to a less than 9 dB system gain. In another example, the cellular signal amplifier 400 can include a detector that can detect an UL signal, and then determine whether to turn the DL amplification path on or off.

Figure 5:
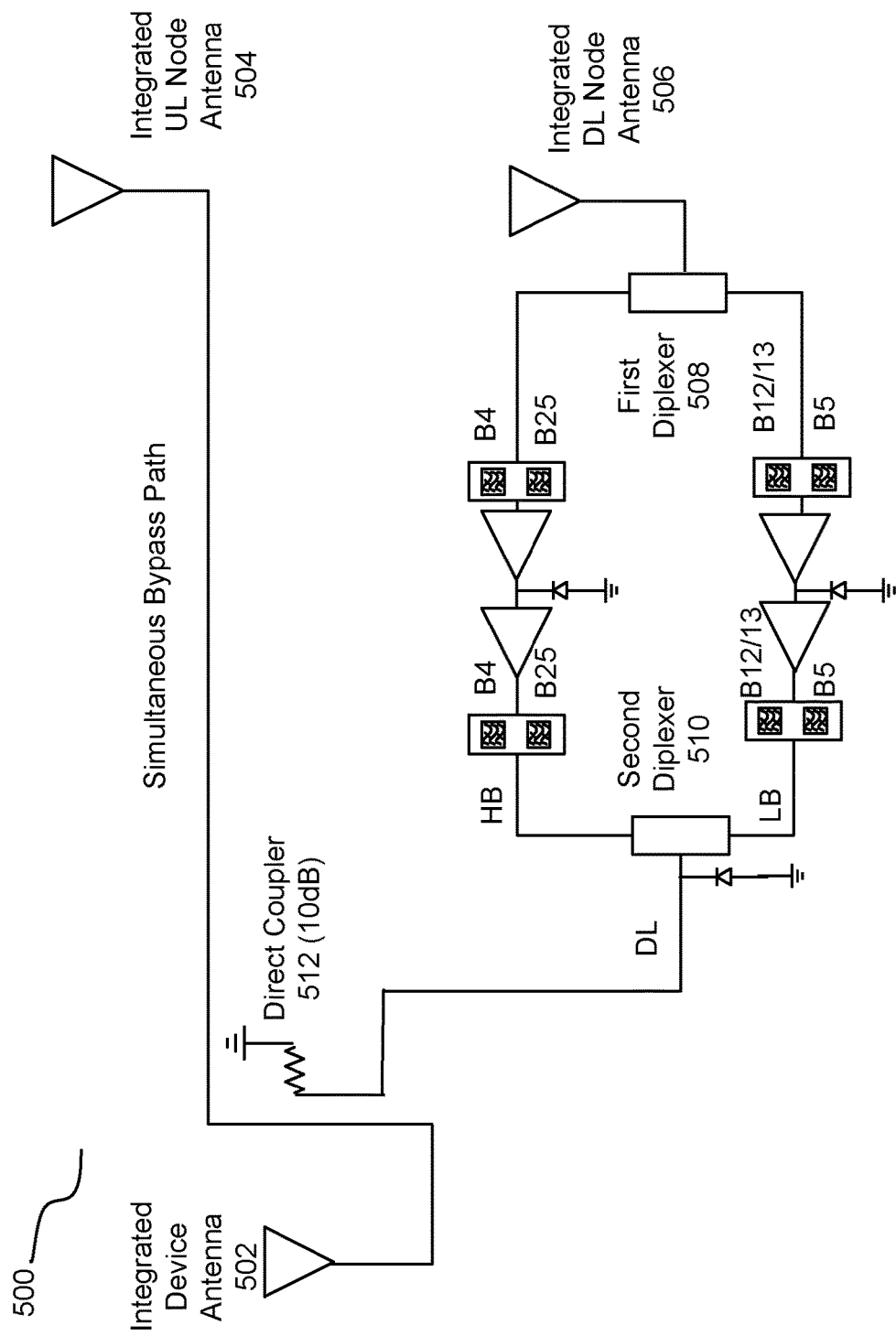
FIG. 5 illustrates a cellular signal amplifier configured with a simultaneous bypass path in accordance with an example.

FIG. 5 illustrates an exemplary cellular signal amplifier 500 configured with a simultaneous bypass path. The cellular signal amplifier 500 can only amplify downlink (DL) signals. The cellular signal amplifier 500 can direct an uplink (UL) signal on a simultaneous bypass path, which enables the UL signal to travel directly from an integrated device antenna 502 to an integrated UL node antenna 504. In other words, the UL signal can avoid a filtering and amplification path. In this case, when the UL signal is not amplified, the integrated device antenna 502 can be directly coupled to the integrated UL node antenna 504. The direct coupling between the integrated device antenna 502 and the integrated UL node antenna 504 can be achieved using a directional coupler. The amplification of the UL signal can account for signal loss due to the directional coupler 512. In addition, by not amplifying the UL signal, a lower specific absorption rate (SAR) level can be achieved.

In one example, a DL signal can be received via an integrated DL node antenna 506. The DL signal can be directed to a first diplexer 508. The DL signal can be directed to a high band DL signal amplification path or a low band DL signal amplification path, and then to a second diplexer 510. The DL signal can travel from the second diplexer 510 to the integrated device antenna 502 for transmission to a wireless device (not shown).

In one configuration, the cellular signal amplifier 500 can receive DL signals and transmit UL signals with a single integrated node antenna. In other words, the integrated UL node antenna 504 and the integrated DL node antenna 506 can be combined to form the single integrated node antenna.

In one configuration, the cellular signal amplifier 500 can include the integrated device antenna 502 and an integrated UL/DL node antenna. The integrated device antenna 502 and the integrated UL/DL node antenna can be connected via a simultaneous bypass path, which bypasses the amplification and signaling paths. As an example, an UL signal from the integrated device antenna 502 can be passed to the integrated UL/DL node antenna via the simultaneous bypass path. As another example, a DL signal from the integrated UL/DL node antenna can be passed to the integrated device antenna 502 via the simultaneous bypass path.

In one example, the FCC can limit the cellular signal amplifier 500 to a less than 9 dB system gain because the cellular signal amplifier 500 does not perform UL amplification. In another example, the cellular signal amplifier 500 can include a detector that can detect an UL signal, and then determine whether to turn the DL amplification path on or off. In yet another example, the cellular signal amplifier 500 can include an additional low noise amplifier (LNA) to reduce the noise figure.

Figure 6:
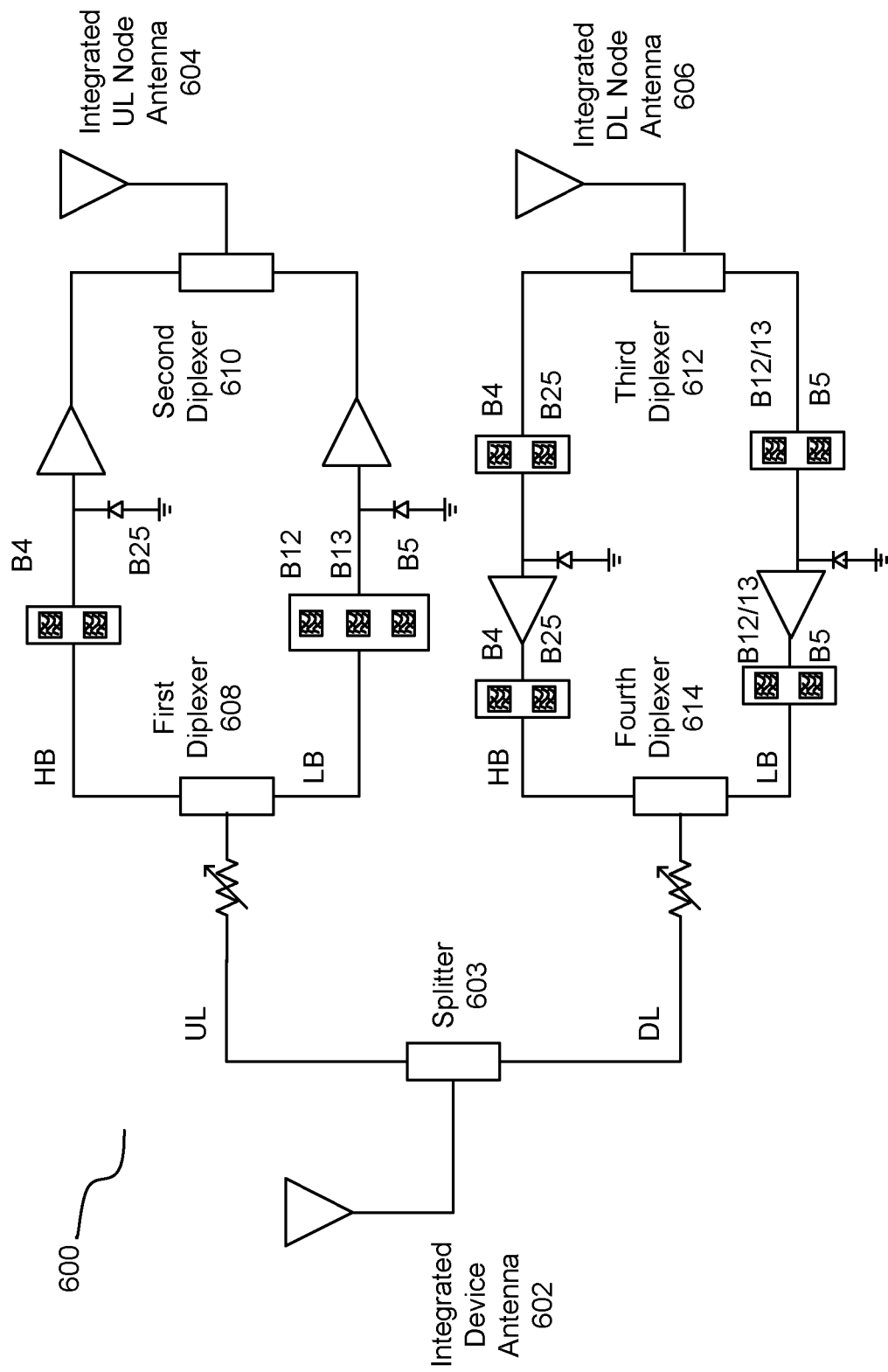
FIG. 6 illustrates a cellular signal amplifier configured to amplify uplink (UL) and downlink (DL) signals in accordance with an example.

FIG. 6 illustrates an exemplary cellular signal amplifier 600 configured to amplify uplink (UL) and downlink (DL) signals. The cellular signal amplifier 600 can include an integrated device antenna 602, an integrated UL node antenna 604 and an integrated DL node antenna 606. In one example, the amplification of UL and DL signals can be limited to a gain of less than or equal to 23 dB. A separate cellular signal amplifier or separate antenna for UL and DL communications can increase the UL or DL signal output power by eliminating the need for filtering on a power amplifier output.

In one example, the integrated device antenna 602 can receive an UL signal from a wireless device (not shown). The UL signal can be directed to a splitter 603, and then the UL signal can be directed to first diplexer 608. The first diplexer 608 can direct the UL signal to an UL high band signal path or a UL low band signal path (depending on whether the UL signal is a high band signal or a low band signal). The UL high band signal path and the UL low band signal path can each include a single input single output (SISO) bandpass filter. For the UL high band signal path, the SISO bandpass filter can filter signals in LTE frequency bands 4 and 25. For the UL low band signal path, the SISO bandpass filter can filter signals in LTE frequency bands 5, 12 and 13. The first diplexer 608 can appropriately direct the UL signal to the high band signal path or the low band signal path, in which the UL signal can be filtered and amplified using a low-noise amplifier (LNA). The filtered and amplified UL signal can be passed to a second diplexer 610, and then to the integrated UL node antenna 604, which can transmit the UL signal to a base station (not shown).

In one example, the integrated DL node antenna 606 can receive a DL signal from the base station. The DL signal can be directed to a third diplexer 612, which can direct the DL signal to a DL high band signal path or a DL low band signal path. The DL high band signal path and the DL low band signal path can each include a single input single output (SISO) bandpass filter. For the DL high band signal path, the SISO bandpass filter can filter signals in LTE frequency bands 4 and 25. For the DL low band signal path, the SISO bandpass filter can filter signals in LTE frequency bands 5, 12 and 13. The DL signal can be filtered and amplified in either the DL high band signal path or the DL low band signal path, and then the DL signal can be passed to a fourth diplexer 614. The fourth diplexer 614 can direct the DL signal to the splitter 603, and then to the integrated device antenna 602, which can transmit the DL signal to the wireless device. In one example, an attenuator can be positioned between the integrated device antenna 602 and the splitter 603 to reduce reflections.

In one configuration, separate UL and DL integrated device antennas can be used to avoid splitter or duplexer (front-end) losses. By using separate UL and DL integrated device antennas, UL output power and DL sensitivity can be increased.

Figure 7:
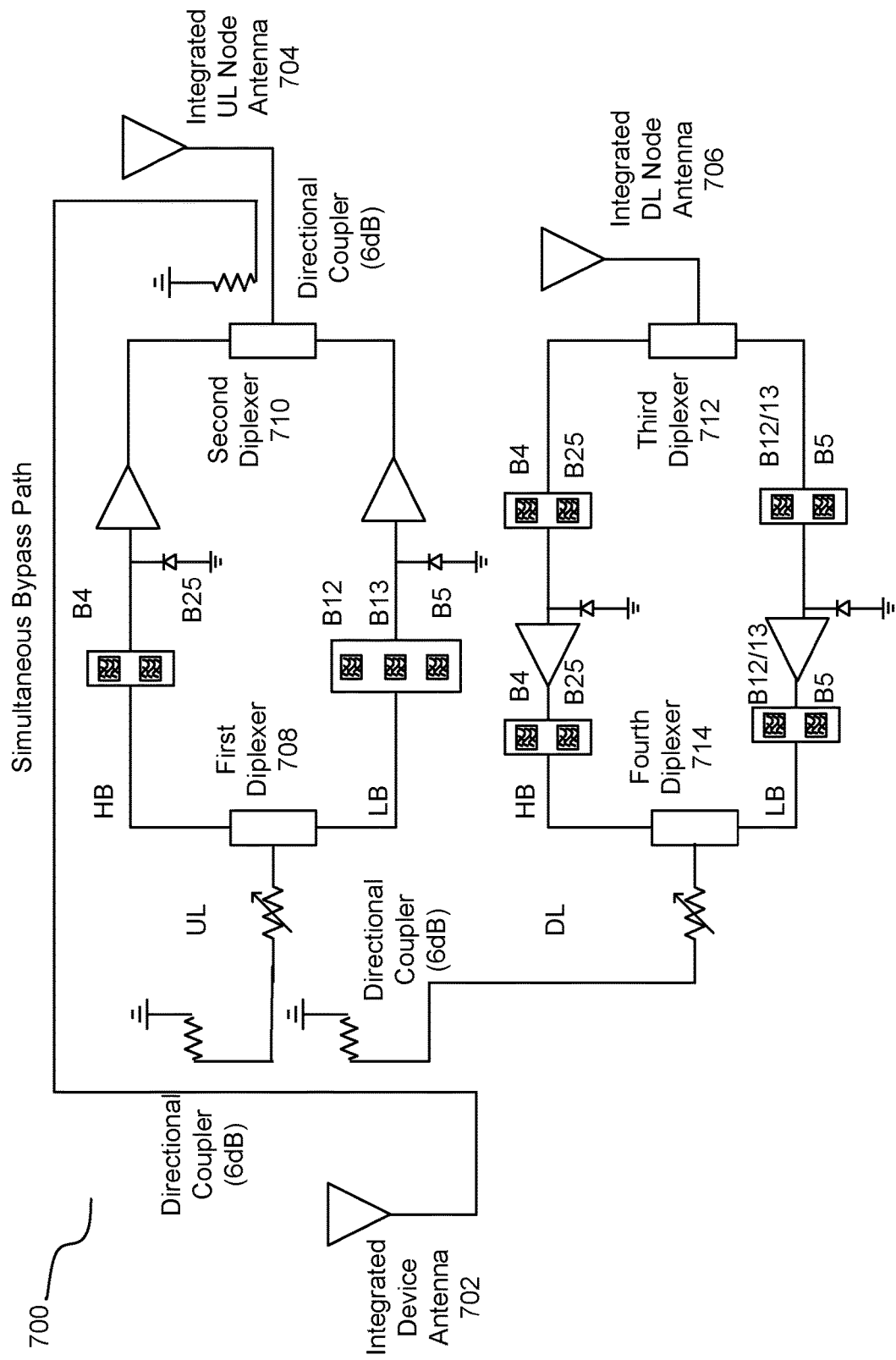
FIG. 7 illustrates a cellular signal amplifier configured with a simultaneous bypass path in accordance with an example.

FIG. 7 illustrates an exemplary cellular signal amplifier 700 configured with a simultaneous bypass path. The cellular signal amplifier 700 can amplify downlink (DL) and uplink (UL) signals. However, the cellular signal amplifier 700 can amplify either DL or UL signals at a given time and allow UL non-amplified signals to simultaneously bypass amplification. In other words, the cellular signal amplifier 700 can detect a power level of an UL signal. The power level of the UL signal can be detected using a detector (e.g., a diode). Based on a signal power level in relation to a defined threshold, the cellular signal amplifier 700 can determine that the UL signal does not need amplification and can bypass either a high band or low band uplink signal amplification path. For example, when the signal power level is above the defined threshold, the UL signal can bypass the high band or low band uplink signal amplification path. On the other hand, when the signal power level is below the defined threshold, the UL signal can be directed to one of the high band or low band uplink signal amplification path. In one example, DL signals can always be directed to a high band or low band downlink signal amplification path of the cellular signal amplifier 700.

In one example, when the UL signal is not amplified, an integrated device antenna 702 can be directly coupled to an integrated UL node antenna 704. In other words, the UL signal can be directed sent from the integrated device antenna 702 to the integrated UL node antenna 704. The direct coupling between the integrated device antenna 702 and the integrated UL node antenna 704 can be achieved using a directional coupler.

Alternatively, the integrated device antenna 702 can be coupled with the integrated UL node antenna 704 using a splitter, a circulator, a triplexer, a quadplexer, a multiplexer, or a duplexer.

In one example, the integrated device antenna 702 can receive an UL signal from a wireless device (not shown). Signal detectors can detect a power level of the UL signal. When the power level is above the defined threshold, one or more directional couplers can be configured such that the UL signal passes directly to the integrated UL node antenna 704 via the simultaneous bypass path. As a result, the UL signal can avoid passing through the high band UL signal amplification path or the low band UL signal amplification path. The integrated UL node antenna 704 can transmit the unamplified UL signal to a base station (not shown).

On the other hand, when the signal detectors detect that the power level of the UL signal is less than the defined threshold, the one or more directional couplers can be configured such that the UL signal is directed to a first diplexer 708. The first diplexer 708 can direct the UL signal to either the high band UL signal amplification path or the low band UL signal amplification path, which causes the UL signal to be filtered and amplified. The UL signal can pass through a second diplexer 710, and then to the integrated UL node antenna 704 for transmission to the base station. In this example, based on the power level of the UL signal, the UL signal does not travel through the simultaneous bypass path.

In one example, a DL signal can be received via an integrated DL node antenna 706. The DL signal can be directed to a third diplexer 712. The DL signal can be directed to a high band DL signal amplification path or a low band DL signal amplification path, and then to a fourth diplexer 714. The DL signal can travel from the fourth diplexer 714 to the integrated device antenna 702 for transmission to the wireless device.

In one example, the simultaneous bypass path can increase battery life of the cellular signal amplifier 700 by allowing UL amplification to be turned off. Further, the simultaneous bypass path can increase reliability, in the event the cellular signal amplifier malfunctions. In one example, the simultaneous bypass path can be always active. The simultaneous bypass path can operate independently of whether or not the cellular signal amplifier 700 has failed. The simultaneous bypass path can operate independent of relays or switches to bypass the cellular signal amplifier 700. Additionally, because wireless propagation paths of signals from multiple antennas can constantly vary, fading margins can exceed 15 dB. Therefore, by using multiple antennas, the reliability of the cellular signal amplifier 700 can be increased.

Figure 8:
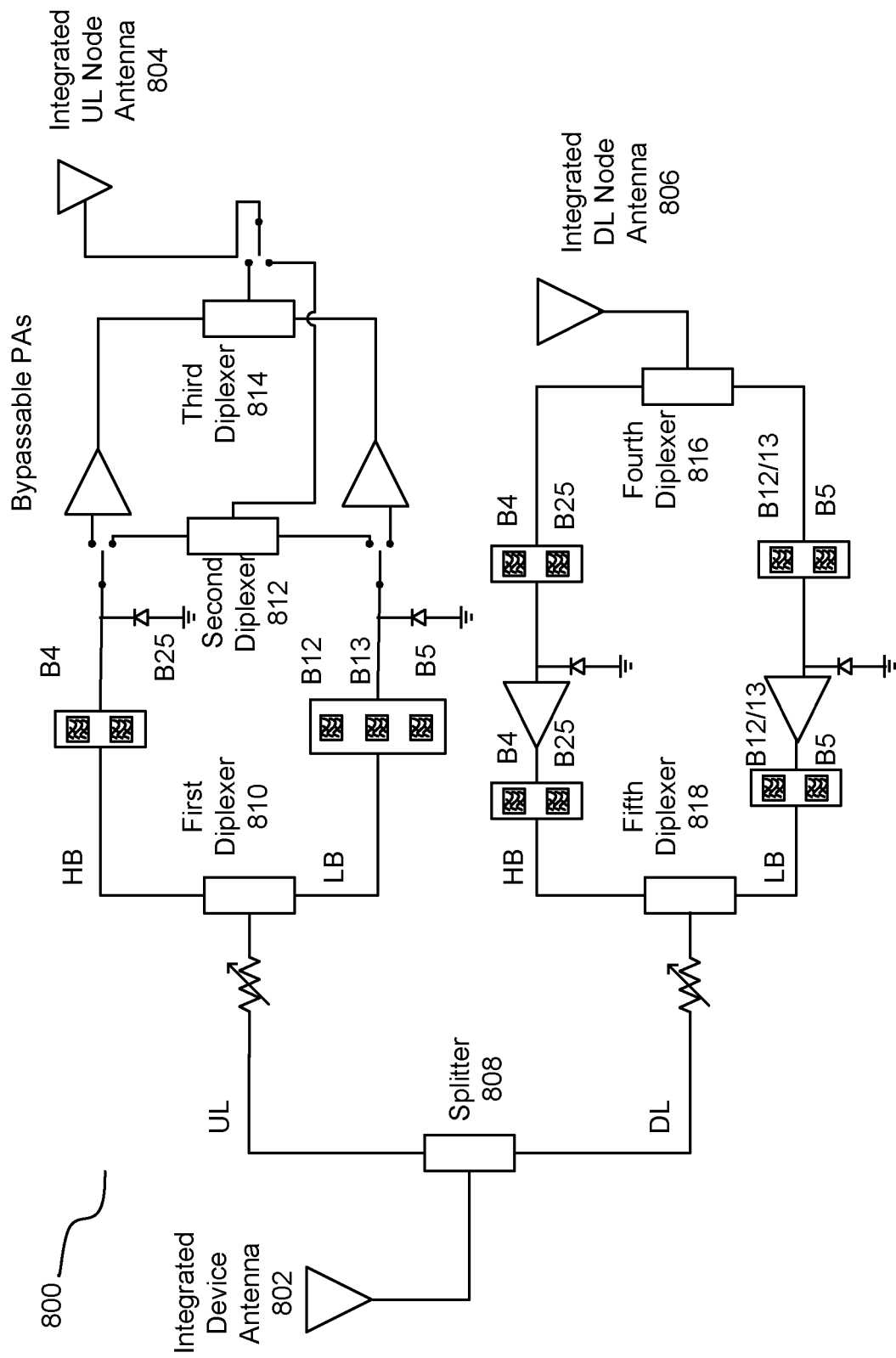
FIG. 8 illustrates a cellular signal amplifier with bypassable power amplifiers in accordance with an example.

FIG. 8 illustrates an exemplary cellular signal amplifier 800 with bypassable power amplifiers. An integrated device antenna 802 can receive an uplink (UL) signal, which can be directed to a splitter 804, and then to a first diplexer 810. The first diplexer 810 can direct the UL signal to a high band UL path or a low band UL path. The high band UL path and the low band UL path can each include a bypassable power amplifier. In one example, when the bypassable power amplifiers are switched off (e.g., to save power), the UL signal from the high band UL path or the low band UL path can travel to a second diplexer 812, then to a third diplexer 814, and then to an integrated UL node antenna 804. In this example, the UL signal is not amplified to save power. In addition, the high band UL path and the low band UL path can each include a signal detector, which can detect a power level of the UL signal. When the power level of the UL signal is above a defined threshold, the UL signal may not be amplified.

In another example, when the bypassable power amplifiers are switched on, the UL signal from the high band UL path or the low band UL path can be directed to a respective power amplifier, and then to the third diplexer 814. The UL signal can travel from the third diplexer 814 to the integrated UL node antenna 804. In this example, the UL signal can be amplified prior to transmission from the integrated UL node antenna 804.

In one example, an integrated DL node antenna 806 can direct a DL signal to a fourth diplexer 816. The fourth diplexer 816 can direct the DL signal to a high band DL signal amplification and filtering path, or to a low band DL signal amplification and filtering path. A fifth diplexer 818 can direct the DL signal to the splitter 808, which can direct the signal to the integrated device antenna 802.

Figure 9:
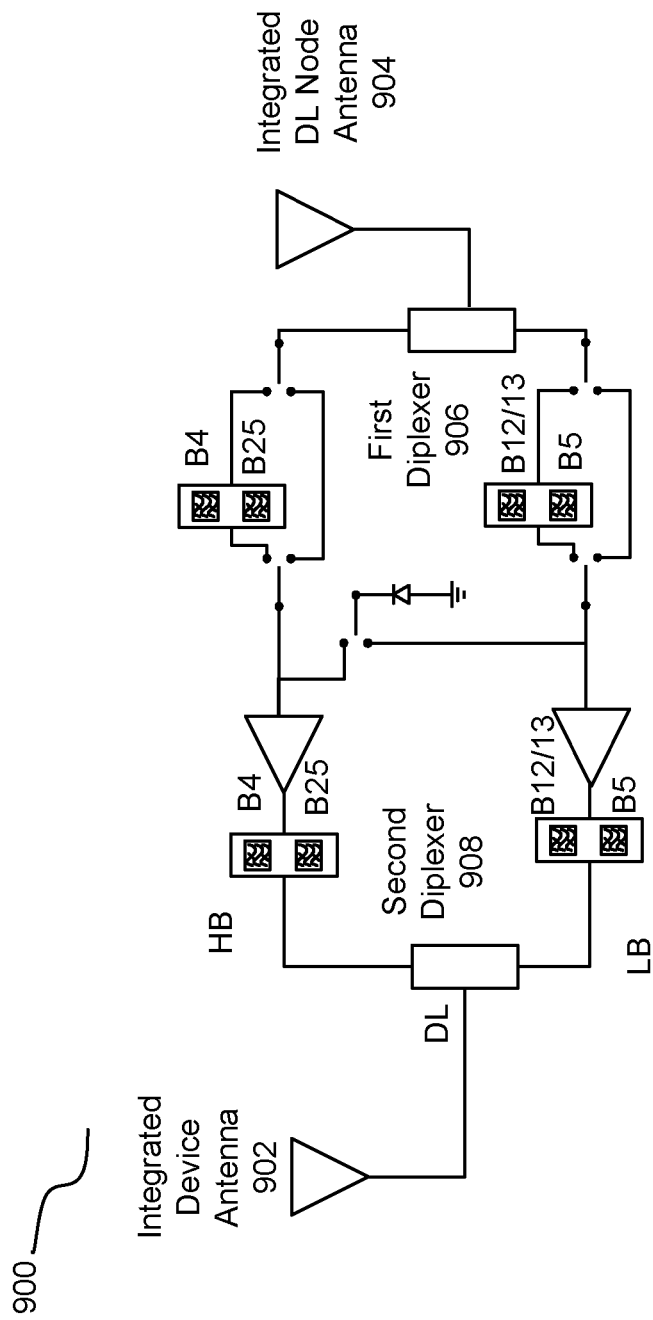
FIG. 9 illustrates a cellular signal amplifier configured with switchable band pass filters (BPFs) in accordance with an example.

FIG. 9 illustrates an exemplary cellular signal amplifier 900 configured with switchable band pass filters (BPFs). Front end BPFs can be switched in when a weak downlink (DL) DL signal is detected or switched out when a strong DL signal is detected. An example of a weak DL signal can be a signal with a signal strength less than −80 dBm while a strong DL signal can be a signal with a signal strength greater than −80 dBm. The minimization of noise figure can be critical in weak signal areas, and the noise figure can be reduced and the coverage extended when the front-end BPFs are switched off. In addition, the switchable BPFs can function to extend a receive sensitivity of the cellular signal amplifier 900.

In one example, an integrated DL node antenna 904 can receive a DL signal, and the DL signal can be provided to a first diplexer 906. The first diplexer 906 can direct the DL signal to a high band signal amplification and filtering path, or the DL signal can be directed to a low band signal amplification and filtering path. The high band path and the low band path can each include switchable BPFs, which enable the DL signal to avoid passing through at least some of the BPFs. The DL signal can be directed to a second diplexer 908, and then to an integrated device antenna 902.

Figure 10:
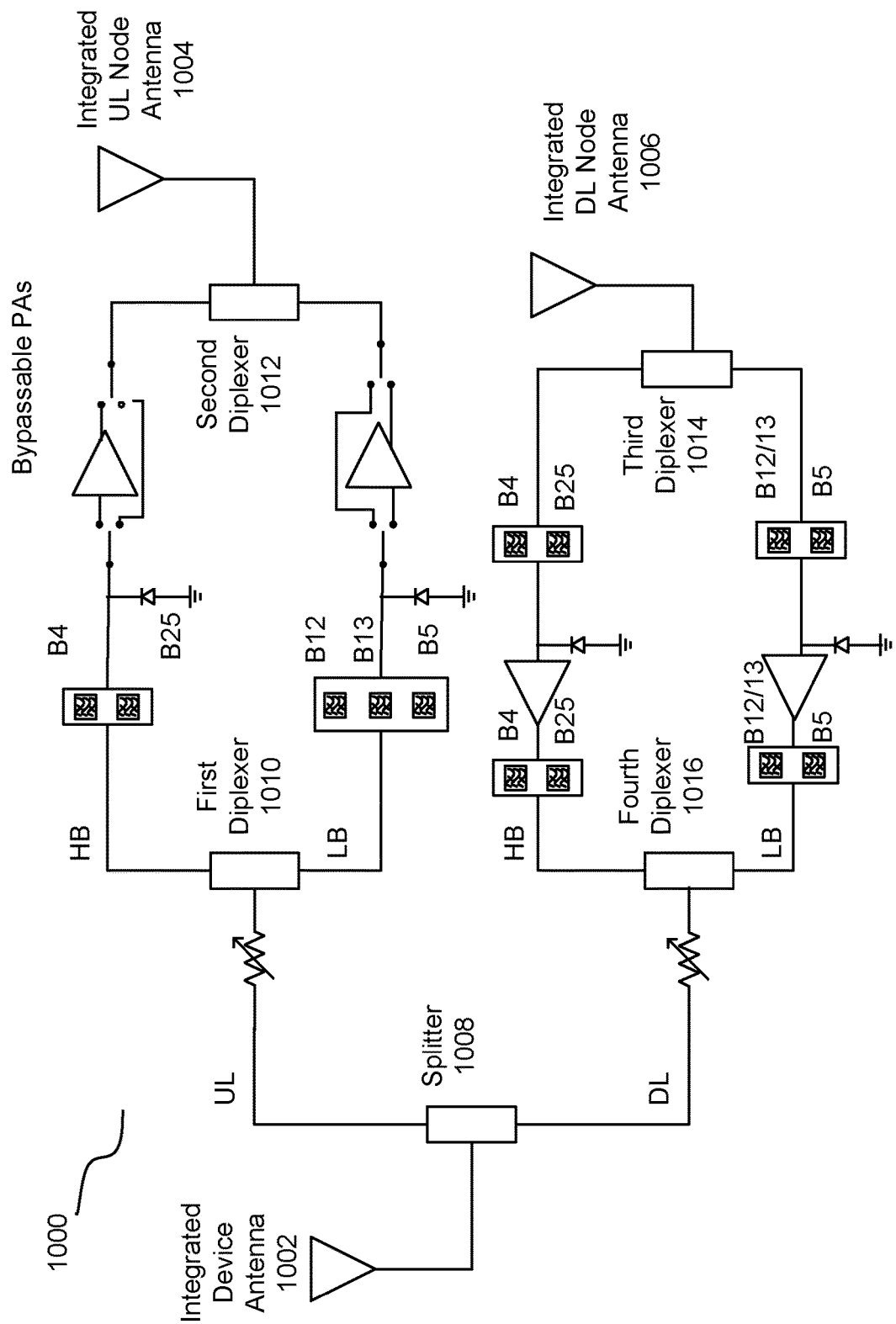
FIG. 10 illustrates a cellular signal amplifier with bypassable power amplifiers in accordance with an example.

FIG. 10 illustrates an exemplary cellular signal amplifier 1000 with bypassable power amplifiers. The power amplifiers can be switched on when an uplink (UL) signal needs to be amplified to reach a base station or switched off and bypassed when a UL signal does not need to be amplified to reach a base station. In one example, the power amplifiers can be switched on when a power level of the UL signal is below a defined threshold, and the power amplifiers can be switched off when the power level of the UL signal is above the defined threshold.

In one example, an integrated device antenna 1002 can receive an UL signal. The UL signal can be directed to a splitter 1008, and then to a first diplexer 1010. The first diplexer 1010 can direct the UL signal to a high band signal amplification and filtering path or a low band signal amplification and filtering path. Each of the high band and low band paths can include a switchable power amplifier. Depending on the power level of the UL signal in relation to the defined threshold, the UL signal can be provided to the power amplifier or bypass the power amplifier to save power. The UL signal can be provided to a second diplexer 1012, and then to an integrated UL node antenna 1004.

In one example, an integrated DL node antenna 1006 can direct a DL signal to a third diplexer 1014. The third diplexer 1014 can direct the DL signal to a high band DL signal amplification and filtering path, or to a low band DL signal amplification and filtering path. A fourth diplexer 1016 can direct the DL signal to the splitter 1008, which can direct the signal to the integrated device antenna 1002.

Figure 11:
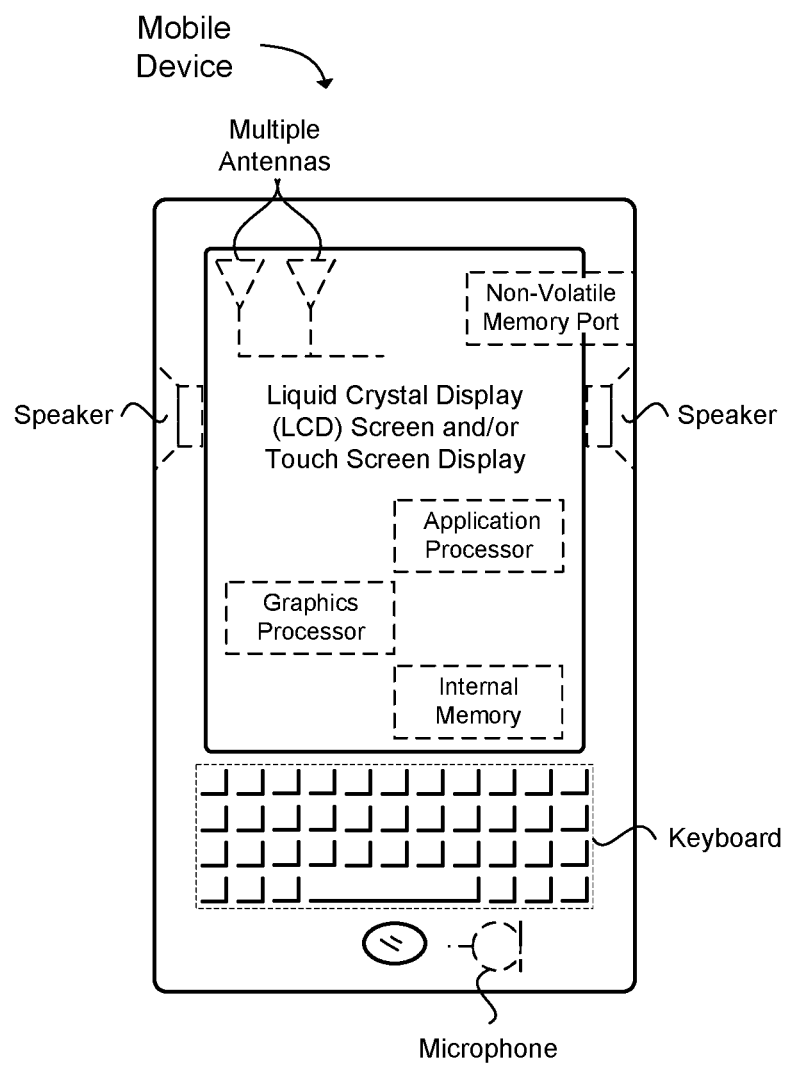
FIG. 11 illustrates a wireless device in accordance with an example.

FIG. 11 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 11 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

Figure 12A:
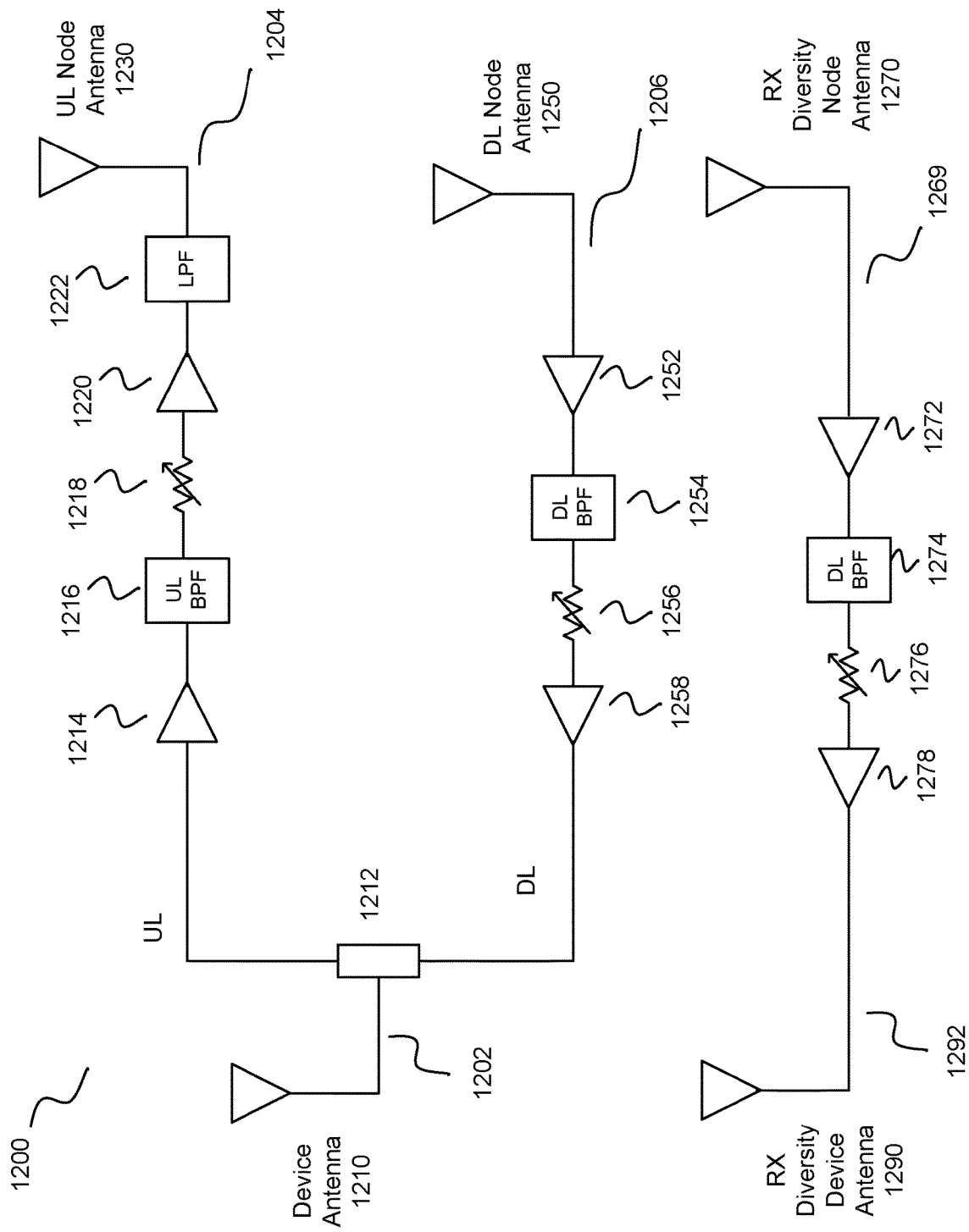
FIG. 12a illustrates a repeater with a receive diversity antenna port in accordance with an example.

In another example, as illustrated in FIG. 12a, a repeater can comprise a separate uplink node port and a downlink node port. The uplink node port can be configured to be coupled to an uplink node port. Similarly, the downlink node port can be configured to be coupled to a downlink node antenna. The use of two separate node ports can eliminate or reduce loss that typically occurs in a diplexer, duplexer, and/or multiplexer that is used to couple an uplink path with a downlink path at a single node. In addition, a receive diversity antenna port can be coupled to a receive diversity amplification and filtering path to enable the repeater 1200 to be configured to be coupled to a receive diversity device antenna 1290 and a receive diversity node antenna 1270. The receive diversity amplification and filtering path can allow a downlink signal to be amplified from the receive diversity node antenna to optimize reception of a downlink signal transmitted from a base station to a user device having a diversity antenna to allow the user device to use spatial diversity in receiving the downlink signal.

In another example, the use of a separate UL node antenna, DL node antenna, and RX diversity node antenna can optimize the output power over the band because the antenna load impedance can change less frequently due to a lower quality (Q) factor. In one example, impedance matching can be difficult with filters, especially over wide bandwidths, because of the high Q factor that varies over frequency more frequently. As such, the output of a power amplifier can be optimized when coupled to common output impedance (e.g., separate antennas) instead of a varying output impedance (e.g., filters).

In another example, coupling a filter to the output of the power amplifier can increase the chances of a filter breaking. In one example, surface acoustic wave (SAW) filters or bulk acoustic wave (BAW) filters can only have a maximum input power of about 28-32 decibel-milliwatts (dBm) before breaking. In one example, ceramic filters can only have a maximum input power of about 36 dBm before breaking. Removing the filter from the output of the power amplifier by using separate antennas can reduce the chances of filter breakage and allow the use of higher-power PAs.

In the example of FIG. 12a, a bi-directional inside antenna port 1202 or bi-directional device antenna port 1202 can be configured to be coupled to an integrated device antenna 1210 or a bi-directional inside antenna 1210. The integrated device antenna 1210 can receive an UL signal from a UE. The bi-directional inside antenna port 1202 can be configured to be coupled to a duplexer 1212. The duplexer 1212 can split into an UL path and a DL path. While a duplexer is illustrated in FIG. 12a, it is not intended to be limiting. A duplexer, as used in FIGS. 12a-d, and 12f, can be a duplexer, a diplexer, a multiplexer, a circulator, or a splitter.

In another example, the UL path can comprise one or more of a low-noise amplifier 1214, an UL band-pass filter (BPF) 1216, a variable attenuator 1218, a power amplifier (PA) 1220, or a low-pass filter (LPF) 1222. The low-noise amplifier 1214 can be an UL low-noise amplifier, the variable attenuator 1218 can be an UL variable attenuator, the power amplifier 1220 can be an UL power amplifier, and the low-pass filter 1222 can be an UL low-pass filter or low-order filtering. In another example, the power amplifier 1220 can comprise a variable gain power amplifier, a fixed-gain power amplifier, or a gain block. In another example, the LPF 1222 can be configured to be coupled between the power amplifier 1220 and an UL outside antenna port 1204 or UL node antenna port 1204 to filter harmonics emitted by the power amplifier 1220. While a low pass filter is described in this example, it is not intended to be limiting. A low-order filter can be used to filter the harmonics. The low order filter can include one or more high pass filter poles and one or more low pass filter poles. The low-order filter can be configured to have low loss since it is located after the power amplifier 1220.

In another example, the power amplifier 1220 can be configured to be coupled directly to the UL outside antenna port 1204 without filtering between the power amplifier 1220 and the UL outside antenna port. In another example, the UL BPF 1216 can be an FDD UL BPF configured to pass one or more of 3GPP FDD frequency bands 2, 4, 5, 12, 13, 17, 25, 26, or 71. In another example, the UL BPF 1216 can be an FDD UL BPF configured to pass one or more of 3GPP LTE FDD frequency bands 1-28, 30, 31, 65, 66, 68, 70-74, or 85. In another example, the UL BPF 1216 can be an LTE or 5G FDD UL BPF configured to pass a selected channel within an LTE or 5G 3GPP FDD band. In another example, the UL BPF 1216 can be an LTE or 5G FDD UL BPF configured to pass a selected frequency range within an LTE or 5G 3GPP FDD band.

In another example, after traveling on the UL path, the UL signal can be amplified and filtered in accordance with the type of amplifiers and BPFs included on the UL path. The UL signal can be directed to an UL node antenna port 1204. The UL signal can be directed from the UL node antenna port 1204 to an integrated UL node antenna 1230 or an UL outside antenna 1230. The UL node antenna 1230 can be an omnidirectional antenna or a directional antenna. The UL outside antenna 1230 can communicate the amplified and/or filtered UL signal to a base station.

In another example, an integrated DL node antenna port 1206 or DL outside antenna port 1206 can be configured to be coupled to an integrated DL node antenna 1250 or a DL outside antenna 1250. The integrated DL node antenna 1250 can be an omnidirectional antenna or directional antenna. The integrated DL node antenna 1250 can receive a DL signal from a base station. The DL outside antenna port 1206 can be configured to be coupled to a low-noise amplifier 1252.

In another example, the DL path can comprise one or more of the low-noise amplifier 1252, a DL band-pass filter (BPF) 1254, a variable attenuator 1256, or a power amplifier (PA) 1258. The low-noise amplifier 1252 can be a DL low-noise amplifier, the variable attenuator 1256 can be a DL variable attenuator, and the power amplifier 1258 can be a DL power amplifier. In another example, the power amplifier 1258 can comprise a variable gain power amplifier, a fixed-gain power amplifier, or a gain block. In another example, the low-noise amplifier 1252 can be configured to be coupled directly to a DL outside antenna port 1206 without filtering between the low-noise amplifier 1252 and the DL outside antenna port. In another example, the DL BPF 1254 can be an FDD DL BPF configured to pass one or more of 3GPP FDD frequency bands 2, 4, 5, 12, 13, 17, 25, 26, or 71. In another example, the DL BPF 1254 can be an FDD DL BPF configured to pass one or more of 3GPP FDD frequency bands 1-28, 30, 31, 65, 66, 68, 70-74, or 85. In another example, the DL BPF 1254 can be an FDD DL BPF configured to pass a selected channel within a 3GPP FDD band. In another example, the DL BPF 1254 can be an FDD DL BPF configured to pass a selected frequency range within a 3GPP FDD band.

In another example, after traveling on the DL path, the DL signal can be amplified and filtered in accordance with the type of amplifiers and BPFs included on the DL path. The DL signal can be directed from the power amplifier 1258 to a duplexer 1212. The DL signal can be directed from the duplexer 1212 to an integrated device antenna 1210 or a bi-directional inside antenna 1210. The integrated device antenna 1210 can communicate the amplified and/or filtered DL signal to a UE.

In another example, a receive diversity DL outside antenna port 1269 or receive diversity DL node antenna port 1269 or receive diversity DL donor antenna port 1269 can be configured to be coupled to a receive diversity DL outside antenna 1270 or receive diversity DL node antenna 1270 or receive diversity DL donor antenna 1270. The receive diversity DL node antenna 1270 can be an omnidirectional antenna or directional antenna. The receive diversity DL node antenna 1270 can receive a DL signal from a base station. The receive diversity DL outside antenna port 1269 can be configured to be coupled to a low-noise amplifier 1272.

In another example, the receive diversity DL path can comprise one or more of the low-noise amplifier 1272, a DL band-pass filter (BPF) 1274, a variable attenuator 1276, or a power amplifier (PA) 1278. The low-noise amplifier 1272 can be a DL low-noise amplifier, the variable attenuator 1276 can be a DL variable attenuator, and the power amplifier 1278 can be a DL power amplifier. In another example, the power amplifier 1278 can comprise a variable gain power amplifier, a fixed-gain power amplifier, or a gain block. In another example, the low-noise amplifier 1272 can be configured to be coupled directly to a receive diversity DL outside antenna port 1269 without filtering between the low-noise amplifier 1272 and the receive diversity DL outside antenna port 1269. In another example, the DL BPF 1274 can be an FDD DL BPF configured to pass one or more of 3GPP FDD frequency bands 2, 4, 5, 12, 13, 17, 25, 26, or 71. In another example, the DL BPF 1274 can be an FDD DL BPF configured to pass one or more of 3GPP FDD frequency bands 1-28, 30, 31, 65, 66, 68, 70-74, or 85. In another example, the DL BPF 1274 can be an FDD DL BPF configured to pass a selected channel within a 3GPP FDD band. In another example, the DL BPF 1274 can be an FDD DL BPF configured to pass a selected frequency range within a 3GPP FDD band. In another example, in an alternative, the receive diversity DL path can comprise the receive diversity DL outside antenna port 1269 coupled to a bypass path coupled between the receive diversity DL inside antenna port 1292 and the receive diversity DL outside antenna port 1269. The bypass path can be configured to not amplify or filter signals traveling on the bypass path.

In another example, after traveling on the receive diversity DL path, the receive diversity signal can be amplified and filtered in accordance with the type of amplifiers and BPFs included on the receive diversity DL path. In another example, in an alternative, the receive diversity signal can travel on a bypass path coupled between the receive diversity DL inside antenna port 1292 and the receive diversity DL outside antenna port 1269, wherein the bypass path does not amplify or filter the receive diversity signal. The receive diversity signal can be directed from the power amplifier 1278 to a receive diversity device antenna port 1292 or a receive diversity downlink inside antenna port 1292. The receive diversity device antenna port 1292 or a receive diversity downlink inside antenna port 1292 can be configured to be coupled to receive diversity device antenna 1290 or a receive diversity downlink inside antenna 1290. The receive diversity device antenna 1290 can communicate the amplified and/or filtered or bypassed receive diversity signal to a UE.

Figure 12B:
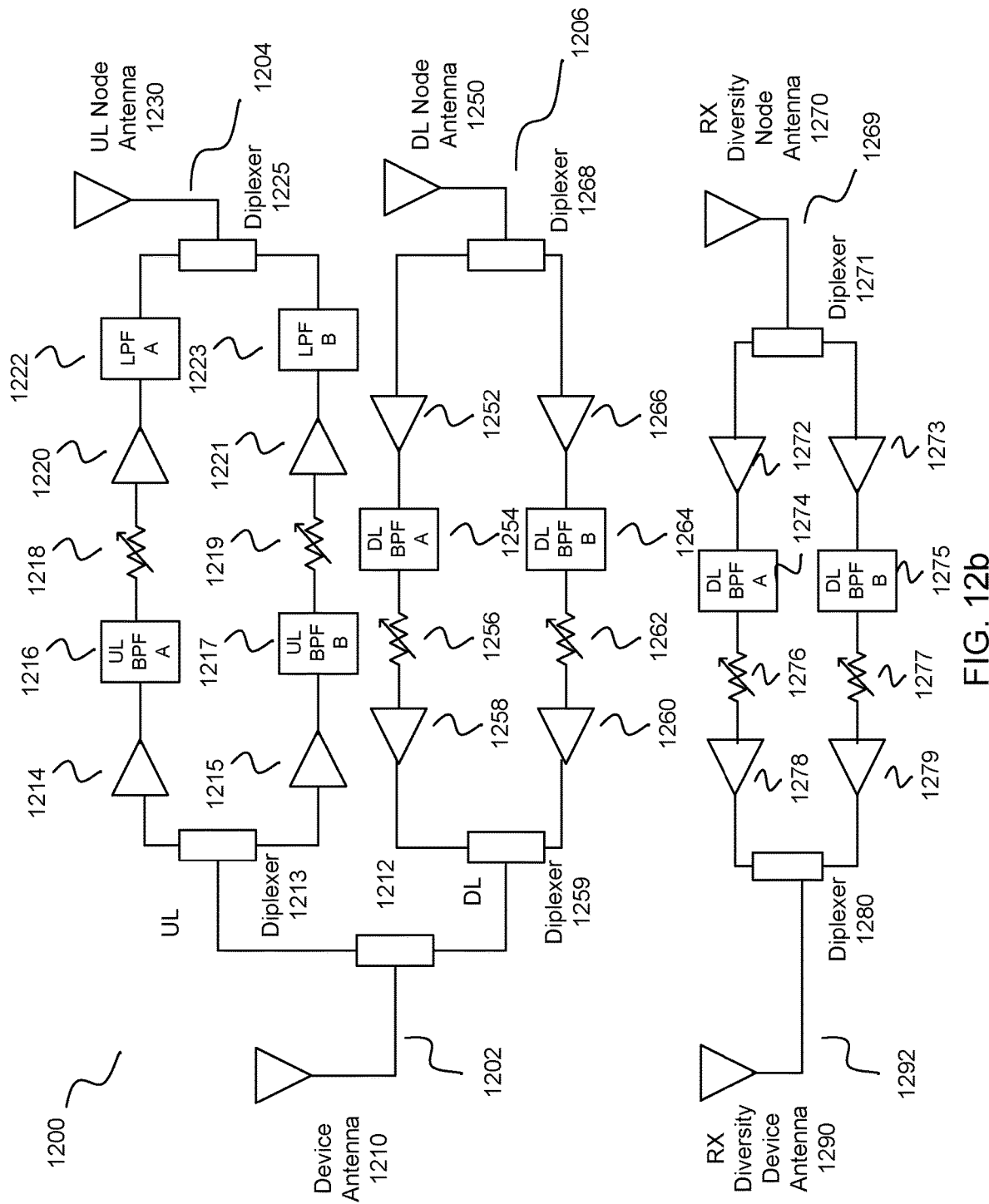
FIG. 12b illustrates a multiband repeater with a receive diversity antenna port in accordance with an example.

In another example, as illustrated in FIG. 12b, a multiband repeater can comprise a receive diversity antenna port. In this example, a bi-directional inside antenna port 1202 or bi-directional device antenna port 1202 can be configured to be coupled to an integrated device antenna 1210 or a bi-directional inside antenna 1210. The integrated device antenna 1210 can receive an UL signal from a UE. The bi-directional inside antenna port 1202 can be configured to be coupled to a duplexer 1212. The duplexer 1212 can split into an UL path and a DL path. In another example, the UL path can further comprise a first UL path and a second UL path. A diplexer 1213 can direct an UL signal to the first UL path or the second UL path. The diplexer 1213 can be a duplexer, a common direction duplexer, a diplexer, a multiplexer, a circulator, or a splitter.

In another example, a first UL path can comprise one or more of a low-noise amplifier 1214, an UL band-pass filter (BPF) 1216, a variable attenuator 1218, a power amplifier (PA) 1220, or a low-pass filter (LPF) 1222. The low-noise amplifier 1214 can be an UL low-noise amplifier, the variable attenuator 1218 can be an UL variable attenuator, the power amplifier 1220 can be an UL power amplifier, and the low-pass filter 1222 can be an UL low-pass filter or low-order filtering. In another example, the power amplifier 1220 can comprise a variable gain power amplifier, a fixed-gain power amplifier, or a gain block. In another example, the LPF can be configured to be coupled between the power amplifier 1220 and an UL outside antenna port 1204 or UL node antenna port 1204 to filter harmonics emitted by the power amplifier 1220. While a low pass filter is described in this example, it is not intended to be limiting. A low-order filter can be used to filter the harmonics. The low order filter can include one or more high pass filter poles and one or more low pass filter poles. The low-order filter can be configured to have low loss since it is located after the power amplifier 1220. In another example, the power amplifier 1220 can be configured to be coupled directly to the UL outside antenna port 1204 without filtering between the power amplifier 1220 and the UL outside antenna port. In another example, the UL BPF 1216 can be an FDD UL BPF configured to pass one or more of 3GPP FDD frequency bands 2, 4, 5, 12, 13, 17, 25, 26, or 71. In another example, the UL BPF 1216 can be an FDD UL BPF configured to pass one or more of 3GPP FDD frequency bands 1-28, 30, 31, 65, 66, 68, 70-74, or 85. In another example, the UL BPF 1216 can be an FDD UL BPF configured to pass a selected channel within a 3GPP FDD band. In another example, the UL BPF 1216 can be an FDD UL BPF configured to pass a selected frequency range within a 3GPP FDD band.

In another example, a second UL path can comprise one or more of a low-noise amplifier 1215, an UL band-pass filter (BPF) 1217, a variable attenuator 1219, a power amplifier (PA) 1221, or a low-pass filter (LPF) 1223. The low-noise amplifier 1215 can be an UL low-noise amplifier, the variable attenuator 1219 can be an UL variable attenuator, the power amplifier 1221 can be a UL power amplifier, and the low-pass filter 1223 can be an UL low-pass filter or low-order filtering. In another example, the power amplifier 1221 can comprise a variable gain power amplifier, a fixed-gain power amplifier, or a gain block.

In another example, the LPF 1223 can be configured to be coupled between the power amplifier 1221 and an UL outside antenna port 1204 or UL node antenna port 1204 to filter harmonics emitted by the power amplifier 1221. While a low pass filter is described in this example, it is not intended to be limiting. A low-order filter can be used to filter the harmonics. The low order filter can include one or more high pass filter poles and one or more low pass filter poles. The low-order filter can be configured to have low loss since it is located after the power amplifier 1221. In another example, the power amplifier 1221 can be configured to be coupled to the UL outside antenna port 1204 without filtering between the power amplifier 1221 and the UL outside antenna port 1204. In another example, the UL BPF 1217 can be an FDD UL BPF configured to pass one or more of 3GPP FDD frequency bands 2, 4, 5, 12, 13, 17, 25, 26, or 71, wherein the one or more 3GPP frequency bands passed on the second UL path can be different from the 3GPP frequency bands passed on the first UL path. In another example, the UL BPF 1217 can be an FDD UL BPF configured to pass one or more of 3GPP FDD frequency bands 1-28, 30, 31, 65, 66, 68, 70-74, or 85, wherein the one or more 3GPP frequency bands passed on the second UL path can be different from the 3GPP frequency bands passed on the first UL path.

In another example, the UL BPF 1217 can be an FDD UL BPF configured to pass a selected channel within a 3GPP FDD band, wherein the selected channel passed on the second UL path can be different from the selected channel passed on the first UL path. In another example, the UL BPF 1217 can be an FDD UL BPF configured to pass a selected frequency range within a 3GPP FDD band, wherein the selected frequency range passed on the second UL path can be different from the selected frequency range passed on the first UL path.

In another example, after traveling on the first or second UL paths, the UL signal on the first UL path and the UL signal on the second UL path can be amplified and filtered in accordance with the type of amplifiers and BPFs included on the first UL path or the second UL path. The signal from the first UL path and the signal from the second UL path can be directed to a diplexer 1225. The diplexer 1225 can be a duplexer, a common direction duplexer, a diplexer, a multiplexer, a circulator, or a splitter. From the diplexer 1225, the combined UL signal can be directed to an UL node antenna port 1204. The UL signal can be directed from the UL node antenna port 1204 to an integrated UL node antenna 1230 or an UL outside antenna 1230. The UL node antenna 1230 can be an omnidirectional antenna or a directional antenna. The UL outside antenna 1230 can communicate the amplified and/or filtered UL signal to a base station.

In another example, an integrated DL node antenna port 1206 or DL outside antenna port 1206 can be configured to be coupled to an integrated DL node antenna 1250 or a DL outside antenna 1250. The integrated DL node antenna 1250 can be an omnidirectional antenna or directional antenna. The integrated DL node antenna 1250 can receive a DL signal from a base station. The DL outside antenna port 1206 can be configured to be coupled to a diplexer 1268 that can be configured to direct a DL signal on a first DL path or a second DL path. The diplexer 1268 can be a duplexer, a common direction duplexer, a diplexer, a multiplexer, a circulator, or a splitter.

In another example, the first DL path can comprise one or more of a low-noise amplifier 1252, a DL band-pass filter (BPF) 1254, a variable attenuator 1256, or a power amplifier (PA) 1258. The low-noise amplifier 1251 can be a DL low-noise amplifier, the variable attenuator 1256 can be a DL variable attenuator, and the power amplifier 1258 can be a DL power amplifier. In another example, the power amplifier 1258 can comprise a variable gain power amplifier, a fixed-gain power amplifier, or a gain block. In another example, the low-noise amplifier 1252 can be configured to be coupled to a DL outside antenna port 1206 without filtering between the low-noise amplifier 1252 and the DL outside antenna port. In another example, the DL BPF 1254 can be an FDD DL BPF configured to pass one or more of 3GPP FDD frequency bands 2, 4, 5, 12, 13, 17, 25, 26, or 71. In another example, the DL BPF 1254 can be an FDD DL BPF configured to pass one or more of 3GPP FDD frequency bands 1-28, 30, 31, 65, 66, 68, 70-74, or 85. In another example, the DL BPF 1254 can be an FDD DL BPF configured to pass a selected channel within a 3GPP FDD band. In another example, the DL BPF 1254 can be an FDD DL BPF configured to pass a selected frequency range within a 3GPP FDD band.

In another example, the second DL path can comprise one or more of a low-noise amplifier 1266, a DL band-pass filter (BPF) 1264, a variable attenuator 1262, or a power amplifier (PA) 1260. The low-noise amplifier 1266 can be a DL low-noise amplifier, the variable attenuator 1262 can be a DL variable attenuator, and the power amplifier 1260 can be a DL power amplifier. In another example, the power amplifier 1260 can comprise a variable gain power amplifier, a fixed-gain power amplifier, or a gain block. In another example, the low-noise amplifier 1266 can be configured to be coupled to a DL outside antenna port 1206 without filtering between the low-noise amplifier 1266 and the DL outside antenna port 1206. In another example, the DL BPF 1264 can be an FDD DL BPF configured to pass one or more of 3GPP FDD frequency bands 2, 4, 5, 12, 13, 17, 25, 26, or 71, wherein the one or more 3GPP frequency bands passed on the second DL path can be different from the 3GPP frequency bands passed on the first DL path. In another example, the DL BPF 1264 can be an FDD DL BPF configured to pass one or more of 3GPP FDD frequency bands 1-28, 30, 31, 65, 66, 68, 70-74, or 85, wherein the one or more 3GPP frequency bands passed on the second DL path can be different from the 3GPP frequency bands passed on the first DL path. In another example, the DL BPF 1264 can be an FDD DL BPF configured to pass a selected channel within a 3GPP FDD band, wherein the selected channel passed on the second DL path can be different from the selected channel passed on the first DL path. In another example, the DL BPF 1264 can be an FDD DL BPF configured to pass a selected frequency range within a 3GPP FDD band, wherein the selected frequency range passed on the second DL path can be different from the selected frequency range passed on the first DL path.

In another example, after traveling on the first DL path or the second DL path, the DL signal on the first DL path and the DL signal on the second DL path can be amplified and filtered in accordance with the type of amplifiers and BPFs included on the first DL path and the second DL path. The signal from the first DL path and the signal from the second DL path can be directed to a diplexer 1259. The diplexer 1259 can be a duplexer, a common direction duplexer, a diplexer, a multiplexer, a circulator, or a splitter. From the diplexer 1259, the combined DL signal can be directed to a duplexer 1212. The DL signal can be directed from the duplexer 1212 to an integrated device antenna 1210 or a bi-directional inside antenna 1210. The integrated device antenna 1210 can communicate the amplified and/or filtered DL signal to a UE.

In another example, a receive diversity DL outside antenna port 1269 or receive diversity DL node antenna port 1269 or receive diversity DL donor antenna port 1269 can be configured to be coupled to a receive diversity DL outside antenna 1270 or receive diversity DL node antenna 1270 or receive diversity DL donor antenna 1270. The receive diversity DL node antenna 1270 can be an omnidirectional antenna or directional antenna. The receive diversity DL node antenna 1270 can receive a DL signal from a base station. The receive diversity DL outside antenna port 1269 can be configured to be coupled to a diplexer 1271 that can be configured to direct a DL signal on a first receive diversity DL path or a second received diversity DL path. The diplexer 1271 can be a duplexer, a common direction duplexer, a diplexer, a multiplexer, a circulator, or a splitter.

In another example, the first receive diversity DL path can comprise one or more of a low-noise amplifier 1272, a DL band-pass filter (BPF) 1274, a variable attenuator 1276, or a power amplifier (PA) 1278. The low-noise amplifier 1272 can be a DL low-noise amplifier, the variable attenuator 1276 can be a DL variable attenuator, and the power amplifier 1278 can be a DL power amplifier. In another example, the power amplifier 1278 can comprise a variable gain power amplifier, a fixed-gain power amplifier, or a gain block. In another example, the low-noise amplifier 1272 can be configured to be coupled directly to a receive diversity DL outside antenna port 1269 without filtering between the low-noise amplifier 1272 and the receive diversity DL outside antenna port 1269. In another example, the DL BPF 1274 can be an FDD DL BPF configured to pass one or more of 3GPP FDD frequency bands 2, 4, 5, 12, 13, 17, 25, 26, or 71. In another example, the DL BPF 1274 can be an FDD DL BPF configured to pass one or more of 3GPP FDD frequency bands 1-28, 30, 31, 65, 66, 68, 70-74, or 85. In another example, the DL BPF 1274 can be an FDD DL BPF configured to pass a selected channel within a 3GPP FDD band. In another example, the DL BPF 1274 can be an FDD DL BPF configured to pass a selected frequency range within a 3GPP FDD band. In another example, in an alternative, the receive diversity DL path can comprise the receive diversity DL outside antenna port 1269 coupled to a bypass path coupled between the receive diversity DL inside antenna port 1292 and the receive diversity DL outside antenna port 1269. The bypass path can be configured to not amplify or filter signals traveling on the bypass path.

In another example, the second receive diversity DL path can comprise one or more of a low-noise amplifier 1273, a DL band-pass filter (BPF) 1275, a variable attenuator 1277, or a power amplifier (PA) 1279. The low-noise amplifier 1273 can be a DL low-noise amplifier, the variable attenuator 1277 can be a DL variable attenuator, and the power amplifier 1279 can be a DL power amplifier. In another example, the power amplifier 1279 can comprise a variable gain power amplifier, a fixed-gain power amplifier, or a gain block. In another example, the low-noise amplifier 1273 can be configured to be coupled directly to a receive diversity DL outside antenna port 1269 without filtering between the low-noise amplifier 1273 and the receive diversity DL outside antenna port 1269. In another example, the DL BPF 1275 can be an FDD DL BPF configured to pass one or more of 3GPP FDD frequency bands 2, 4, 5, 12, 13, 17, 25, 26, or 71, wherein the one or more 3GPP frequency bands passed on the second receive diversity DL path can be different from the 3GPP frequency bands passed on the first receive diversity DL path. In another example, the DL BPF 1275 can be an FDD DL BPF configured to pass one or more of 3GPP FDD frequency bands 1-28, 30, 31, 65, 66, 68, 70-74, or 85, wherein the one or more 3GPP frequency bands passed on the second receive diversity DL path can be different from the 3GPP frequency bands passed on the first receive diversity DL path. In another example, the DL BPF 1275 can be an FDD DL BPF configured to pass a selected channel within a 3GPP FDD band, wherein the selected channel passed on the second receive diversity DL path can be different from the selected channel passed on the first receive diversity DL path. In another example, the DL BPF 1275 can be an FDD DL BPF configured to pass a selected frequency range within a 3GPP FDD band, wherein the selected frequency range passed on the second receive diversity DL path can be different from the selected frequency range passed on the first receive diversity DL path. In another example, in an alternative, the receive diversity DL path can comprise the receive diversity DL outside antenna port 1269 coupled to a bypass path coupled between the receive diversity DL inside antenna port 1292 and the receive diversity DL outside antenna port 1269. The bypass path can be configured to not amplify or filter signals traveling on the bypass path.

In another example, after traveling on the first receive diversity DL path or the second receive diversity DL path, the receive diversity signal on the first receive diversity DL path and the DL signal on the second receive diversity DL path can be amplified and filtered in accordance with the type of amplifiers and BPFs included on the first receive diversity DL path and the second receive diversity DL path. The signal from the first receive diversity DL path and the signal from the second receive diversity DL path can be directed to a diplexer 1280. The diplexer 1280 can be a duplexer, a common direction duplexer, a diplexer, a multiplexer, a circulator, or a splitter. From the diplexer 1280, the combined receive diversity DL signal can be directed to a receive diversity device antenna port 1292 or a receive diversity downlink inside antenna port 1292. In another example, in an alternative, the receive diversity signal can travel on a bypass path coupled between the receive diversity DL inside antenna port 1292 and the receive diversity DL outside antenna port 1269, wherein the bypass path does not amplify or filter the receive diversity signal. The receive diversity device antenna port 1292 or a receive diversity downlink inside antenna port 1292 can be configured to be coupled to a receive diversity device antenna 1290 or a receive diversity downlink inside antenna 1290. The receive diversity device antenna 1290 can communicate the amplified and/or filtered or bypassed receive diversity DL signal to a UE.

Figure 12C:
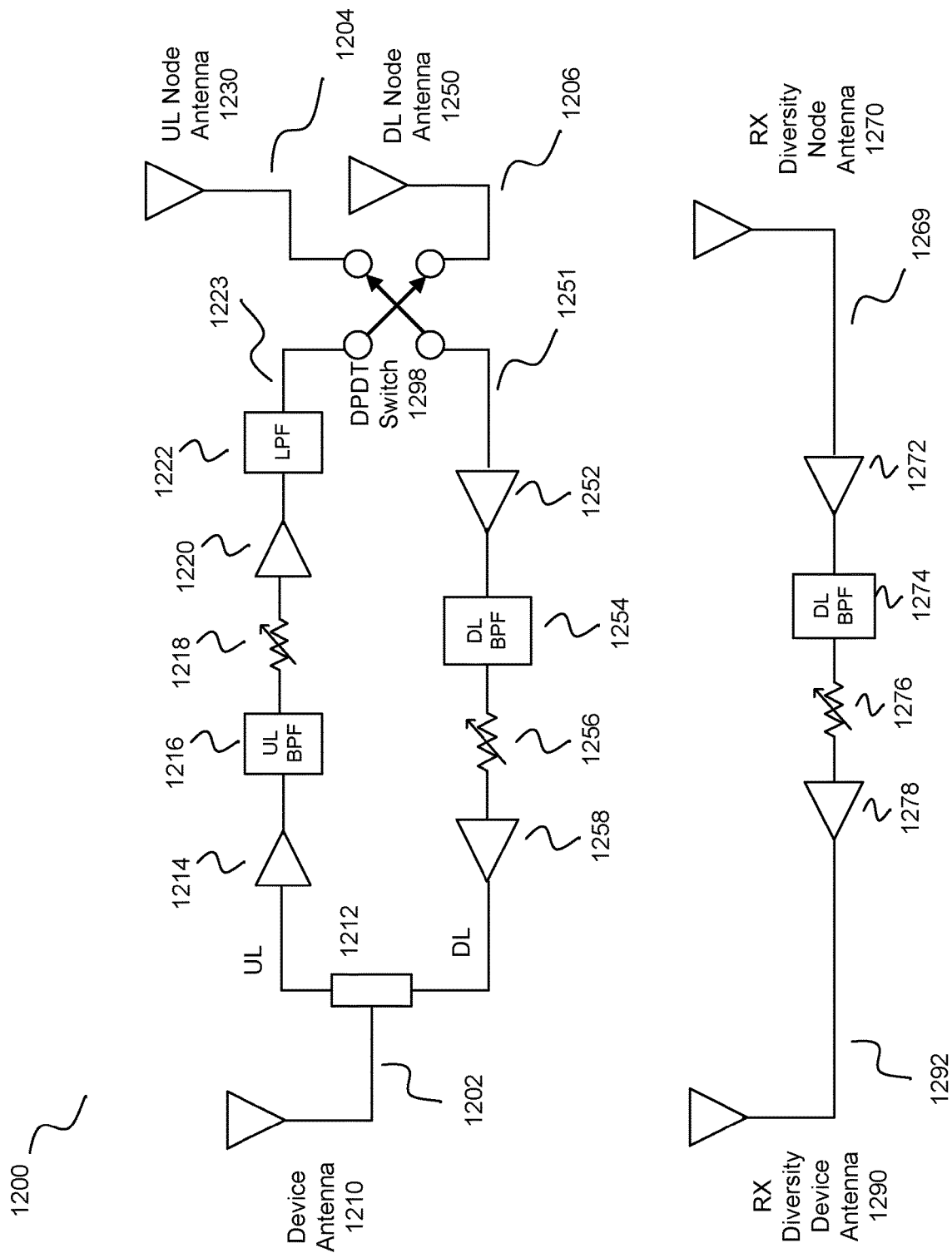
FIG. 12c illustrates a repeater with a receive diversity antenna port in accordance with an example.

In another example, as illustrated in FIG. 12c, a repeater can comprise a double-pole double-throw (DPDT) switch

1298. The output 1223 of the UL path can be configured to be coupled to the DPDT switch 1298. The DPDT switch 1298 can be configured to be coupled to an UL node antenna port 1204. The DL node antenna port 1206 can be configured to be coupled to the DPDT switch 1298. The DPDT switch 1298 can be configured to be coupled to an input 1251 of the DL path.

In another example, the DPDT switch 1298 can be configured to: allow the UL node antenna port 1204 to be coupled to the input 1251 of the DL path, and allow the DL node antenna port 1206 to be coupled to the output 1223 of the UL path. The UL node antenna port 1204 and the DL node antenna port can be switched based on whether the repeater is UL-limited or DL-limited. A repeater can be UL-limited when there is an insufficient power from the repeater to the base station. A repeater can be DL-limited when there is insufficient power from the base station to the repeater.

In one example, switching from the UL node antenna port 1204 to the DL node antenna port 1206 can allow the uplink amplification and filtering path to use the DL node antenna port 1206 when the repeater is UL-limited. In one example, switching from the DL node antenna port 1206 to the UL node antenna port 1204 can allow the downlink amplification and filtering path to use the UL node antenna port 1204 when the repeater is DL-limited. In one example, this kind of switching can increase the level of power from the repeater to the base station (when the repeater is UL-limited) and increase the level of power from the base station to the repeater (when the repeater is DL-limited) by using spatial diversity or polarization diversity.

Figure 12D:
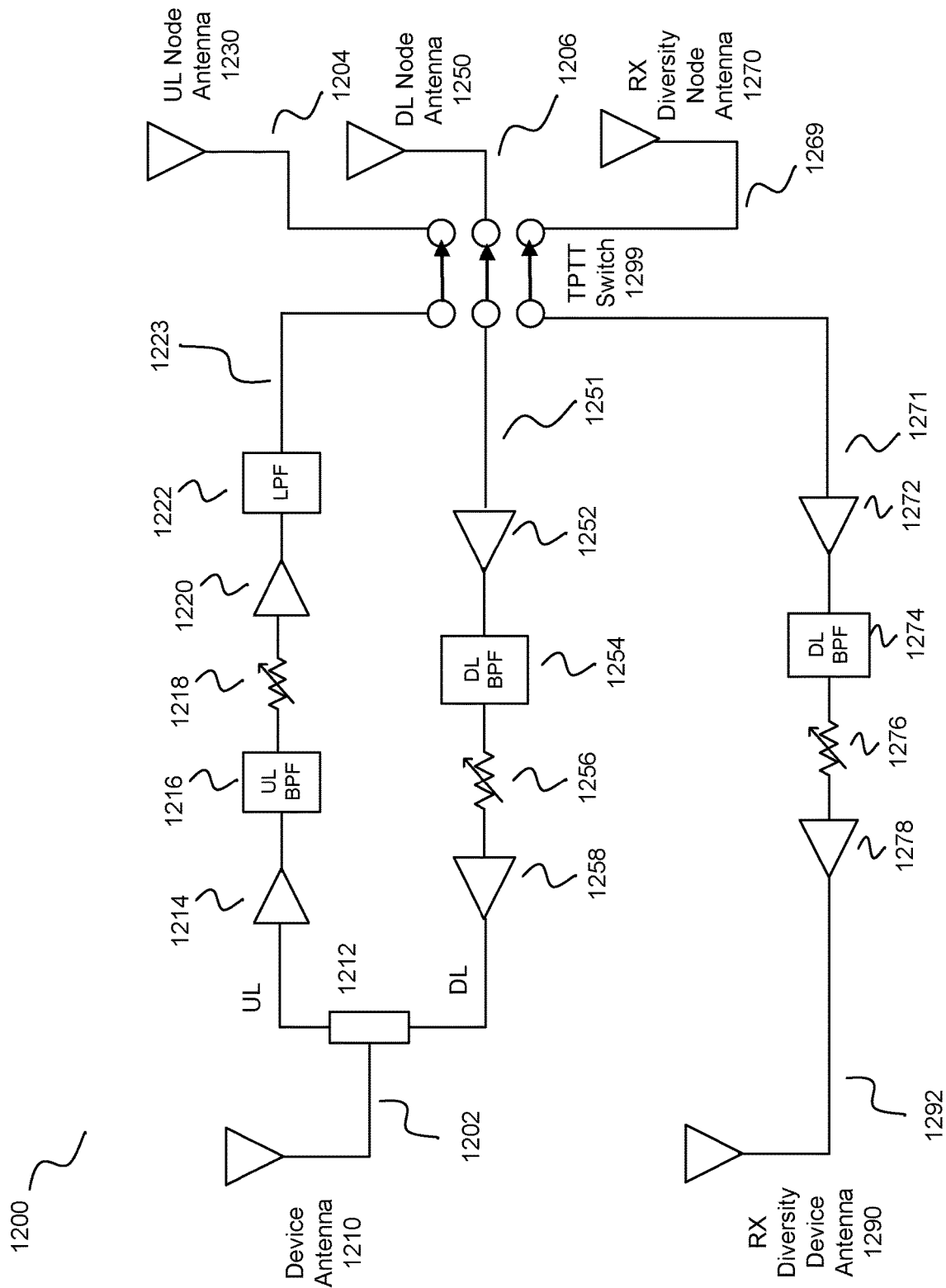
FIG. 12d illustrates a repeater with a receive diversity antenna port in accordance with an example.

In another example, as illustrated in FIG. 12*d*, a repeater can comprise a triple-pole triple-throw (TPTT) switch 1299. The output 1223 of the UL path can be configured to be coupled to the TPTT switch 1299. The TPTT switch 1299 can be configured to be coupled to an UL node antenna port 1204. The DL node antenna port 1206 can be configured to be coupled to the TPTT switch 1299. The TPTT switch 1299 can be configured to be coupled to an input 1251 of the DL path. The receive diversity node antenna port 1269 can be configured to be coupled to the TPTT switch 1299. The TPTT switch 1299 can be configured to be coupled to an input 1271 of the receive diversity DL path.

In another example, the TPTT switch 1299 can be configured to: allow the UL node antenna port 1204 to be coupled to the input 1251 of the DL path; allow the UL node antenna port 1204 to be coupled to the input 1271 of the receive diversity DL path. In another example, the TPTT switch 1299 can be configured to: allow the DL node antenna port 1206 to be coupled to the output 1223 of the UL path; allow the DL node antenna port 1206 to be coupled to the input 1271 of the receive diversity DL path. In another example, the TPTT switch 1299 can be configured to: allow the receive diversity node antenna port 1269 to be coupled to the input 1251 of the DL path; allow the receive diversity node antenna port 1269 to be coupled to the output 1223 of the UL path.

In one example, the UL node antenna port 1204, the DL node antenna port, and the receive diversity node antenna port 1269 can be switched based on whether the repeater is UL-limited or DL-limited. A repeater can be UL-limited when there is a low level of power from the repeater to the base station. A repeater can be DL-limited when there is a low level of power from the base station to the repeater. As previously discussed, antenna port switching can increase the level of power from the repeater to the base station (when the repeater is UL-limited) and increase the level of power from the base station to the repeater (when the repeater is DL-limited) by using spatial diversity or polarization diversity.

Figure 12E:
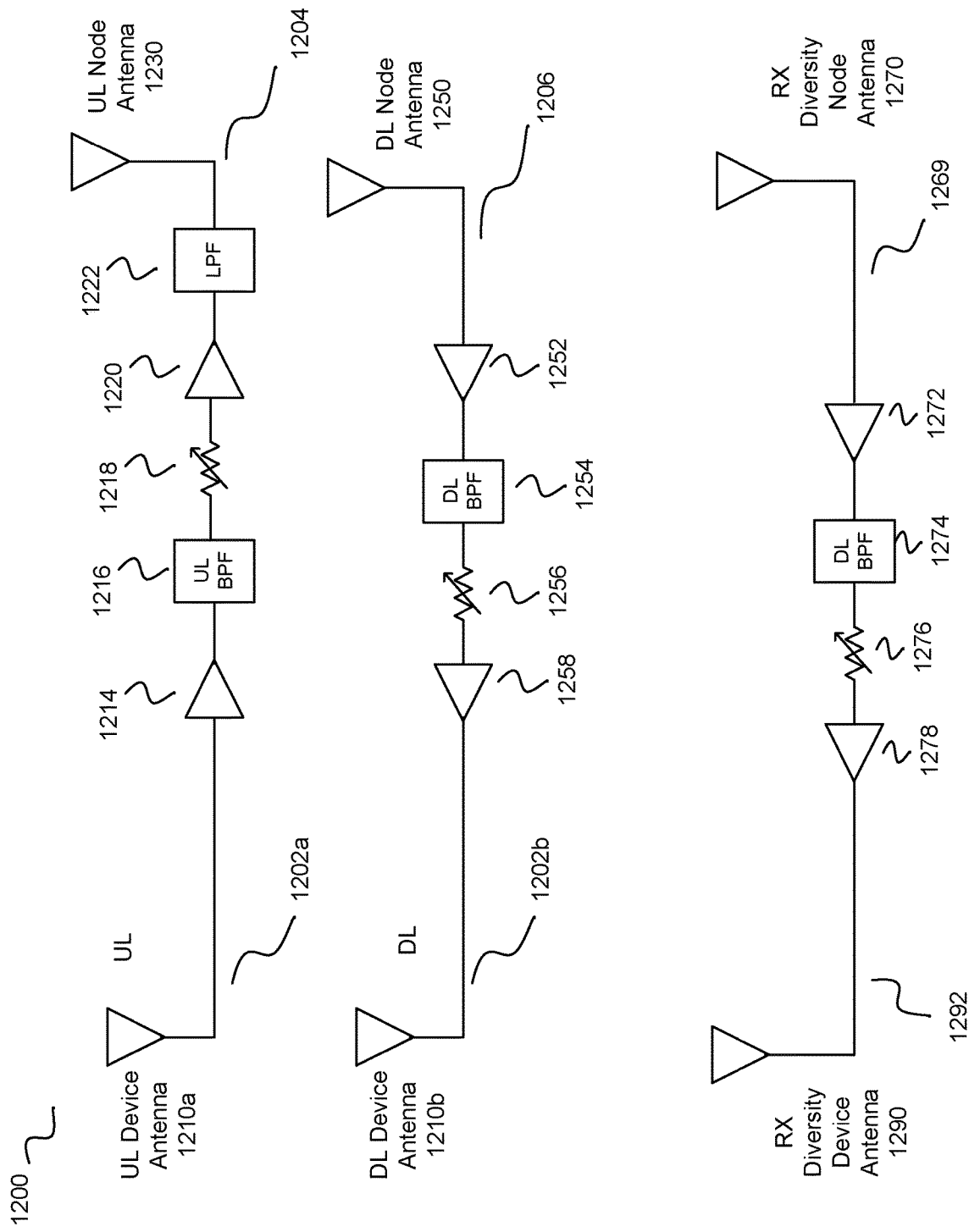
FIG. 12e illustrates a repeater with a receive diversity antenna port in accordance with an example.
Figure 12F:
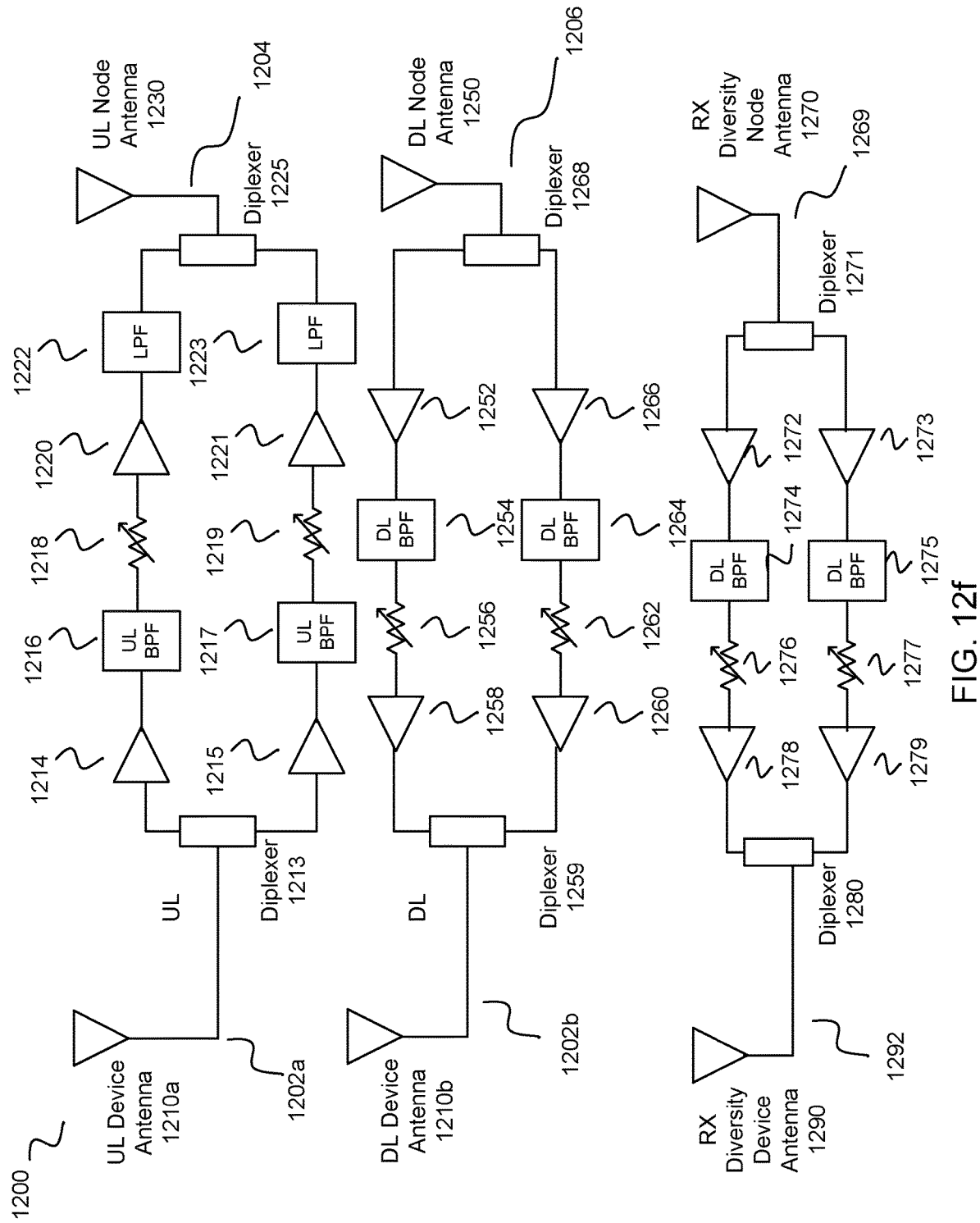
FIG. 12f illustrates a multiband repeater with a receive diversity antenna port in accordance with an example.
Figure 12G:
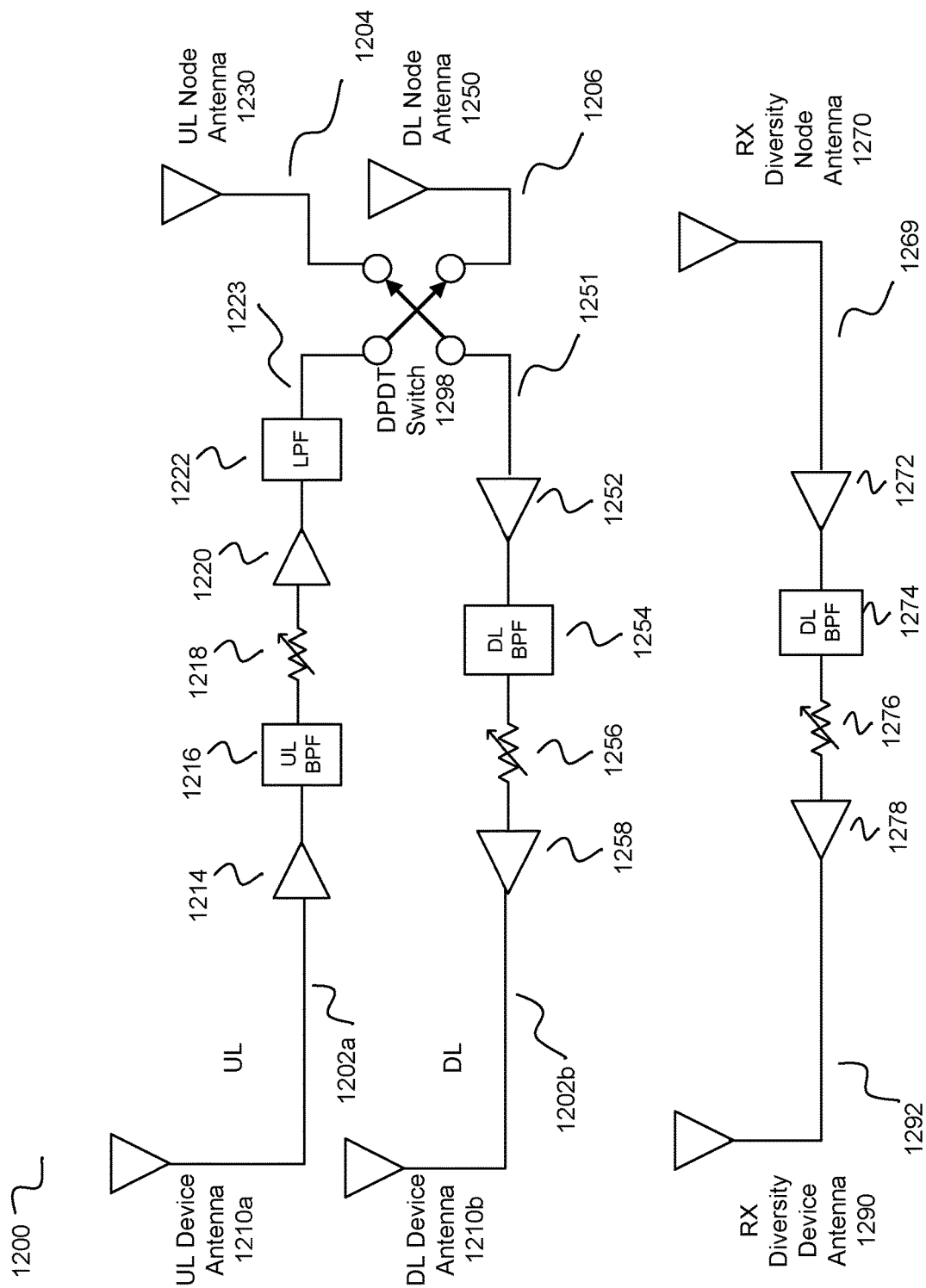
FIG. 12g illustrates a repeater with a receive diversity antenna port in accordance with an example.
Figure 12H:
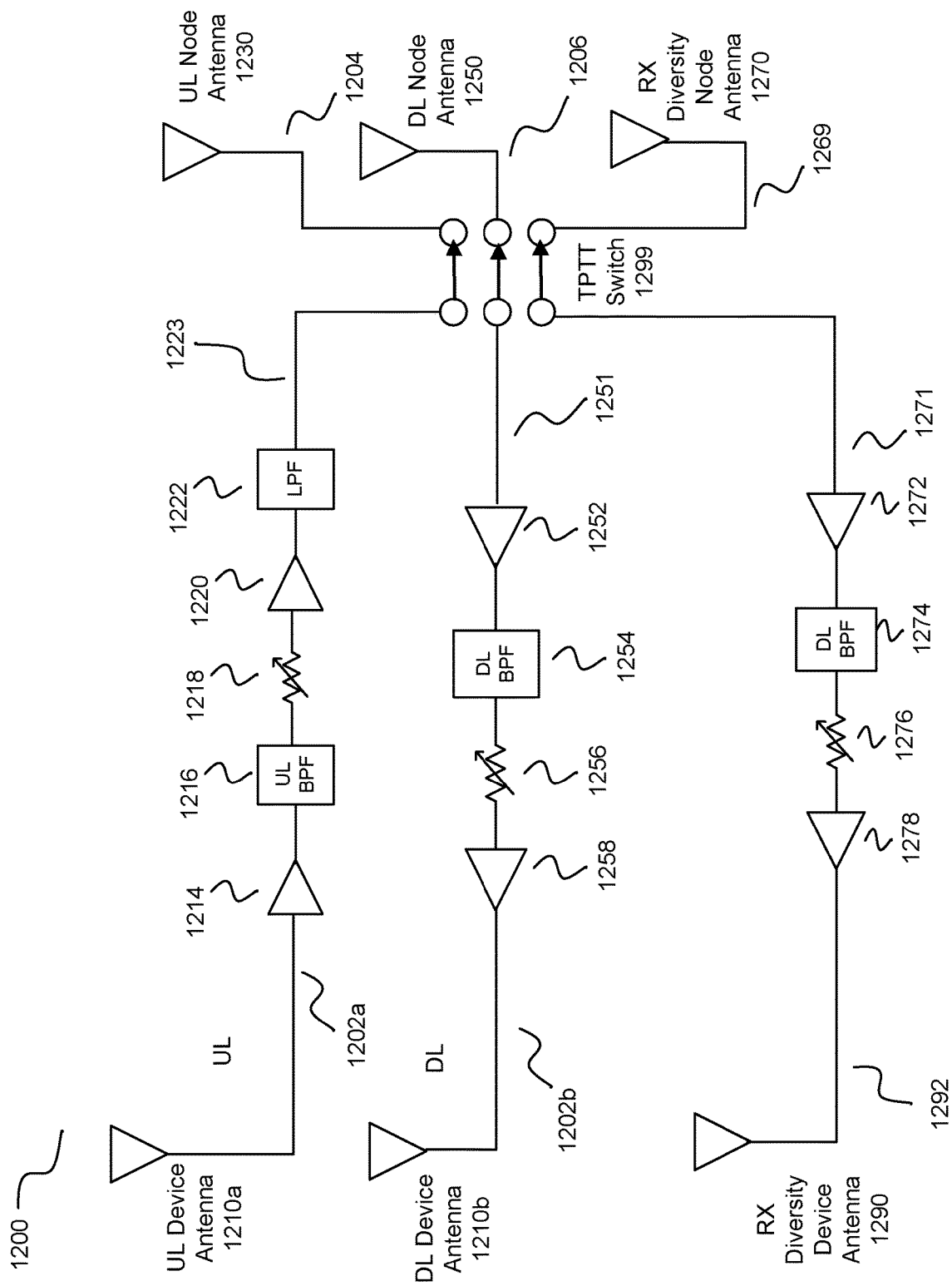
FIG. 12h illustrates a repeater with a receive diversity antenna port in accordance with an example.

In another example, as illustrated in FIG. 12*e*, FIG. 12*g*, and FIG. 12*h*, a repeater can comprise an integrated UL device antenna port 1202*a* or an integrated UL inside antenna port 1202*a*. The integrated UL device antenna port 1202*a* can be configured to be coupled to an integrated UL device antenna 1210*a* or an integrated UL inside antenna 1210*a*. The integrated UL device antenna port 1202*a* can be configured to be coupled to an input of a low-noise amplifier 1214.

In another example, a repeater can comprise an integrated DL device antenna port 1202*b* or an integrated DL inside antenna port 1202*b*. The integrated DL device antenna port 1202*b* can be configured to be coupled to an integrated DL device antenna 1210*b* or an integrated DL inside antenna 1210*b*. The integrated DL device antenna port 1202*b* can be configured to be coupled to an output of a power amplifier 1258.

In another example, as illustrated in FIG. 12*f*, a multiband repeater can comprise an integrated UL device antenna port 1202*a* or an integrated UL inside antenna port 1202*a*. The integrated UL device antenna port 1202*a* can be configured to be coupled to an integrated UL device antenna 1210*a* or an integrated UL inside antenna 1210*a*. The integrated UL device antenna port 1202*a* can be configured to be coupled to an input of a diplexer 1213.

In another example, a repeater can comprise an integrated DL device antenna port 1202*b* or an integrated DL inside antenna port 1202*b*. The integrated DL device antenna port 1202*b* can be configured to be coupled to an integrated DL device antenna 1210*b* or an integrated DL inside antenna 1210*b*. The integrated DL device antenna port 1202*b* can be configured to be coupled to an output of a diplexer 1259.

In one configuration, two or more BPFs can be stacked together or connected to form a multi-filter package (e.g., a SISO filter package). The multi-filter package can also be referred to as a dual-common port multi-bandpass filter. The dual-common port multi-bandpass filter can also include a dual-common port multi-low pass filter (LPF) or a dual-common port multi-high pass filter (HPF). Each of the BPFs within the multi-filter package can be configured to pass a selected frequency, such as an uplink band of a selected frequency band, or a downlink band of the selected frequency band. The multi-filter package can have a first common port and a second common port (e.g., on a left and right side of the multi-filter package, respectively). In an example in which the multi-filter package includes two BPFs that are stacked together in a single package, a first common port can have a first signal trace that connects the first common port to an input of a first BPF and an input of a second BPF. Similarly, a second signal trace can connect a second common port to an output of the first BPF and an output of the second BPF. In this example, the two BPFs can be positioned close to each other (e.g., less than 1 millimeter (mm) from each other for SAW/BAW filters or less than 10 mm for ceramic filters), and the two BPFs can be designed such that one of the BPFs can have a lower return loss in a selected frequency band (i.e. passband), while the other BPF can have a higher return loss (or poor return loss) on that same frequency band (i.e., stopband).

Thus, when an input signal enters the multi-filter package, the input signal can effectively "see" both of the BPFs. The signal can effectively travel towards a first BPF and a second BPF in the multi-filter package. However, the signal will take the path with the lower return loss or lower resistance between the available paths. In other words, when a passband signal enters the multi-filter package, the signal will effectively "see a wall" on one side of the multi-filter package (which corresponds to the path with higher return loss or higher resistance) and an open path on the other side of the multi-filter package (which corresponds to a path with a lower return loss or lower resistance).

While the term "input" and "output" are used with respect to a BPF, the terms are not intended to be limiting. A BPF may be configured to have a signal enter the input of the BPF and exit the output. Alternatively, a signal may enter the output of the BPF and exit the input. Thus, the terms "input" and "output" may be used interchangeably.

In one example, the BPFs in the multi-filter package can include SAW filters, BAW filters, ceramic filters, high pass filters (HPF), low pass filters (LPF), and/or discrete filters (e.g., composed of capacitors and inductors).

In one example, an input signal can have a signal associated with a selected frequency band. For example, a band 2 uplink (UL) signal can include a signal within the 3GPP LTE band 2 UL frequency range. A multi-filter package can include a band 2 UL bandpass filter, configured to pass signals within a frequency range of the band 2 UL range, and reject signals outside of this band. The multi-filter package can also include a band 4 UL bandpass filter, configured to pass signals within a frequency range of the 3GPP LTE band 4 UL frequency range, and reject signals outside of this band.

As an example, the multi-filter package can include a B1 UL BPF and a B2 UL BPF. If the signal that enters the multi-filter package is a B1 UL signal, the signal can pass through the B1 UL BPF in the multi-filter package due to the lower return loss that is designed in the B1 UL BPF for the frequency range of the B1 UL signal. Similarly, if the signal that enters the multi-filter package is a B2 UL signal, the signal can pass through the B2 UL BPF in the multi-filter package due to the lower return loss that is designed in the B2 UL BPF for the frequency range of the B2 UL signal. In addition, if the B1 UL signal or the B2 UL signal were to go to the B2 UL BPF or the B1 UL BPF, respectively, the UL signal would get reflected back and would then pass through the appropriate UL BPF.

In one example, the multi-filter package can include electrically short wires or signal traces that connect the first common port and the second common port to the first and second BPFs. In other words, the path from the first common port to the input of the first and second BPFs, and the path from the second common port to the output of the first and second BPFs can be electrically short. In one example, if the wires or signal traces were to become electrically long, the wires or signal traces can create phase and reflection problems. Thus, by keeping the wires or signal traces electrically short, these problems can be avoided and the signal can only travel on an incorrect path for a reduced period of time.

In one example, the electrically short wires or signal traces in the multi-filter package can be shorter than $1/10^{th}$ or $1/20^{th}$ or $1/100^{th}$ of a wavelength of the signal the electrically short wires are carrying. In one example, a 1 GHz wavelength is 300 mm, and the electrically short wires or signal traces can be shorter than 3 mm. Since the wires or signal traces are considerably shorter than the wavelength, an incoming signal can effectively see multiple paths at the same time, and the incoming signal can travel on a path with lower return loss or lower resistance.

In one example, the multi-filter package can include multiple separate bandpass filters, with each bandpass filter configured for a separate frequency band. Each separate frequency band can have a guard band between the frequency band (i.e. the frequency bands are non-adjacent). Each of the bandpass filters can be designed to have an input that is impedance matched to a first common port, and an output that is impedance matched to a second common port.

In another example, it can be difficult for multiple different bandpass filters, each with different passbands, to each be impedance matched to a common port. To overcome that limitation, the multi-filter package can include one or more matching networks. For example, a matching network can be coupled to inputs of two or more BPFs in the multi-filter package. A separate matching network can be coupled to the outputs of two or more BPFs in the multi-filter package. The matching network(s) can each be a separate module that is external to the BPFs, but within the multi-filter package. The matching network(s) can include series inductors and/or shunt capacitors, which can function to impedance match the inputs of the BPFs in the multi-filter package to the first common port and/or impedance match the outputs of the BPFs in the multi-filter package to the second common port. The impedance matching can be between a common port and each individual BPF port. In other words, each BPF can be matched to a common port, and not to other BPFs. The impedance matching provided by the matching network(s) can enable a signal to travel through a BPF on a lower return loss path in the multi-filter package and bypass a BPF on a higher return loss path of the multi-filter package. Depending on the combination of BPFs in the multi-filter package, the matching implementation can be designed accordingly.

As used herein, the term "connected" typically refers to two devices that are directly electrically connected. The term "communicatively coupled" or "coupled" refers to two devices that are electrically connected, with additional electrical components located between the two devices. However, the terms are meant to be descriptive and are not intended to be limiting. The terms "coupled", "communicatively coupled", and "connected" may be used interchangeably.

In one configuration, two or more sets of BPFs can be packaged together or connected to form a multi-common port multi-filter package (e.g., a DISO filter package). For example, a first set of BPFs consisting of two or more BPFs can be connected to a second set of BPFs consisting of one or more BPFs. The first set of BPFs can include DL BPFs and the second set of BPFs can include UL BPFs, or vice versa. The multi-filter package can include a first common port that connects to the first and second set of BPFs, a second common port that connects to the first set of BPFs and a third common port that connects to the second set of BPFs. The wires or signal traces that connect the first, second, and third common ports to each BPF in the first and second sets of BPFs, respectively, can be electrically short. In addition, the multi-filter package can include a matching network that is coupled to the first set of BPFs in the multi-filter package and/or a matching network that is coupled to the second set of BPFs in the multi-filter package.

As an example, the multi-filter package can include a first set of BPFs that includes a B2 UL BPF and a B4 UL BPF, as well as a second set of BPFs that includes a B12 DL BPF and a B13 DL BPF. Due to the matching network(s) and the electrically short wires or signal traces, a signal that enters the multi-filter package can pass through an appropriate BPF and bypass the other BPFs in the multi-filter package. For example, an UL signal will pass through one of the UL BPFs with a passband within the signal's band, and bypass the DL BPFs. Similarly, a DL signal will pass through one of the DL BPFs associated with the signal's band, and bypass the UL BPFs. Furthermore, due to the use of matching network(s) and the electrically short wires or signal traces, an UL signal can pass through an appropriate UL BPF and bypass other UL BPFs in the multi-filter package, and similarly, a DL signal can pass through an appropriate DL BPF and bypass other DL BPFs in other frequency bands in the multi-filter package.

Figure 13A:
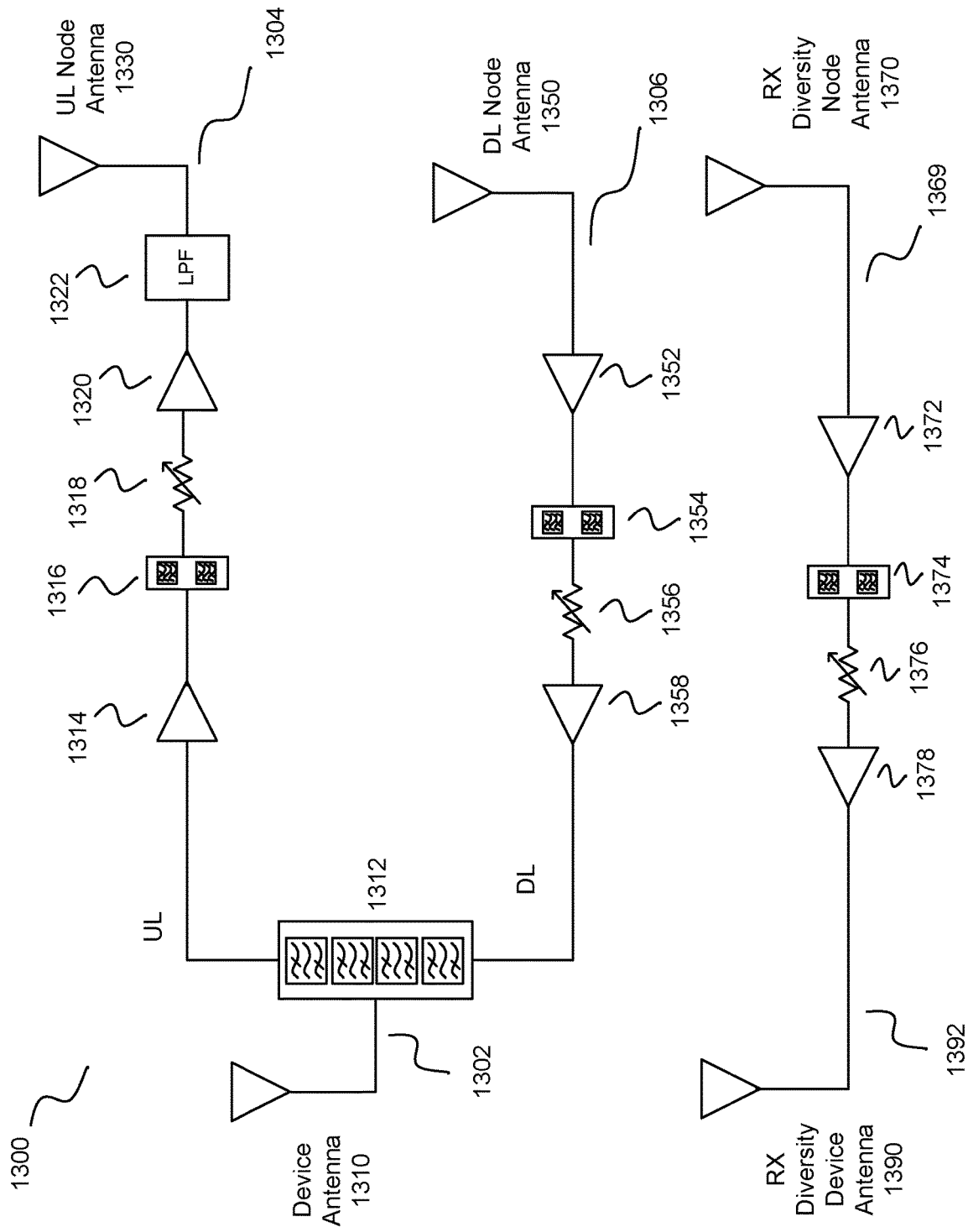
FIG. 13a illustrates a multiband repeater with a receive diversity antenna port in accordance with an example.

In another example, as illustrated in FIG. 13a, a multiband repeater can comprise a receive diversity antenna port. In this example, a bi-directional inside antenna port 1302 or bi-directional device antenna port 1302 can be configured to be coupled to an integrated device antenna 1310 or a bi-directional inside antenna 1310. In another example, in an alternative, the bi-directional inside antenna port 1302 can be replaced by an UL inside antenna port and a DL inside antenna port, wherein the UL inside antenna port is separate from the DL inside antenna port, and the UL inside antenna port can be further configured to be coupled to an UL inside antenna and the DL inside antenna port can be further configured to be coupled to a DL inside antenna.

The integrated device antenna 1310 can receive an UL signal from a UE. The bi-directional inside antenna port 1302 can be configured to be coupled to a multi-common port multi-filter package 1312. In another example, in an alternative, the bi-directional inside antenna port 1302 can be configured to be coupled to a splitter. The multi-common port multi-filter package 1312 can direct a signal into an UL path or from a DL path. In one example, the multi-common port multi-filter package 1312 can be used to separate the UL and DL paths. The separation of the UL and DL paths using the multi-common port multi-filter package 1312 can be used to separate the UL and DL paths with lower loss and higher UL to DL isolation than using a splitter. In addition, in this example, the multi-common port multi-filter package 1312 can be modified to have fewer outputs for a multiband repeater. For example, in a repeater having two uplink bands and two downlink bands, the multi-common port multi-filter package 1312 can have two outputs, rather than four outputs that would be typical when using a multiplexer. The signals in the UL and DL can be combined into common UL ports and DL ports, respectively. The combining can be achieved through impedance matching at the filter outputs in the multi-common port multi-filter package.

Figure 13E:
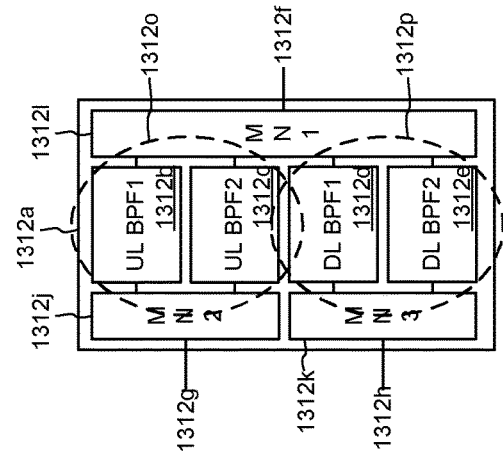
FIGS. 13b to 13e illustrate multi-filter packages in accordance with an example.
Figure 13B:
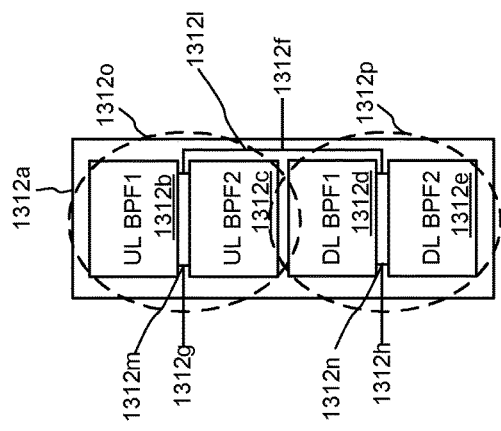

FIGS. 13b to 13e illustrate examples of multi-common port multi-filter packages. One or more multi-filter package(s) 1312a can be included in a repeater (i.e. signal booster or bidirectional amplifier). The multi-filter package 1312a can be communicatively coupled to a first interface port of the repeater. As shown in FIG. 13b, the multi-filter package 1312a can include a first common port 1312f, a second common port 1312g, and a third common port 1312h. The first common port 1312f can be communicatively coupled to the first interface port of the repeater. The first common port 1312f can also be communicatively coupled to a first set of filters 1312o in the multi-filter package 1312a, such as a first UL BPF (UL BPF1) 1312b and a second UL BPF (UL BPF2) 1312c, as well as to a second set of filters 1312p in the multi-filter package 1312a, such as a first DL BPF (DL BPF1) 1312d and a second DL BPF (DL BPF2) 1312e. Furthermore, the second common port 1312g can be communicatively coupled to a second interface port of the repeater and the first set of filters 1312o in the multi-filter package 1312a. The third common port 1312h can be communicatively coupled to the second interface port of the repeater and the second set of filters 1312p in the multi-filter package 1312a.

In one example, as shown in FIG. 13b, the multi-filter package 1312a can include a first signal trace 1312l, a second signal trace 1312m and a third signal trace 1312n. The first signal trace 1312l can be coupled between the first common port 1312f, and each filter in the first set of filters 1312o and each filter in the second set of filters 1312p in the multi-filter package 1312a. The second signal trace 1312m can be coupled between the second common port 1312g, and each filter in the first set of filters 1312o in the multi-filter package 1312a. The third signal trace 1312n can be coupled between the third common port 1312h, and each filter in the second set of filters 1312p in the multi-filter package 1312a.

In one example, a length of the first signal trace 1312l from the first common port 1312f to each filter in the first set of filters 1312o and the second set of filters 1312p in the multi-filter package 1312a can have a substantially equal length (e.g., less than 10 mm+/−0.5 mm or less than 5 mm+/−0.25 mm). In another example, a length of the second signal trace 1312m from the second common port 1312g to each filter in the first set of filters 1312o in the multi-filter package 1312a can have a substantially equal length (e.g., less than 5 mm+/−0.25 mm). In yet another example, a length of the third signal trace 1312n from the third common port 1312h to each filter in the second set of filters 1312p in the multi-filter package 1312a can have a substantially equal length (e.g., less than 5 mm+/−0.25 mm). In a further example, a length of each of the first signal trace 1312l, the second signal trace 1312m and the third signal trace 1312n can be less than 10 mm+/−0.5 mm or less than 5 mm+/−0.25 mm.

Figure 13D:
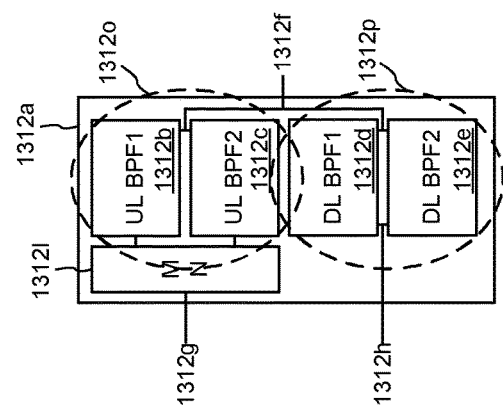
Figure 13C:
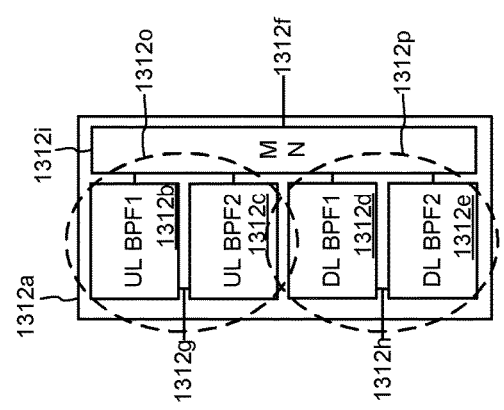

In one example, as shown in FIG. 13c, the first common port 1312f can be coupled to a matching network 1312i. The matching network 1312i can be coupled to the first set of filters 1312o in the multi-filter package 1312a, such as the first UL BPF (UL BPF1) 1312b and the second UL BPF (UL BPF2) 1312c, as well as the second set of filters 1312p in the multi-filter package 1312a, such as the first DL BPF (DL BPF1) 1312d and the second DL BPF (DL BPF2) 1312e. Each BPF in the multi-filter package 1312a can be configured to filter one or more bands in one or more signals. Each of the bands can be non-spectrally adjacent, as previously discussed. The matching network 1312i can be configured to provide impedance matching for the inputs/outputs of the first set of filters 1312o and the second set of filters 1312p in the multi-filter package 1312a with the first common port 1312f. Furthermore, in this example, the second common port 1312g and the third common port 1312h may not be coupled to matching networks. Accordingly, the input/outputs of the first set of BPFs 1312o can be impedance matched to the common port 1312i. The input/outputs of the second set of BPFs 1312p can be impedance matched to the third common port 1312h.

In one example, as shown in FIG. 13d, the second common port 1312g can be coupled to a matching network 1312i. In this example, the matching network 1312i can be coupled to and impedance matched with the inputs/outputs of the first set of filters 1312o in the multi-filter package 1312a, such as the first UL BPF (UL BPF1) 1312b and the second UL BPF (UL BPF2) 1312c. Alternatively, or in addition, the third common port 1312h can be coupled to the matching network 1312i. The matching network 1312i can be coupled to and impedance matched with the inputs/outputs of the second set of filters 1312p in the multi-filter package 1312a, such as the first DL BPF (DL BPF1) 1312d and the second DL BPF (DL BPF2) 1312e. In this example, the first common port 1312f and the third common port 1312h may not be coupled to matching networks. Accordingly, the first common port 1312*f* may be impedance matched directly to the inputs/outputs of the UL BPF1 1312*b*, UL BPF2 1312*c*, DL BPF1 1312*d*, and DL BPF2 1312*e*. In addition, the third common port 1312*h* may be impedance matched directly to the inputs/outputs of the DL BPF1 1312*d* and DL BPF2 1312*e*.

In one example, as shown in FIG. 13*e*, the first common port 1312*f* can be coupled to a first matching network 1312*i*, the second common port 1312*g* can be coupled to a second matching network 1312*j*, and the third common port 1312*h* can be coupled to a third matching network 1312*k*. The first matching network 1312*i* can be coupled to and impedance matched with the inputs/outputs of the first set of filters 1312*o* in the multi-filter package 1312*a*, such as the first UL BPF (UL BPF1) 1312*b* and the second UL BPF (UL BPF2) 1312*c*, as well as the second set of filters 1312*p* in the multi-filter package 1312*a*, such as the first DL BPF (DL BPF1) 1312*d* and the second DL BPF (DL BPF2) 1312*e*. The second matching network 1312*j* can be coupled to and impedance matched with the inputs/outputs of the first set of filters 1312*o* in the multi-filter package 1312*a*. The third matching network 1312*k* can be coupled to and impedance matched with the inputs/outputs of the second set of filters 1312*p* in the multi-filter package 1312*a*.

In one example, each filter in the multi-filter package 1312*a* can have an input that is impedance matched to one or more of a first, second, or third common port of the multi-filter package 1312*a* and/or each filter in the multi-filter package 1312*a* can have an output that is impedance matched to another of the first, second, or third common port in the multi-filter package 1312*a*.

In one configuration, as shown in FIGS. 13*b* to 13*e*, multi-filter package(s) 1312*a* can include a first impedance-matched filter set (e.g., the first set of filters 1312*o*), and a second impedance-matched filter set (e.g., the second set of filters 1312*p*). The first common port 1312*f* can be coupled to the first and the second impedance-matched filter sets, the second common port 1312*g* can be coupled to the first impedance-matched filter set, and the third common port 1312*h* can be coupled to the second impedance-matched filter set. In one example, the multi-filter package 1312*a* can include two or more impedance-matched uplink bandpass filters, with each uplink bandpass filter configured to pass one or more uplink bands, respectively, and two or more impedance-matched downlink bandpass filters, with each bandpass filter configured to pass one or more downlink bands, respectively. Accordingly, the multi-filter package 1312*a* can be configured to separately filter each of the bands of a signal with two or more downlink bands and two or more uplink bands.

In another example, an UL path can comprise one or more of a low-noise amplifier 1314, an UL dual-common port multi-bandpass filter 1316, a variable attenuator 1318, a power amplifier (PA) 1320, or a low-pass filter (LPF) 1322. The low-noise amplifier 1314 can be an UL low-noise amplifier, the variable attenuator 1318 can be an UL variable attenuator, the power amplifier 1320 can be an UL power amplifier, and the low-pass filter 1322 can be an UL low-pass filter or low-order filtering. In another example, the power amplifier 1320 can comprise a variable gain power amplifier, a fixed-gain power amplifier, or a gain block. In another example, the LPF 1322 can be configured to be coupled between the power amplifier 1320 and an UL outside antenna port 1304 or UL node antenna port 1304 to filter harmonics emitted by the power amplifier 1320. While a low pass filter is described in this example, it is not intended to be limiting. A low-order filter can be used to filter the harmonics. The low order filter can include one or more high pass filter poles and one or more low pass filter poles. The low-order filter can be configured to have low loss since it is located after the power amplifier 1320. In another example, the power amplifier 1320 can be configured to be coupled directly to the UL outside antenna port 1304 without filtering between the power amplifier 1320 and the UL outside antenna port 1304.

In another example, the UL dual-common port multi-bandpass filter 1316 can include a first bandpass filter for a first frequency (e.g., B1) a second band-pass filter for a second frequency (e.g., B2), and additional bandpass filters for additional bands, if desired. The UL dual-common port multi-bandpass filter 1316 can comprise a plurality of filters located in a single package. Each filter in the single package can be designed and configured to operate with other filters in the package. For example, each filter can be impedance matched with the other filters in the package to enable the filters to properly function within the same package. Each filter can be configured to provide a bandpass for a selected band that is non-frequency adjacent with the bandpass bands of other filters in the single package. The UL dual-common port multi-bandpass filter 1316 can be configured to pass two or more of 3GPP FDD frequency bands 2, 4, 5, 12, 13, 17, 25, 26, or 71. In another example, the UL dual-common port multi-bandpass filter 1316 can be configured to pass two or more of 3GPP FDD frequency bands 1-28, 30, 31, 65, 66, 68, 70-74, or 85. In another example, the UL dual-common port multi-bandpass filter 1316 can be configured to pass two or more selected channels within a 3GPP FDD band. In another example, the UL dual-common port multi-bandpass filter 1316 can be configured to pass two or more selected frequency ranges within a 3GPP FDD band.

FIGS. 13*f* to 13*i* illustrate examples of dual-common port multi-filter packages. One or more multi-filter package(s) 1316*a* can be included in a repeater (i.e. signal booster or bidirectional amplifier). The multi-filter package 1316*a* can be communicatively coupled to a first interface port of the repeater. The first interface port can communicate one or more signals that include multiple bands. Each signal may communicate a single band, or multiple bands.

As shown in FIG. 13*f*, the multi-filter package 1316*a* can include a first common port 1316*b* and a second common port 1316*c*. The first common port 1316*b* can be coupled to the first interface port and an input to two or more filters in the multi-filter package 1316*a*, such as a first BPF (BPF1) 1316*d* and a second BPF (BPF2) 1316*e* in the multi-filter package 1316*e*. The first BPF (BPF1) 1316*d* and the second BPF (BPF2) 1316*e* can be configured to filter one or more bands in one or more signals. The second common port 1316*c* can be coupled to a second interface port of the repeater, where the second interface can communicate the one or more signals, as well as to an output of the two or more filters in the multi-filter package 1316*a*.

In one example, as shown in FIG. 13*f*, the multi-filter package 1316*a* can include a first signal trace 1316*h* and a second signal trace 1316*i*. The first signal trace 1316*h* can be coupled between the first common port 1316*b*, and then divide to couple to the input of the two or more filters in the multi-filter package 1316*a*. Furthermore, the second signal trace 1316*i* can be coupled between the second common port 1316*c*, and then divide to couple to the output of the two or more filters in the multi-filter package 1316*a*.

In one example, a length of the first signal trace 1316*h* from the first common port 1316*b* to the input to each of the two or more filters in the multi-filter package 1316*a* can have a substantially equal length (e.g., less than 5 mm in length with a difference in length of less than +/−0.25 mm). In another example, a length of the second signal trace 1316*i* from the second common port 1316*c* to the output of each of the two or more filters in the multi-filter package 1316*a* can have a substantially equal length (e.g., less than 5 mm in length with a difference of less than +/−0.25 mm). In yet another example, a length of each of the first signal trace 1316*h* and the second signal trace 1316*i* can be less than 2 millimeters (mm) in length.

In one example, the multi-filter package 1316*a* can be associated with at least one of a high band frequency or a low band frequency.

In one example, as shown in FIG. 13*f*, the multi-filter package 1316*a* can include two or more impedance-matched uplink bandpass filters for two or more uplink bands, respectively. Alternatively, the multi-filter package 1316*a* can include two or more impedance-matched downlink bandpass filters for two or more downlink bands, respectively. The impedance-matched filters can each have an input 1316*h* that is impedance matched to the first common port 1316*b*, and an output 1316*i* that is impedance matched to the second common port 1316*c*.

In one example, as shown in FIG. 13*g*, the multi-filter package 1316*a* can include a matching network 1316*f*. The matching network 1316*f* can be coupled to an input of the two or more filters in the multi-filter package 1316*a*, such as the first BPF (BPF1) 1316*d* and the second BPF (BPF2) 1316*e* in the multi-filter package 1316*a*. The matching network 1316*f* can be configured to impedance match the input of each of the two or more filters in the multi-filter package 1316*a* to the first common port 1316*b*.

In one example, as shown in FIG. 13*h*, the multi-filter package 1316*a* can include a matching network 1316*f*. The matching network 1316*f* can be coupled to the output of the two or more filters in the multi-filter package 1316*a*, such as the first BPF (BPF1) 1316*d* and the second BPF (BPF2) 1316*e* in the multi-filter package 1316*a*. The matching network 1316*f* can be operable to impedance match the two or more filters in the multi-filter package 1316*a*.

In one example, each filter in the multi-filter package 1316*a* (e.g., the first BPF (BPF1) 1316*d* and the second BPF (BPF2) 1316*e*) can have an input that is impedance matched to inputs of other filters in the multi-filter package 1316*a* and/or each filter in the multi-filter package 1316*a* can have an output that is impedance matched to outputs of other filters in the multi-filter package 1316*a*.

Figure 13J:
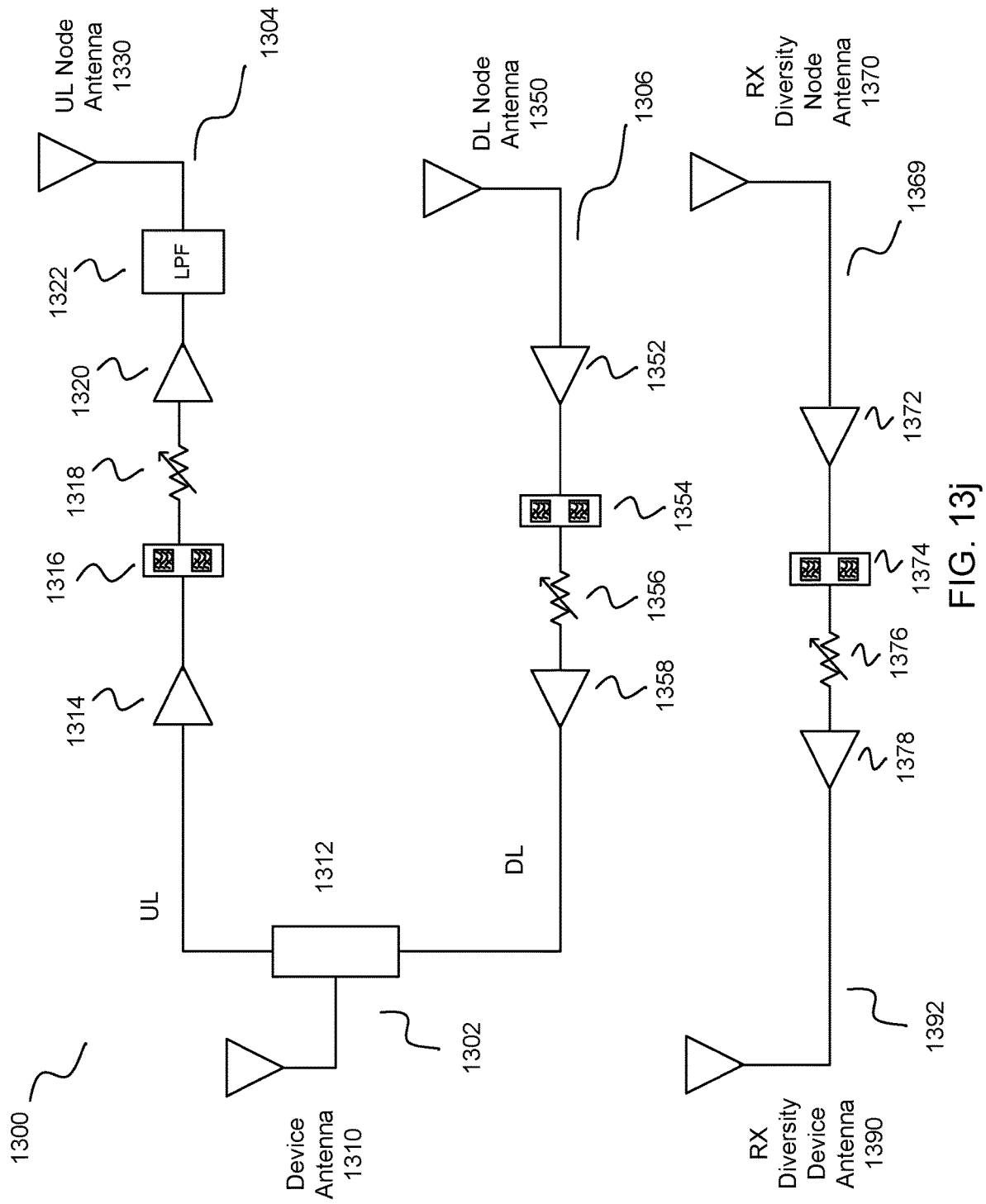
FIG. 13j illustrates a multiband repeater with a receive diversity antenna port in accordance with an example.
Figure 13K:
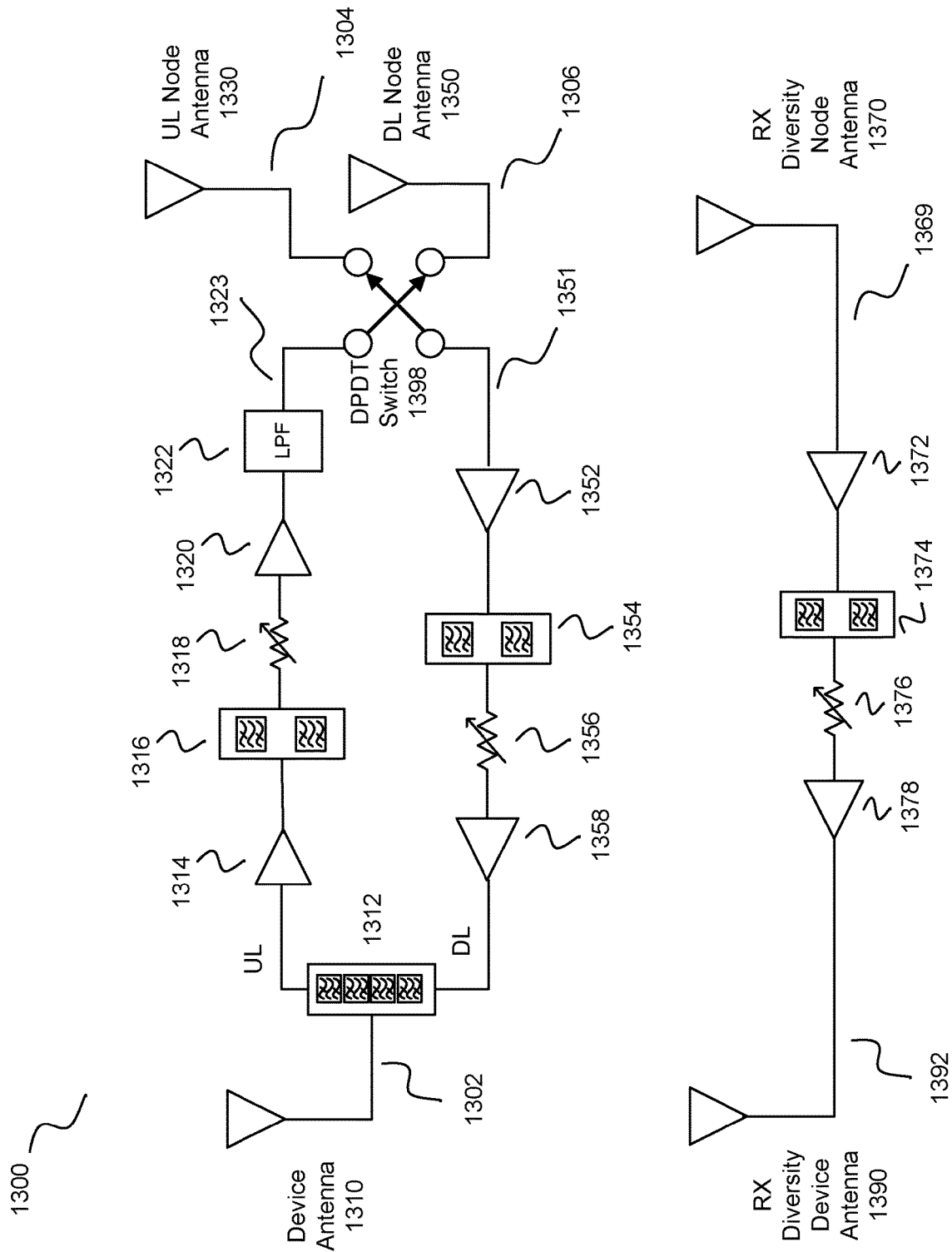
FIG. 13k illustrates a multiband repeater with a receive diversity antenna port in accordance with an example.
Figure 13I:
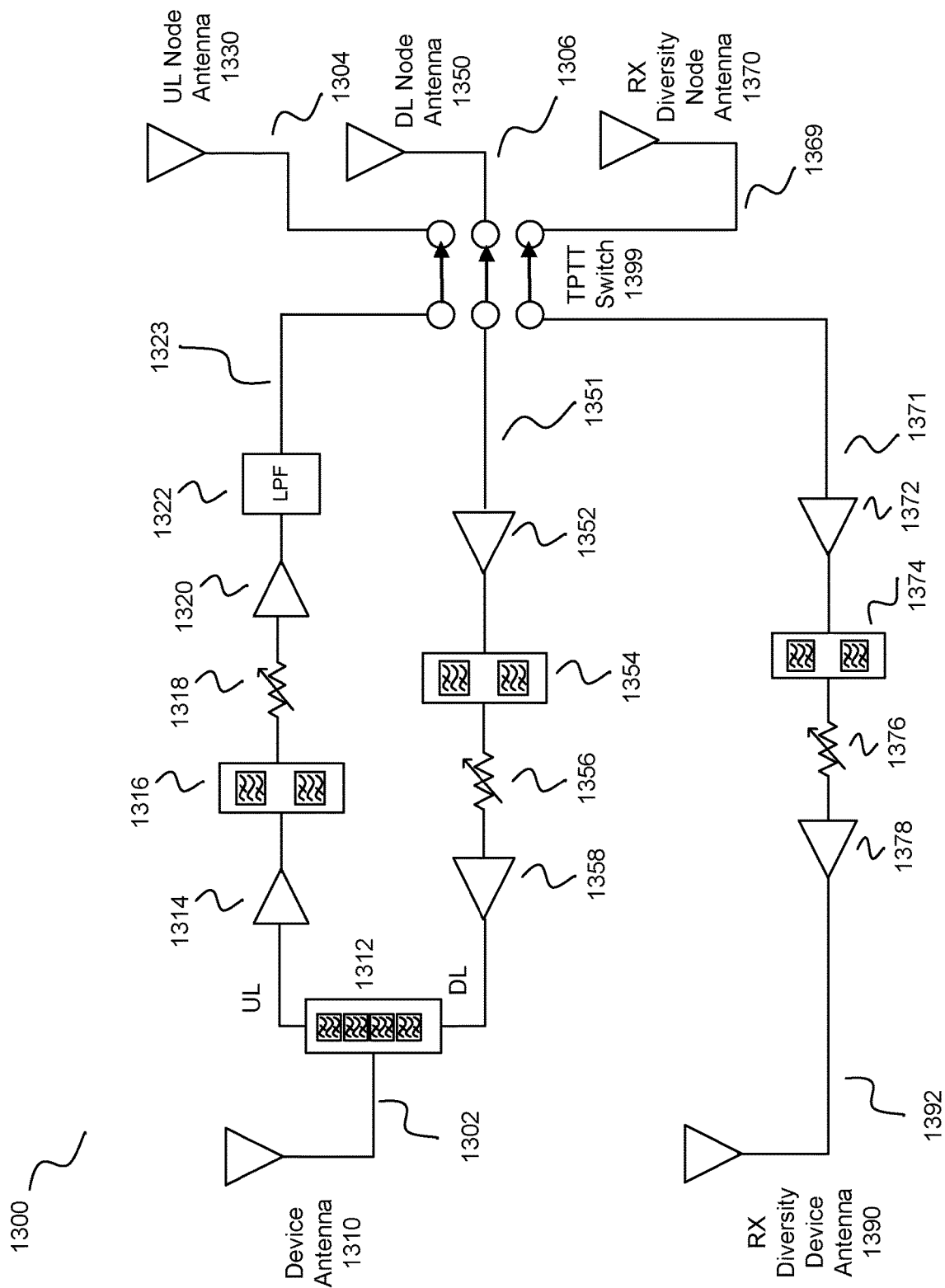

In one example, as shown in FIG. 13*i*, the multi-filter package 1316*a* can include a first matching network 1316*f* and a second matching network 1316*g*. The first matching network 1316*f* can be coupled to the input of the two or more filters in the multi-filter package 1316*a*, such as the first BPF (BPF1) 1316*d* and the second BPF (BPF2) 1316*e* in the multi-filter package 1316*a*, and the second matching network 1316*g* can be coupled to the output of the two or more filters in the multi-filter package 1316*a*. Each of the matching networks can impedance match the input/output to the associated common port.

In one configuration, as shown in FIGS. 13*f* to 13*i*, multi-filter package(s) 1316*a* can include an impedance-matched filter set (e.g., the first BPF (BPF1) 1316*d* and the second BPF (BPF2) 1316*e*) with the first common port 1316*b* and the second common port 1316*c*.

In one example, the impedance-matched filter set can refer to a set of two or more filters in the multi-filter package 1316*a*, wherein each filter in the set can have filter input that is impedance matched with a common port and a filter output that is impedance matched with a separate common port. The impedance matching can be accomplished at the filter, or using an impedance matching network within the multi-filter package 1316*a* that is coupled to the set of two or more filters, to enable a single common input and a single common output for the impedance-matched filter set. Accordingly, the multi-filter package 1316*a* can be configured to separately filter each of the bands of a signal with two or more downlink bands or two or more uplink bands.

In one example, the uplink bands can be combined using the dual-common port multi-bandpass filters. Rather than using a separate UL amplifier and filter chain for each band, channel, or frequency range, a single amplifier chain can be used with the dual-common port multi-bandpass filters capable of filtering the multiple bands, channels, or frequency ranges. This line-sharing technique simplifies the architecture, the number of components, and the layout of the repeater. In addition, line-sharing due to the combined filters can allow for additional component sharing, such as RF amplifiers (gain blocks), RF attenuators, RF detectors, and the like. With fewer components, the repeater can have a higher overall reliability and a lower overall cost.

In another example, after traveling on the UL path, the UL signal on the UL path can be amplified and filtered in accordance with the type of amplifiers and dual-common port multi-bandpass filters included on the UL path. The signal from the UL path can be directed to an UL node antenna port 1304. The UL signal can be directed from the UL node antenna port 1304 to an integrated UL node antenna 1330 or an UL outside antenna 1330. The UL node antenna 1330 can be an omnidirectional antenna or a directional antenna. The UL outside antenna 1330 can communicate the amplified and/or filtered UL signal to a base station.

In another example, an integrated DL node antenna port 1306 or DL outside antenna port 1306 can be configured to be coupled to an integrated DL node antenna 1350 or a DL outside antenna 1350. The integrated DL node antenna 1350 can be an omnidirectional antenna or directional antenna. The integrated DL node antenna 1350 can receive a DL signal from a base station. The DL outside antenna port 1306 can be configured to be coupled to an input of a low-noise amplifier 1352.

In another example, the DL path can comprise one or more of a low-noise amplifier 1352, a DL dual-common port multi-bandpass filter 1354, a variable attenuator 1356, or a power amplifier (PA) 1358. The low-noise amplifier 1352 can be a DL low-noise amplifier, the variable attenuator 1356 can be a DL variable attenuator, and the power amplifier 1358 can be a DL power amplifier. In another example, the power amplifier 1358 can comprise a variable gain power amplifier, a fixed-gain power amplifier, or a gain block. In another example, the low-noise amplifier 1352 can be configured to be coupled to a DL outside antenna port 1306 without filtering between the low-noise amplifier 1352 and the DL outside antenna port 1306.

In another example, the DL dual-common port multi-bandpass filter 1354 can include a first bandpass filter for a first frequency (e.g., B1) a second band-pass filter for a second frequency (e.g., B2). The DL dual-common port multi-bandpass filter 1354 can comprise a plurality of filters located in a single package. Each filter in the single package can be designed and configured to operate with other filters in the package. For example, each filter can be impedance matched with the other filters in the package to enable the filters to properly function within the same package. Each filter can be configured to provide a bandpass for a selected band that is non-frequency adjacent with the bandpass bands of other filters in the single package. The DL dual-common port multi-bandpass filter 1354 can be configured to pass two or more of 3GPP FDD frequency bands 2, 4, 5, 12, 13, 17, 25, 26, or 71. In another example, the DL dual-common port multi-bandpass filter 1354 can be configured to pass two or more of 3GPP FDD frequency bands 1-28, 30, 31, 65, 66, 68, 70-74, or 85. In another example, the DL dual-common port multi-bandpass filter 1354 can be configured to pass two or more selected channels within a 3GPP FDD band. In another example, the DL dual-common port multi-bandpass filter 1354 can be configured to pass two or more selected frequency ranges within a 3GPP FDD band.

In one example, the downlink bands can be combined using the dual-common port multi-bandpass filters. Rather than using a separate DL amplifier and filter chain for each band, channel, or frequency range, a single amplifier chain can be used with the dual-common port multi-bandpass filters capable of filtering the multiple bands, channels, or frequency ranges. This line-sharing technique simplifies the architecture, the number of components, and the layout of the repeater. In addition, line-sharing due to the combined filters can allow for additional component sharing, such as RF amplifiers (gain blocks), RF attenuators, RF detectors, and the like. With fewer components, the repeater can have a higher overall reliability and a lower overall cost.

In another example, after traveling on the DL path, the DL signal on the DL path can be amplified and filtered in accordance with the type of amplifiers and dual-common port multi-bandpass filters included on the DL path. The signal from the DL path can be directed to the multi-common port multi-filter package 1312. From the multi-common port multi-filter package 1312, the DL signal can be directed to an integrated device antenna port 1302 or a bi-directional inside antenna port 1302.

In another example, a receive diversity DL outside antenna port 1369 or receive diversity DL node antenna port 1369 or receive diversity DL donor antenna port 1369 can be configured to be coupled to a receive diversity DL outside antenna 1370 or receive diversity DL node antenna 1370 or receive diversity DL donor antenna 1370. The receive diversity DL node antenna 1370 can be an omnidirectional antenna or directional antenna. The receive diversity DL node antenna 1370 can receive a DL signal from a base station. The receive diversity DL outside antenna port 1369 can be configured to be coupled to an input of a low-noise amplifier 1372.

In another example, the receive diversity DL path can comprise one or more of a low-noise amplifier 1372, a DL dual-common port multi-bandpass filter 1374, a variable attenuator 1376, or a power amplifier (PA) 1378. The low-noise amplifier 1372 can be a DL low-noise amplifier, the variable attenuator 1376 can be a DL variable attenuator, and the power amplifier 1378 can be a DL power amplifier. In another example, the power amplifier 1378 can comprise a variable gain power amplifier, a fixed-gain power amplifier, or a gain block. In another example, the low-noise amplifier 1372 can be configured to be coupled directly to a receive diversity DL outside antenna port 1369 without filtering between the low-noise amplifier 1372 and the receive diversity DL outside antenna port 1369.

In another example, the DL dual-common port multi-bandpass filter 1374 can include a first bandpass filter for a first frequency (e.g., B1) a second band-pass filter for a second frequency (e.g., B2). The DL dual-common port multi-bandpass filter 1374 can comprise a plurality of filters located in a single package. Each filter in the single package can be designed and configured to operate with other filters in the package. For example, each filter can be impedance matched with the other filters in the package to enable the filters to properly function within the same package. Each filter can be configured to provide a bandpass for a selected band that is non-frequency adjacent with the bandpass bands of other filters in the single package. The DL dual-common port multi-bandpass filter 1374 can be configured to pass two or more of 3GPP FDD frequency bands 2, 4, 5, 12, 13, 17, 25, 26, or 71. In another example, the DL dual-common port multi-bandpass filter 1374 can be configured to pass two or more of 3GPP FDD frequency bands 1-28, 30, 31, 65, 66, 68, 70-74, or 85. In another example, the DL dual-common port multi-bandpass filter 1374 can be configured to pass two or more selected channels within a 3GPP FDD band. In another example, the DL dual-common port multi-bandpass filter 1374 can be configured to pass two or more selected frequency ranges within a 3GPP FDD band.

In another example, after traveling on the receive diversity DL path, the receive diversity signal on the receive diversity DL path can be amplified and filtered in accordance with the type of amplifiers and dual-common port multi-bandpass filters included on the receive diversity DL path. The signal from the receive diversity DL path can be directed to a receive diversity device antenna port 1392 or a receive diversity downlink inside antenna port 1392. In another example, in an alternative, the receive diversity signal can travel on a bypass path coupled between the receive diversity DL inside antenna port 1392 and the receive diversity DL outside antenna port 1369, wherein the bypass path does not amplify or filter the receive diversity signal. The receive diversity device antenna port 1392 or a receive diversity downlink inside antenna port 1392 can be configured to be coupled to a receive diversity device antenna 1390 or a receive diversity downlink inside antenna 1390. The receive diversity device antenna 1390 can communicate the amplified and/or filtered or bypassed receive diversity DL signal to a UE.

In another example, as illustrated in FIG. 13*j*, the integrated device antenna 1310 can receive an UL signal from a UE. The bi-directional inside antenna port 1302 can be configured to be coupled to a splitter 1313. The splitter 1313 can be a diplexer, a multiplexer, or a multi-common port multi-filter package. The splitter 1313 can direct a signal into an UL path or from a DL path. In one example, the splitter 1313 can be used to separate the UL and DL paths.

In another example, as illustrated in FIG. 13*k*, a repeater can comprise a double-pole double-throw (DPDT) switch 1398. The output 1323 of the UL path can be configured to be coupled to the DPDT switch 1398. The DPDT switch 1398 can be configured to be coupled to an UL node antenna port 1304. The DL node antenna port 1306 can be configured to be coupled to the DPDT switch 1398. The DPDT switch 1398 can be configured to be coupled to an input 1351 of the DL path.

In another example, the DPDT switch 1398 can be configured to: allow the UL node antenna port 1304 to be coupled to the input 1351 of the DL path, and allow the DL node antenna port 1306 to be coupled to the output 1323 of the UL path. The UL node antenna port 1304 and the DL node antenna port can be switched based on whether the repeater is UL-limited or DL-limited. A repeater can be UL-limited when there is a low level of power from the repeater to the base station. A repeater can be DL-limited when there is a low level of power from the base station to the repeater.

In one example, switching from the UL node antenna port 1304 to the DL node antenna port 1306 can allow the uplink amplification and filtering path to use the DL node antenna port 1306 when the repeater is UL-limited. In one example, switching from the DL node antenna port 1306 to the UL node antenna port 1304 can allow the downlink amplification and filtering path to use the UL node antenna port 1304 when the repeater is DL-limited. In one example, this kind of switching can increase the level of power from the repeater to the base station (when the repeater is UL-limited) and increase the level of power from the base station to the repeater (when the repeater is DL-limited) by using spatial diversity or polarization diversity.

In another example, as illustrated in FIG. 13*l*, a repeater can comprise a triple-pole triple-throw (TPTT) switch 1399. The output 1323 of the UL path can be configured to be coupled to the TPTT switch 1399. The TPTT switch 1399 can be configured to be coupled to an UL node antenna port 1304. The DL node antenna port 1306 can be configured to be coupled to the TPTT switch 1399. The TPTT switch 1399 can be configured to be coupled to an input 1351 of the DL path. The receive diversity node antenna port 1369 can be configured to be coupled to the TPTT switch 1399. The TPTT switch 1399 can be configured to be coupled to an input 1371 of the receive diversity DL path.

In another example, the TPTT switch 1399 can be configured to: allow the UL node antenna port 1304 to be coupled to the input 1351 of the DL path; allow the UL node antenna port 1304 to be coupled to the input 1371 of the receive diversity DL path. In another example, the TPTT switch 1399 can be configured to: allow the DL node antenna port 1306 to be coupled to the output 1323 of the UL path; allow the DL node antenna port 1306 to be coupled to the input 1371 of the receive diversity DL path. In another example, the TPTT switch 1399 can be configured to: allow the receive diversity node antenna port 1369 to be coupled to the input 1351 of the DL path; allow the receive diversity node antenna port 1369 to be coupled to the output 1323 of the UL path.

In one example, the UL node antenna port 1304, the DL node antenna port, and the receive diversity node antenna port 1369 can be switched based on whether the repeater is UL-limited or DL-limited. A repeater can be UL-limited when there is a low level of power from the repeater to the base station. A repeater can be DL-limited when there is a low level of power from the base station to the repeater. In one example, this kind of antenna port switching can increase the level of power from the repeater to the base station (when the repeater is UL-limited) and increase the level of power from the base station to the repeater (when the repeater is DL-limited) by using spatial diversity or polarization diversity.

Figure 14:
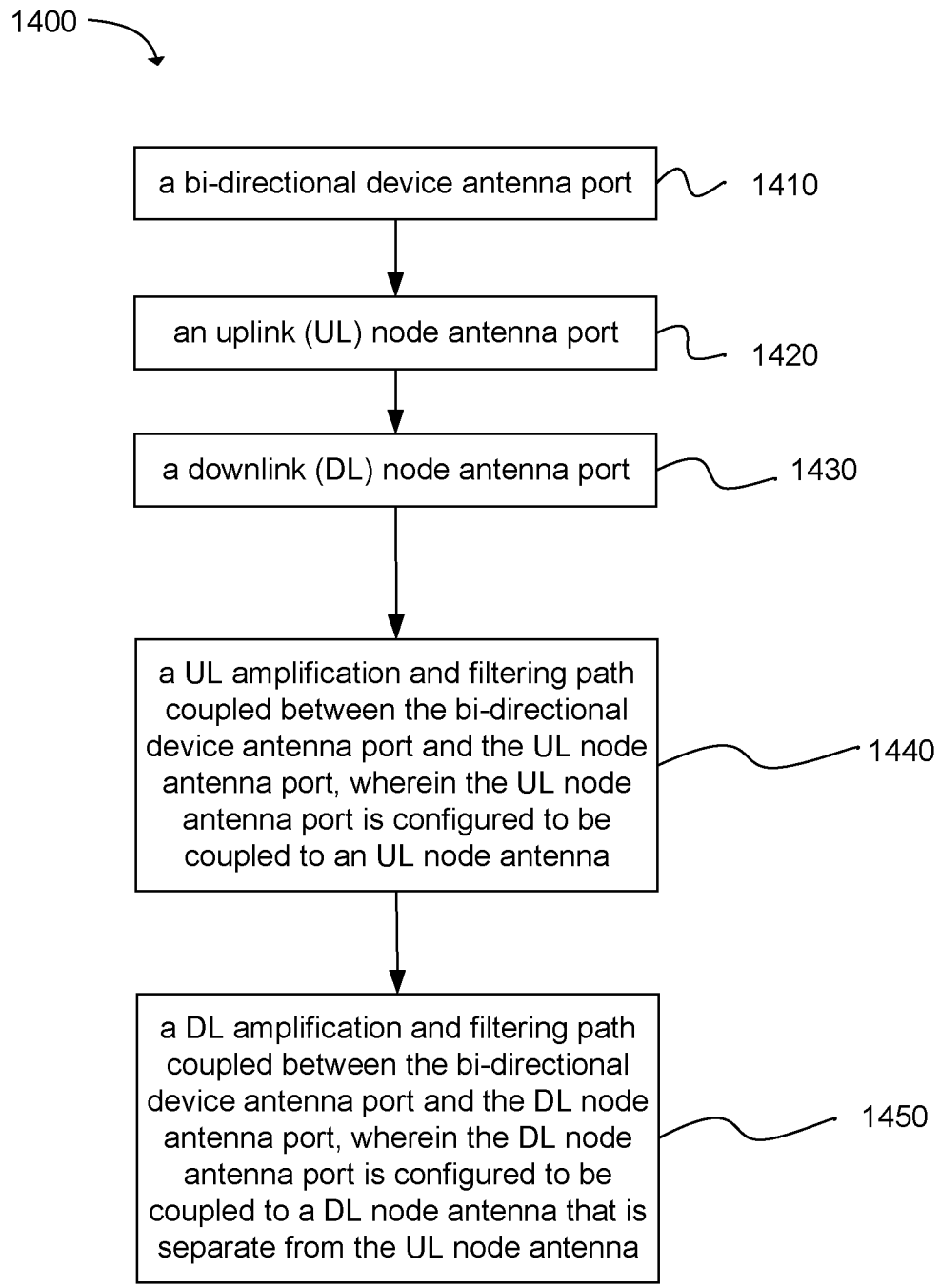
FIG. 14 depicts a signal booster in accordance with an example.

Another example provides an apparatus 1400 of a signal booster, as shown in the flow chart in FIG. 14. The apparatus can comprise a bi-directional device antenna port, as shown in block 1410. The apparatus can further comprise an uplink (UL) node antenna port, as shown in block 1420. The apparatus can further comprise a downlink (DL) node antenna port, as shown in block 1430. The apparatus can further comprise a UL amplification and filtering path coupled between the bi-directional device antenna port and the UL node antenna port, wherein the UL node antenna port is configured to be coupled to an UL node antenna, as shown in block 1440. The apparatus can further comprise a DL amplification and filtering path coupled between the bi-directional device antenna port and the DL node antenna port, wherein the DL node antenna port is configured to be coupled to a DL node antenna that is separate from the UL node antenna, as shown in block 1450.

Figure 15:
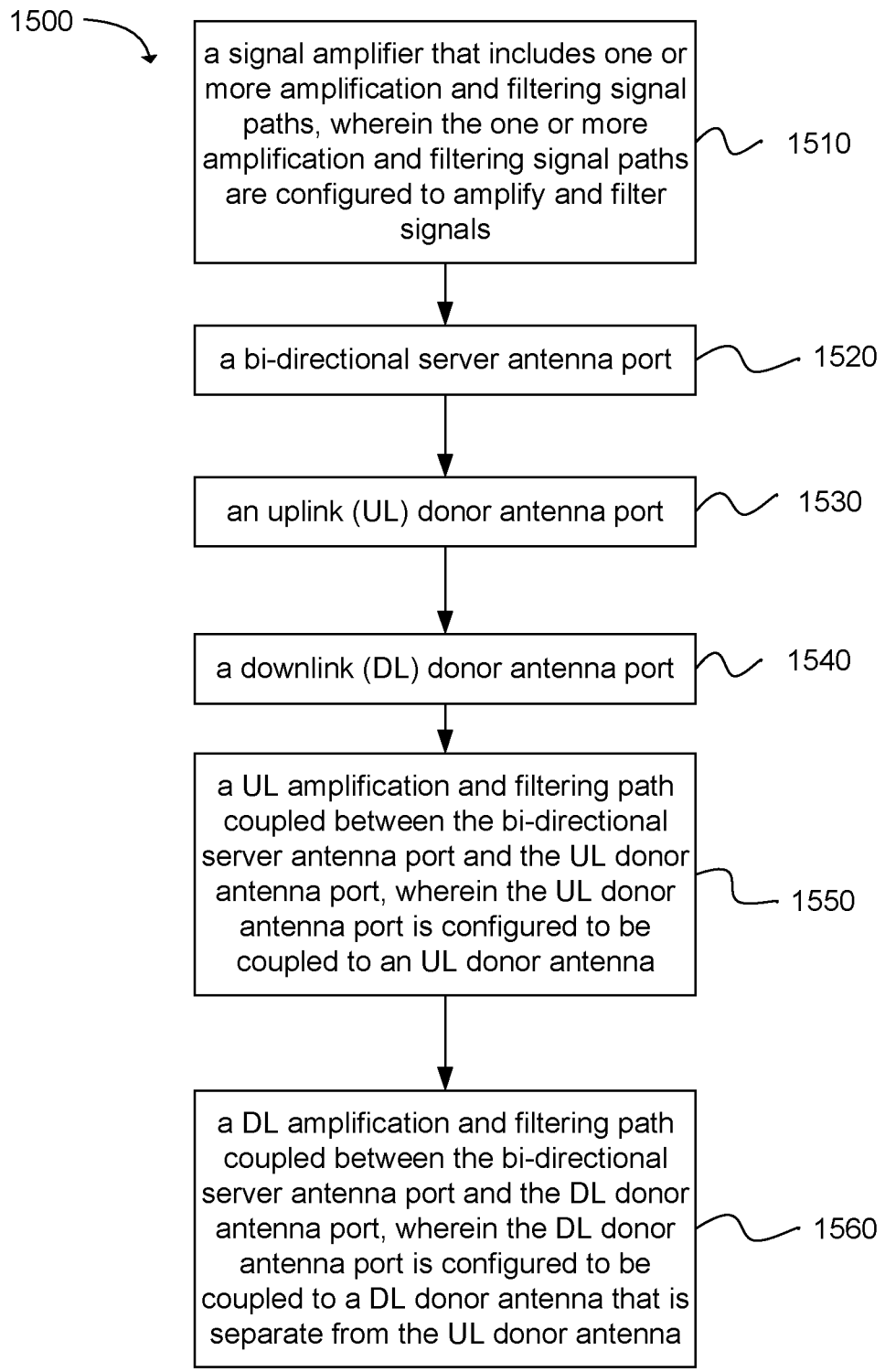
FIG. 15 depicts a repeater in accordance with an example.

Another example provides an apparatus 1500 of a repeater, as shown in the flow chart in FIG. 15. The apparatus can comprise a signal amplifier that includes one or more amplification and filtering signal paths, wherein the one or more amplification and filtering signal paths are configured to amplify and filter signals, as shown in block 1510. The apparatus can further comprise a bi-directional server antenna port, as shown in block 1520. The apparatus can further comprise an uplink (UL) donor antenna port, as shown in block 1530. The apparatus can further comprise a downlink (DL) donor antenna port, as shown in block 1540. The apparatus can further comprise a UL amplification and filtering path coupled between the bi-directional server antenna port and the UL donor antenna port, wherein the UL donor antenna port is configured to be coupled to an UL donor antenna, as shown in block 1550. The apparatus can further comprise a DL amplification and filtering path coupled between the bi-directional server antenna port and the DL donor antenna port, wherein the DL donor antenna port is configured to be coupled to a DL donor antenna that is separate from the UL donor antenna, as shown in block 1560.

Figure 16:
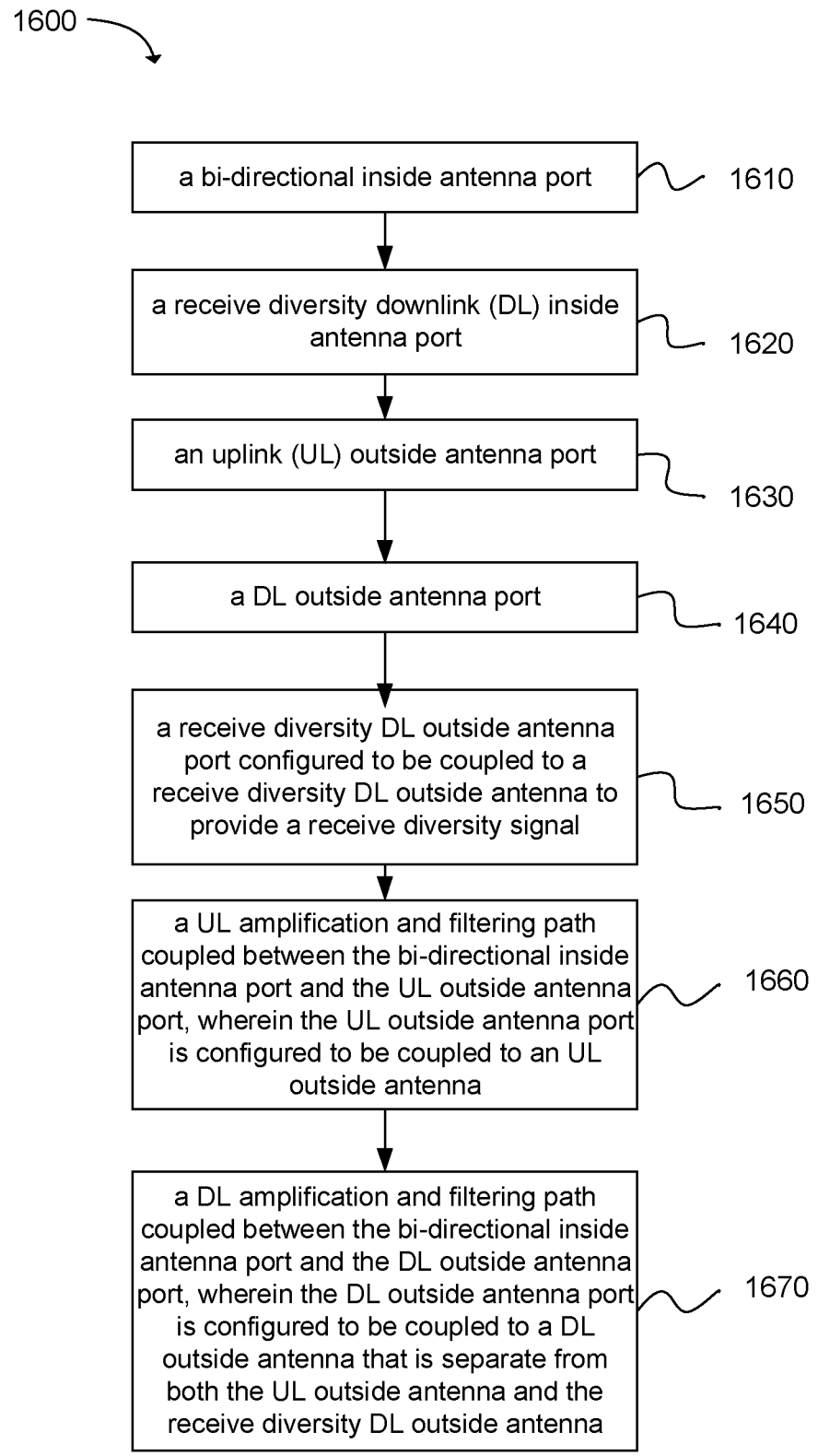
FIG. 16 depicts a repeater in accordance with an example.

Another example provides an apparatus 1600 of a repeater, as shown in the flow chart in FIG. 16. The apparatus can comprise a bi-directional inside antenna port, as shown in block 1610. The apparatus can further comprise a receive diversity downlink (DL) inside antenna port, as shown in block 1620. The apparatus can further comprise an uplink (UL) outside antenna port, as shown in block 1630. The apparatus can further comprise a DL outside antenna port, as shown in block 1640. The apparatus can further comprise a receive diversity DL outside antenna port configured to be coupled to a receive diversity DL outside antenna to provide a receive diversity signal, as shown in block 1650. The apparatus can further comprise a UL amplification and filtering path coupled between the bi-directional inside antenna port and the UL outside antenna port, wherein the UL outside antenna port is configured to be coupled to an UL outside antenna, as shown in block 1660. The apparatus can further comprise a DL amplification and filtering path coupled between the bi-directional inside antenna port and the DL outside antenna port, wherein the DL outside antenna port is configured to be coupled to a DL outside antenna that is separate from both the UL outside antenna and the receive diversity DL outside antenna, as shown in block 1670.

Figure 17:
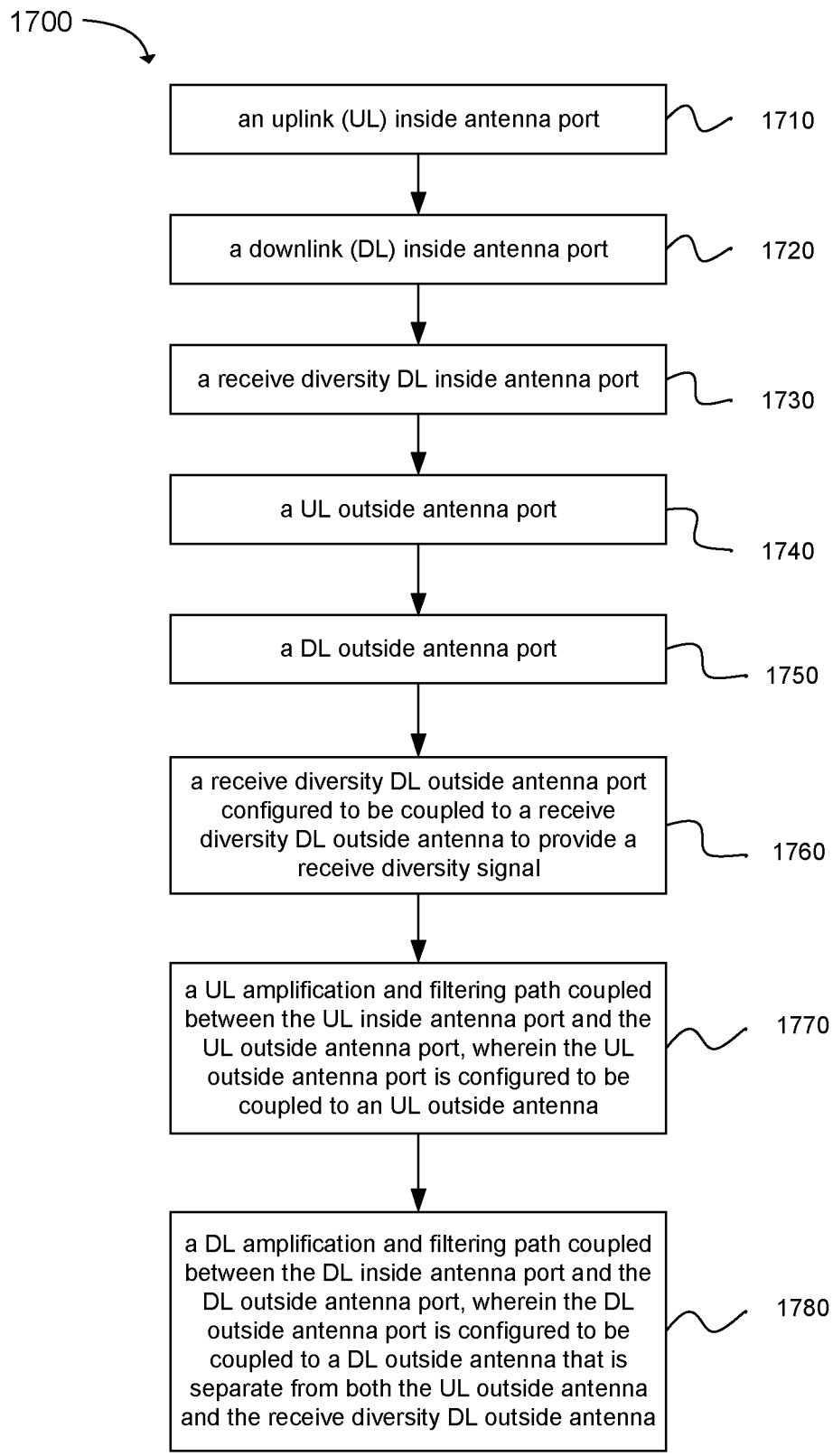
FIG. 17 depicts a repeater in accordance with an example.

Another example provides an apparatus 1700 of a repeater, as shown in the flow chart in FIG. 17. The apparatus can comprise an uplink (UL) inside antenna port, as shown in block 1710. The apparatus can further comprise a downlink (DL) inside antenna port, as shown in block 1720. The apparatus can further comprise a receive diversity DL inside antenna port, as shown in block 1730. The apparatus can further comprise a UL outside antenna port, as shown in block 1740. The apparatus can further comprise a DL outside antenna port, as shown in block 1750. The apparatus can further comprise a receive diversity DL outside antenna port configured to be coupled to a receive diversity DL outside antenna to provide a receive diversity signal, as shown in block 1760. The apparatus can further comprise a UL amplification and filtering path coupled between the UL inside antenna port and the UL outside antenna port, wherein the UL outside antenna port is configured to be coupled to an UL outside antenna, as shown in block 1770. The apparatus can further comprise a DL amplification and filtering path coupled between the DL inside antenna port and the DL outside antenna port, wherein the DL outside antenna port is configured to be coupled to a DL outside antenna that is separate from both the UL outside antenna and the receive diversity DL outside antenna, as shown in block 1780.

Figure 18:
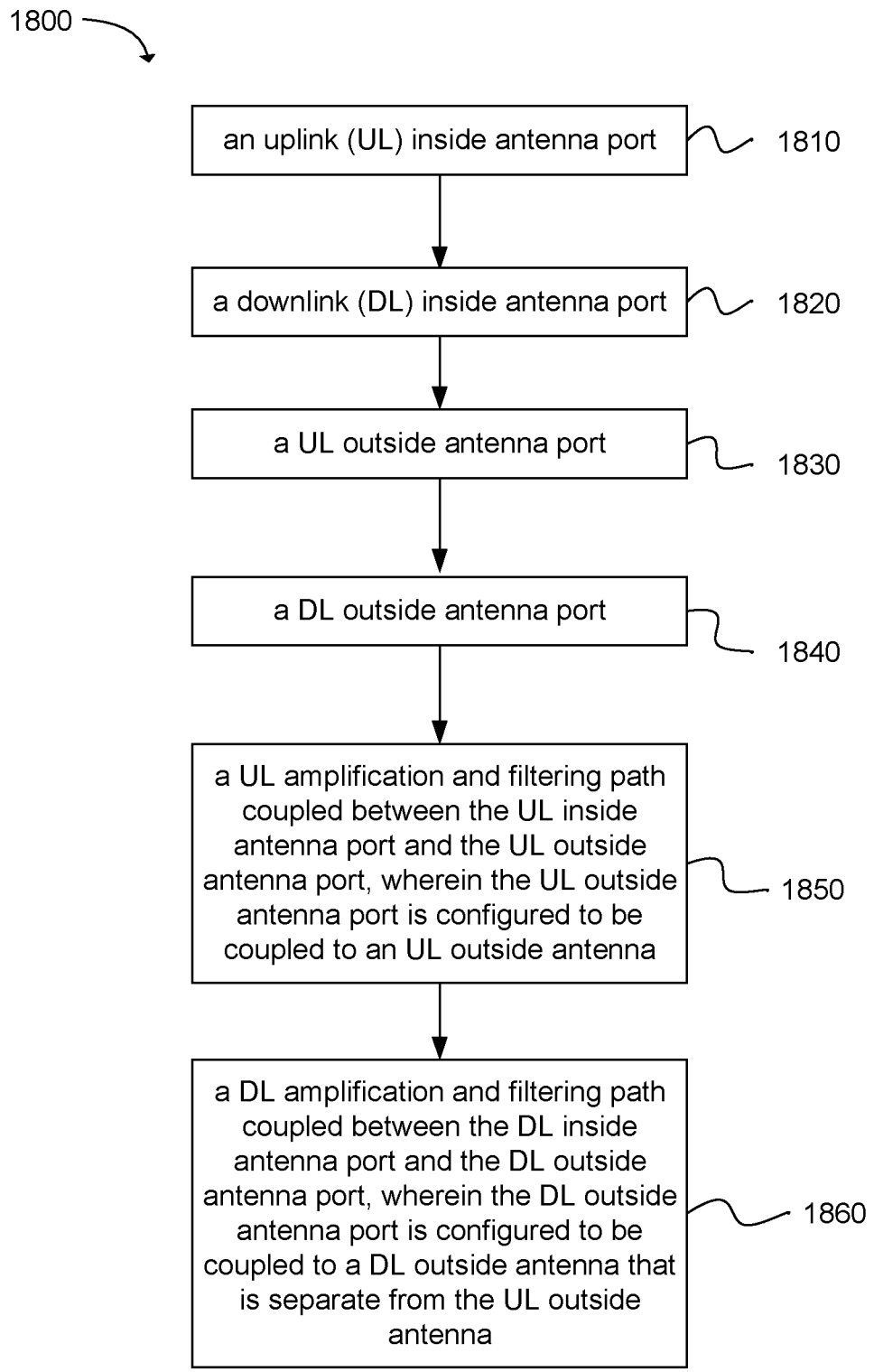
FIG. 18 depicts a repeater in accordance with an example.

Another example provides an apparatus 1800 of a repeater, as shown in the flow chart in FIG. 18. The apparatus can comprise an uplink (UL) inside antenna port, as shown in block 1810. The apparatus can further comprise a downlink (DL) inside antenna port, as shown in block 1820. The apparatus can further comprise a UL outside antenna port, as shown in block 1830. The apparatus can further comprise a DL outside antenna port, as shown in block 1840. The apparatus can further comprise a UL amplification and filtering path coupled between the UL inside antenna port and the UL outside antenna port, wherein the UL outside antenna port is configured to be coupled to an UL outside antenna, as shown in block 1850. The apparatus can further comprise a DL amplification and filtering path coupled between the DL inside antenna port and the DL outside antenna port, wherein the DL outside antenna port is configured to be coupled to a DL outside antenna that is separate from the UL outside antenna, as shown in block 1860.

EXAMPLES

The following examples pertain to specific technology embodiments and point out specific features, elements, or actions that can be used or otherwise combined in achieving such embodiments.

Example 1 includes a desktop signal booster, comprising: a cellular signal amplifier configured to amplify signals for a wireless device, wherein the wireless device is within a selected distance from the desktop signal booster; an integrated device antenna coupled to the cellular signal amplifier, wherein the integrated device antenna is configured to transmit signals from the cellular signal amplifier to the wireless device; an integrated node antenna coupled to the cellular signal amplifier, wherein the integrated node antenna is configured to transmit signals from the cellular signal amplifier to a base station; and wireless charging circuitry configured to wirelessly charge the wireless device when the wireless device is placed in proximity to the desktop signal booster.

Example 2 includes the desktop signal booster of Example 1, wherein the desktop signal booster is configured to operate in series with one or more additional devices, wherein the additional devices include at least one of: a non-portable signal booster, or a sleeve that amplifies signals for a wireless device placed in the sleeve.

Example 3 includes the desktop signal booster of any of Examples 1 to 2, wherein a spacing between the integrated device antenna and the integrated node antenna is selected to increase isolation between the integrated device antenna and the integrated node antenna.

Example 4 includes the desktop signal booster of any of Examples 1 to 3, wherein the cellular signal amplifier further comprises one or more amplification and filtering signal paths configured to be positioned between the integrated device antenna and the integrated node antenna, wherein the amplification and filtering signal paths are configured to amplify and filter signals for communication to the base station via the integrated node antenna or for communication to the wireless device via the integrated device antenna.

Example 5 includes the desktop signal booster of any of Examples 1 to 4, wherein the cellular signal amplifier further comprises a bypass signal path configured to be positioned between the integrated device antenna and the integrated node antenna, wherein the bypass signal path does not amplify and filter signals traveling through the bypass signal path, wherein signals are directed to one of the amplification and filtering signal paths or the bypass signal path depending on a power level of the signals in relation to a defined power level threshold.

Example 6 includes the desktop signal booster of any of Examples 1 to 5, wherein the cellular signal amplifier further comprises one or more detectors configured to detect the power levels of the signals.

Example 7 includes the desktop signal booster of any of Examples 1 to 6, wherein the cellular signal amplifier further comprises one or more directional couplers used to form the amplification and filtering signal paths and the bypass signal path.

Example 8 includes the desktop signal booster of any of Examples 1 to 7, wherein: signals are directed to one of the amplification and filtering signal paths when power levels of the signals are below the defined power level threshold; and signals are directed to the bypass signal path when power levels of the signals are above the defined power level threshold.

Example 9 includes the desktop signal booster of any of Examples 1 to 8, wherein the amplification and filtering signal paths includes a high band amplification and filtering signal path operable to direct signals within high frequency bands, wherein the high frequency bands includes band 4 (B4) and band 25 (B25).

Example 10 includes the desktop signal booster of any of Examples 1 to 9, wherein the amplification and filtering signal paths includes a low band amplification and filtering signal path operable to direct signals within low frequency bands, wherein the low frequency bands includes band 5 (B5), band 12 (B12) and band 13 (B13).

Example 11 includes a wireless device charging station, comprising: an integrated device antenna configured to communicate signals with a wireless device; an integrated node antenna configured to communicate signals with a base station; and a cellular signal amplifier that includes one or more amplification and filtering signal paths, wherein the amplification and filtering signal paths are configured to amplify and filter signals for communication to the base station via the integrated node antenna or for communication to the wireless device via the integrated device antenna; and wireless charging circuitry operable to wirelessly charge the wireless device when the wireless device is placed in proximity to the wireless device charging station.

Example 12 includes the wireless device charging station of Example 11, further comprising a battery configured to provide power to the cellular signal amplifier and the wireless device.

Example 13 includes the wireless device charging station of any of Examples 11 to 12, wherein: the cellular signal amplifier further includes one or more detectors configured to detect power levels of the signals; and the one or more amplification and filtering signal paths include one or more bypassable amplifiers and one or more switchable band pass filters that are configurable depending on detected power levels of the signals.

Example 14 includes the wireless device charging station of any of Examples 11 to 13, wherein: the signals bypass the amplifiers to conserve energy when the power levels of the signals are above a defined power level threshold; or the signals do not bypass the amplifiers when the power levels are below a defined power level threshold.

Example 15 includes the wireless device charging station of any of Examples 11 to 14, wherein: the band pass filters are switched in when the power levels of the signals are below a defined power level threshold; or the band pass filters are switched out when the power levels of the signals are above the defined power level threshold.

Example 16 includes the wireless device charging station of any of Examples 11 to 15, wherein the band pass filters are switched out to reduce a noise figure of the cellular signal amplifier and extend a coverage area of the cellular signal amplifier.

Example 17 includes the wireless device charging station of any of Examples 11 to 16, wherein the switchable band pass filters correspond to high frequency bands or low frequency bands, wherein the high frequency bands include band 4 (B4) and band 25 (B25), and the low frequency bands include band 5 (B5), band 12 (B12) and band 13 (B13).

Example 18 includes the wireless device charging station of any of Examples 11 to 17, wherein the one or more amplification and filtering signal paths include one or more downlink (DL) amplification and filtering signal paths and one or more uplink (UL) amplification and filtering signal paths.

Example 19 includes a desktop signal repeater, comprising: a cellular signal amplifier configured to amplify signals for a wireless device; an integrated device antenna configured to transmit signals from the cellular signal amplifier to the wireless device; an integrated node antenna configured to transmit signals from the cellular signal amplifier to a base station; and an integrated satellite transceiver coupled to the cellular signal amplifier and configured to communicate signals to one or more satellites.

Example 20 includes the desktop signal repeater of Example 19, wherein the desktop signal repeater is configured to operate in series with one or more additional devices, wherein the additional devices include at least one of: a non-portable signal booster, or a sleeve that amplifies signals for a wireless device placed in the sleeve.

Example 21 includes the desktop signal repeater of any of Examples 19 to 20, wherein the integrated satellite transceiver is switched on when cellular signals are unavailable.

Example 22 includes the desktop signal repeater of any of Examples 19 to 21, wherein the cellular signal amplifier is a Federal Communications Commission (FCC)-compatible consumer signal booster.

Example 23 includes the desktop signal repeater of any of Examples 19 to 22, wherein the cellular signal amplifier is configured to boost signals in up to seven bands.

Example 24 includes a signal booster, comprising: a cellular signal amplifier configured to amplify signals for a wireless device, wherein the cellular signal amplifier further comprises a bypass signal path that does not amplify and filter signals traveling through the bypass signal path, wherein signals are directed to an amplification and filtering signal path or the bypass signal path depending on a power level of the signals in relation to a defined power level threshold.

Example 25 includes the signal booster of Example 24, further comprising: an integrated device antenna configured to transmit signals from the cellular signal amplifier to the wireless device; and an integrated node antenna configured to transmit signals from the cellular signal amplifier to a base station.

Example 26 includes the signal booster of any of Examples 24 to 25, wherein the cellular signal amplifier is coupled to the integrated device antenna using a directional coupler.

Example 27 the signal booster of any of Examples 24 to 25, wherein the signal booster is a desktop signal booster.

Example 28 includes the signal booster of any of Examples 24 to 27, wherein the cellular signal amplifier further comprises one or more detectors configured to detect the power levels of the signals.

Example 29 includes the signal booster of any of Examples 24 to 28, wherein the cellular signal amplifier further comprises one or more directional couplers used to form the amplification and filtering signal paths and the bypass signal path.

Example 30 includes the signal booster of any of Examples 24 to 29, wherein: signals are directed to one of the amplification and filtering signal paths when power levels of the signals are below the defined power level threshold; and signals are directed to the bypass signal path when power levels of the signals are above the defined power level threshold.

Example 31 includes a signal repeater, comprising: a cellular signal amplifier configured to amplify signals for a wireless device; and an integrated satellite transceiver coupled to the cellular signal amplifier and configured to communicate signals to one or more satellites.

Example 32 includes the signal repeater of Example 31, wherein the signal repeater is a desktop signal repeater.

Example 33 includes the signal repeater of any of Examples 31 to 32, further comprising: an integrated device antenna configured to transmit signals from the cellular signal amplifier to the wireless device; and an integrated node antenna configured to transmit signals from the cellular signal amplifier to a base station.

Example 34 includes a signal booster, comprising: a bi-directional device antenna port; an uplink (UL) node antenna port; a downlink (DL) node antenna port; a UL amplification and filtering path coupled between the bi-directional device antenna port and the UL node antenna port, wherein the UL node antenna port is configured to be coupled to an UL node antenna; and a DL amplification and filtering path coupled between the bi-directional device antenna port and the DL node antenna port, wherein the DL node antenna port is configured to be coupled to a DL node antenna that is separate from the UL node antenna.

Example 35 includes the signal booster of Example 34, further comprising: a receive diversity DL device antenna port; and a receive diversity DL node antenna port configured to be coupled to a receive diversity DL node antenna to provide a receive diversity signal.

Example 36 includes the signal booster of Example 35, further comprising: a receive diversity DL multiband filter on a receive diversity DL amplification and filtering path coupled between the receive diversity DL device antenna port and the receive diversity DL node antenna port, wherein the receive diversity DL multiband filter is configured to filter signals on two or more non-spectrally adjacent bands.

Example 37 includes the signal booster of Example 36, wherein the receive diversity DL multiband filter comprises a plurality of bandpass filters in a single package, wherein the plurality of bandpass filters are impedance matched to enable operation in the single package.

Example 38 includes the signal booster of Example 37, wherein the receive diversity DL multiband filter is a dual-common port multi-bandpass filter.

Example 39 includes the signal booster of Example 35, wherein one or more of the UL amplification and filtering path or the DL amplification and filtering path or a receive diversity DL amplification and filtering path coupled between the receive diversity DL device antenna port and the receive diversity DL node antenna port is configured to switch between one or more of: the UL node antenna port; the DL node antenna port; or the receive diversity DL node antenna port.

Example 40 includes the signal booster of Example 35, wherein: the receive diversity DL node antenna port is coupled to a receive diversity DL amplification and filtering path coupled between the receive diversity DL device antenna port and the receive diversity DL node antenna port.

Example 41 includes the signal booster of Example 35, wherein the UL node antenna port, the DL node antenna port, or the receive diversity DL node antenna port are configured to be coupled to one or more of an omnidirectional antenna or a directional antenna.

Example 42 includes the signal booster of Example 34, wherein the UL node antenna port is connected to a power amplifier without filtering between the power amplifier and the UL node antenna port.

Example 43 includes the signal booster of Example 34, wherein the UL node antenna port is coupled to a power amplifier with low-order filtering coupled between the UL node antenna port and the power amplifier to filter harmonics emitted by the power amplifier.

Example 44 includes the signal booster of Example 34, wherein: the DL node antenna port is connected to a low-noise amplifier without filtering between the low-noise amplifier and the DL node antenna port; or the DL node antenna port is coupled to a low-noise amplifier with a switchable filter between the low-noise amplifier and the DL node antenna port.

Example 45 includes the signal booster of Example 34, further comprising one or more of: a low-noise amplifier on the UL amplification and filtering path; a low-noise amplifier on the DL amplification and filtering path; a power amplifier on the UL amplification and filtering path; a power amplifier on the DL amplification and filtering path; a variable attenuator on the UL amplification and filtering path; a variable attenuator on the DL amplification and filtering path; a band-pass filter on the UL amplification and filtering path; or a band-pass filter on the DL amplification and filtering path.

Example 46 includes the signal booster of Example 34, wherein the signal booster is configured to amplify signals in up to six bands, wherein each band comprises a separate amplification and filtering path.

Example 47 includes the signal booster of Example 46, wherein the up to six bands are selected from one or more of: Third Generation Partnership Project (3GPP) Long Term Evolution (LTE) frequency bands 1 through 85, 3GPP 5G frequency bands 1 through 86, or 3GPP 5G frequency bands 257 through 261.

Example 48 includes the signal booster of Example 34, wherein the signal booster is a Federal Communications Commission (FCC)-compatible consumer signal booster.

Example 49 includes the signal booster of Example 34, wherein one or more of the UL amplification and filtering path or the DL amplification and filtering path is configured to switch between one or more of: the UL node antenna port; or the DL node antenna port.

Example 50 includes the signal booster of Example 34, further comprising one or more of: an UL multiband filter on the UL amplification and filtering path, wherein the UL multiband filter is configured to filter signals on two or more non-spectrally adjacent bands; or a DL multiband filter on the DL amplification and filtering path, wherein the DL multiband filter is configured to filter signals on two or more non-spectrally adjacent bands.

Example 51 includes the signal booster of Example 50, wherein the UL multiband filter or the DL multiband filter comprises a plurality of bandpass filters in a single package, wherein the plurality of bandpass filters are impedance matched to enable operation in the single package.

Example 52 includes the signal booster of Example 51, wherein the UL multiband filter or the DL multiband filter is a dual-common port multi-bandpass filter.

Example 53 includes the signal booster of Example 34, further comprising a multiplexer configured to: couple the UL amplification and filtering path to the bi-directional device antenna port; and couple the DL amplification and filtering path to the bi-directional device antenna port.

Example 54 includes the signal booster of Example 53, wherein the multiplexer is a diplexer, a duplexer, a multiplexer, a circulator, or a multi-common port multi-filter package.

Example 55 includes a repeater, comprising: a signal amplifier that includes one or more amplification and filtering signal paths, wherein the one or more amplification and filtering signal paths are configured to amplify and filter signals; a bi-directional server antenna port; an uplink (UL) donor antenna port; a downlink (DL) donor antenna port; a UL amplification and filtering path coupled between the bi-directional server antenna port and the UL donor antenna port, wherein the UL donor antenna port is configured to be coupled to an UL donor antenna; and a DL amplification and filtering path coupled between the bi-directional server antenna port and the DL donor antenna port, wherein the DL donor antenna port is configured to be coupled to a DL donor antenna that is separate from the UL donor antenna.

Example 56 includes the repeater of Example 55, further comprising: a receive diversity DL server antenna port; and a receive diversity DL donor antenna port configured to be coupled to a receive diversity DL donor antenna to provide a receive diversity signal.

Example 57 includes the repeater of Example 56, wherein: the receive diversity DL donor antenna port is coupled to a receive diversity DL amplification and filtering path coupled between the receive diversity DL server antenna port and the receive diversity DL donor antenna port.

Example 58 includes the repeater of Example 56, wherein the UL donor antenna port, the DL donor antenna port, or the receive diversity DL donor antenna port are configured to be coupled to one or more of an omnidirectional antenna or a directional antenna.

Example 59 includes the repeater of Example 55, wherein the UL donor antenna port is connected to a power amplifier without filtering between the power amplifier and the UL donor antenna port.

Example 60 includes the repeater of Example 55, wherein the UL donor antenna port is coupled to a power amplifier with low-order filtering coupled between the UL donor antenna port and the power amplifier to filter harmonics emitted by the power amplifier.

Example 61 includes the repeater of Example 55, wherein: the DL donor antenna port is connected to a low-noise amplifier without filtering between the low-noise amplifier and the DL donor antenna port; or the DL donor antenna port is coupled to a low-noise amplifier with a switchable filter between the low-noise amplifier and the DL donor antenna port.

Example 62 includes the repeater of Example 55, wherein the repeater is configured to amplify signals in up to six bands, wherein each band comprises a separate amplification and filtering path, and wherein the up to six bands are selected from one or more of: Third Generation Partnership Project (3GPP) Long Term Evolution (LTE) frequency bands 1 through 85, 3GPP 5G frequency bands 1 through 86, or 3GPP 5G frequency bands 257 through 261.

Example 63 includes the repeater of Example 55, wherein one or more of the UL amplification and filtering path or the DL amplification and filtering path is configured to switch between one or more of: the UL donor antenna port; or the DL donor antenna port.

Example 64 includes a repeater, comprising: a bi-directional inside antenna port; a receive diversity downlink (DL) inside antenna port; an uplink (UL) outside antenna port; a DL outside antenna port; a receive diversity DL outside antenna port configured to be coupled to a receive diversity DL outside antenna to provide a receive diversity signal; a UL amplification and filtering path coupled between the bi-directional inside antenna port and the UL outside antenna port, wherein the UL outside antenna port is configured to be coupled to an UL outside antenna; and a DL amplification and filtering path coupled between the bi-directional inside antenna port and the DL outside antenna port, wherein the DL outside antenna port is configured to be coupled to a DL outside antenna that is separate from both the UL outside antenna and the receive diversity DL outside antenna.

Example 65 includes the repeater of Example 64, wherein the receive diversity DL outside antenna port is coupled to a receive diversity DL amplification and filtering path coupled between the receive diversity DL inside antenna port and the receive diversity DL outside antenna port.

Example 66 includes the repeater of Example 65, further comprising: a receive diversity DL multiband filter on the receive diversity DL amplification and filtering path, wherein the receive diversity DL multiband filter is configured to filter signals on two or more non-spectrally adjacent bands.

Example 67 includes the repeater of Example 66, wherein the receive diversity DL multiband filter comprises a plurality of bandpass filters in a single package, wherein the plurality of bandpass filters are impedance matched to enable operation in the single package.

Example 68 includes the repeater of Example 67, wherein the receive diversity DL multiband filter is a dual-common port multi-bandpass filter.

Example 69 includes the repeater of Example 64, wherein the UL outside antenna port, the DL outside antenna port, or the receive diversity DL outside antenna port are configured to be coupled to one or more of an omnidirectional antenna or a directional antenna.

Example 70 includes the repeater of Example 64, wherein the UL outside antenna port is connected to a power amplifier without filtering between the power amplifier and the UL outside antenna port.

Example 71 includes the repeater of Example 64, wherein the UL outside antenna port is coupled to a power amplifier with a low-order filtering coupled between the UL outside antenna port and the power amplifier to filter harmonics emitted by the power amplifier.

Example 72 includes the repeater of Example 64, wherein: the DL outside antenna port is connected to a low-noise amplifier without filtering between the low-noise amplifier and the DL outside antenna port; or the DL outside antenna port is coupled to a low-noise amplifier with a switchable filter between the low-noise amplifier and the DL outside antenna port.

Example 73 includes the repeater of Example 64, further comprising one or more of: a low-noise amplifier on the UL amplification and filtering path; a low-noise amplifier on the DL amplification and filtering path; a power amplifier on the UL amplification and filtering path; a power amplifier on the DL amplification and filtering path; a variable attenuator on the UL amplification and filtering path; a variable attenuator on the DL amplification and filtering path; a band-pass filter on the UL amplification and filtering path; or a band-pass filter on the DL amplification and filtering path.

Example 74 includes the repeater of Example 64, wherein the repeater is configured to amplify signals in up to six bands, wherein each band comprises a separate amplification and filtering path.

Example 75 includes the repeater of Example 74, wherein the up to six bands are selected from one or more of: Third Generation Partnership Project (3GPP) Long Term Evolution (LTE) frequency bands 1 through 85, 3GPP 5G frequency bands 1 through 86, or 3GPP 5G frequency bands 257 through 261.

Example 76 includes the repeater of Example 64, wherein the repeater is a Federal Communications Commission (FCC)-compatible consumer signal booster.

Example 77 includes the repeater of Example 64, wherein one or more of the UL amplification and filtering path, the DL amplification and filtering path, or a receive diversity DL amplification and filtering path is configured to switch between one or more of: the UL outside antenna port; the DL outside antenna port; or the receive diversity DL outside antenna port.

Example 78 includes the repeater of Example 64, further comprising one or more of: an UL multiband filter on the UL amplification and filtering path, wherein the UL multiband filter is configured to filter signals on two or more non-spectrally adjacent bands; or a DL multiband filter on the DL amplification and filtering path, wherein the DL multiband filter is configured to filter signals on two or more non-spectrally adjacent bands.

Example 79 includes the repeater of Example 78, wherein the UL multiband filter or the DL multiband filter comprises a plurality of bandpass filters in a single package, wherein the plurality of bandpass filters are impedance matched to enable operation in the single package.

Example 80 includes the repeater of Example 79, wherein the UL multiband filter or the DL multiband filter is a dual-common port multi-bandpass filter.

Example 81 includes the repeater of Example 64, further comprising a multiplexer configured to: couple the UL amplification and filtering path to the bi-directional inside antenna port; and couple the DL amplification and filtering path to the bi-directional inside antenna port.

Example 82 includes the repeater of Example 81, wherein the multiplexer can be a diplexer, a duplexer, a multiplexer, a circulator, or a multi-common port multi-filter package.

Example 83 includes a repeater, comprising: an uplink (UL) inside antenna port; a downlink (DL) inside antenna port; a receive diversity DL inside antenna port; a UL outside antenna port; a DL outside antenna port; a receive diversity DL outside antenna port configured to be coupled to a receive diversity DL outside antenna to provide a receive diversity signal; a UL amplification and filtering path coupled between the UL inside antenna port and the UL outside antenna port, wherein the UL outside antenna port is configured to be coupled to an UL outside antenna; and a DL amplification and filtering path coupled between the DL inside antenna port and the DL outside antenna port, wherein the DL outside antenna port is configured to be coupled to a DL outside antenna that is separate from both the UL outside antenna and the receive diversity DL outside antenna.

Example 84 includes the repeater of Example 83, wherein the receive diversity DL outside antenna port is coupled to a receive diversity DL amplification and filtering path coupled between the receive diversity DL inside antenna port and the receive diversity DL outside antenna port.

Example 85 includes the repeater of Example 84, further comprising one or more of: a receive diversity DL multiband filter on the receive diversity DL amplification and filtering path, wherein the receive diversity DL multiband filter is configured to filter signals on two or more non-spectrally adjacent bands.

Example 86 includes the repeater of Example 85, wherein the receive diversity DL multiband filter comprises a plurality of bandpass filters in a single package, wherein the plurality of bandpass filters are impedance matched to enable operation in the single package.

Example 87 includes the repeater of Example 86, wherein the receive diversity DL multiband filter is a dual-common port multi-bandpass filter.

Example 88 includes the repeater of Example 83, wherein the UL outside antenna port, the DL outside antenna port, or the receive diversity DL outside antenna port are configured to be coupled to one or more of an omnidirectional antenna or a directional antenna.

Example 89 includes the repeater of Example 83, wherein the UL outside antenna port is connected to a power amplifier without filtering between the power amplifier and the UL outside antenna port.

Example 90 includes the repeater of Example 83, wherein the UL outside antenna port is coupled to a power amplifier with low-order filtering coupled between the UL outside antenna port and the power amplifier to filter harmonics emitted by the power amplifier.

Example 91 includes the repeater of Example 83, wherein: the DL outside antenna port is connected to a low-noise amplifier without filtering between the low-noise amplifier and the DL outside antenna port; or the DL outside antenna port is coupled to a low-noise amplifier with a switchable filter between the low-noise amplifier and the DL outside antenna port.

Example 92 includes the repeater of Example 83, further comprising one or more of: a low-noise amplifier on the UL amplification and filtering path; a low-noise amplifier on the DL amplification and filtering path; a power amplifier on the UL amplification and filtering path; a power amplifier on the DL amplification and filtering path; a variable attenuator on the UL amplification and filtering path; a variable attenuator on the DL amplification and filtering path; a band-pass filter on the UL amplification and filtering path; or a band-pass filter on the DL amplification and filtering path.

Example 93 includes the repeater of Example 83, wherein the repeater is configured to amplify signals in up to six bands, wherein each band comprises a separate amplification and filtering path.

Example 94 includes the repeater of Example 93, wherein the up to six bands are selected from one or more of: Third Generation Partnership Project (3GPP) Long Term Evolution (LTE) frequency bands 1 through 85, 3GPP 5G frequency bands 1 through 86, or 3GPP 5G frequency bands 257 through 261.

Example 95 includes the repeater of Example 83, wherein the repeater is a Federal Communications Commission (FCC)-compatible consumer signal booster.

Example 96 includes the repeater of Example 83, wherein one or more of the UL amplification and filtering path, the DL amplification and filtering path, or a receive diversity DL amplification and filtering path is configured to switch between one or more of: the UL outside antenna port; the DL outside antenna port; or the receive diversity DL outside antenna port.

Example 97 includes the repeater of Example 83, further comprising one or more of: an UL multiband filter on the UL amplification and filtering path, wherein the UL multiband filter is configured to filter signals on two or more non-spectrally adjacent bands; or a DL multiband filter on the DL amplification and filtering path, wherein the DL multiband filter is configured to filter signals on two or more non-spectrally adjacent bands.

Example 98 includes the repeater of Example 97, wherein the UL multiband filter or the DL multiband filter comprises a plurality of bandpass filters in a single package, wherein the plurality of bandpass filters are impedance matched to enable operation in the single package.

Example 99 includes the repeater of Example 98, wherein the UL multiband filter or the DL multiband filter is a dual-common port multi-bandpass filter.

Example 100 includes a repeater, comprising: an uplink (UL) inside antenna port; a downlink (DL) inside antenna port; a UL outside antenna port; a DL outside antenna port; a UL amplification and filtering path coupled between the UL inside antenna port and the UL outside antenna port, wherein the UL outside antenna port is configured to be coupled to an UL outside antenna; and a DL amplification and filtering path coupled between the DL inside antenna port and the DL outside antenna port, wherein the DL outside antenna port is configured to be coupled to a DL outside antenna that is separate from the UL outside antenna.

Example 101 includes the repeater of Example 100, further comprising: a receive diversity DL inside antenna port; and a receive diversity DL outside antenna port configured to be coupled to a receive diversity DL outside antenna to provide a receive diversity signal.

Example 102 includes the repeater of Example 101, wherein: the receive diversity DL outside antenna port is coupled to a receive diversity DL amplification and filtering path coupled between the receive diversity DL inside antenna port and the receive diversity DL outside antenna port.

Example 103 includes the repeater of Example 101, wherein the UL outside antenna port, the DL outside antenna port, or the receive diversity DL outside antenna port are configured to be coupled to one or more of an omnidirectional antenna or a directional antenna.

Example 104 includes the repeater of Example 100, wherein the UL outside antenna port is connected to a power amplifier without filtering between the power amplifier and the UL outside antenna port.

Example 105 includes the repeater of Example 100, wherein the UL outside antenna port is coupled to a power amplifier with low-order filtering coupled between the UL outside antenna port and the power amplifier to filter harmonics emitted by the power amplifier.

Example 106 includes the repeater of Example 100, wherein: the DL outside antenna port is connected to a low-noise amplifier without filtering between the low-noise amplifier and the DL outside antenna port; or the DL outside antenna port is coupled to a low-noise amplifier with a switchable filter between the low-noise amplifier and the DL outside antenna port.

Example 107 includes the repeater of Example 100, further comprising one or more of: a low-noise amplifier on the UL amplification and filtering path; a low-noise amplifier on the DL amplification and filtering path; a power amplifier on the UL amplification and filtering path; a power amplifier on the DL amplification and filtering path; a variable attenuator on the UL amplification and filtering path; a variable attenuator on the DL amplification and filtering path; a band-pass filter on the UL amplification and filtering path; or a band-pass filter on the DL amplification and filtering path.

Example 108 includes the repeater of Example 100, wherein the repeater is configured to amplify signals in up to six bands, wherein each band comprises a separate amplification and filtering path.

Example 109 includes the repeater of Example 108, wherein the up to six bands are selected from one or more of: Third Generation Partnership Project (3GPP) Long Term Evolution (LTE) frequency bands 1 through 85, 3GPP 5G frequency bands 1 through 86, or 3GPP 5G frequency bands 257 through 261.

Example 110 includes the repeater of Example 100, wherein the repeater is a Federal Communications Commission (FCC)-compatible consumer signal booster.

Example 111 includes the repeater of Example 100, wherein one or more of the UL amplification and filtering path or the DL amplification and filtering path is configured to switch between one or more of: the UL outside antenna port; or the DL outside antenna port.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A signal booster transceiver, comprising:
    a bi-directional device antenna port;
    an uplink (UL) node antenna port;
    a downlink (DL) node antenna port;
    a UL signal path coupled between the bi-directional device antenna port and the UL node antenna port, wherein the UL node antenna port is configured to be coupled to an UL node antenna; and
    a DL amplification and filtering path coupled between the bi-directional device antenna port and the DL node antenna port, wherein the DL node antenna port is configured to be coupled to a DL node antenna that is separate from the UL node antenna.

2. The signal booster transceiver of claim 1, further comprising:
    a receive diversity DL device antenna port; and
    a receive diversity DL node antenna port configured to be coupled to a receive diversity DL node antenna to provide a receive diversity signal.

3. The signal booster transceiver of claim 2, further comprising:
    a receive diversity DL multiband filter on a receive diversity DL amplification and filtering path coupled between the receive diversity DL device antenna port and the receive diversity DL node antenna port, wherein the receive diversity DL multiband filter is configured to filter signals on two or more non-spectrally adjacent bands.

4. The signal booster transceiver of claim 3, wherein the receive diversity DL multiband filter comprises a plurality of bandpass filters in a single package, wherein the plurality of bandpass filters are impedance matched to enable operation in the single package.

5. The signal booster transceiver of claim 4, wherein the receive diversity DL multiband filter is a dual-common port multi-bandpass filter.

6. The signal booster transceiver of claim 2, wherein one or more of the UL signal path or the DL amplification and filtering path or a receive diversity DL amplification and filtering path coupled between the receive diversity DL device antenna port and the receive diversity DL node antenna port is configured to switch between one or more of:
    the UL node antenna port;
    the DL node antenna port; or
    the receive diversity DL node antenna port.

7. The signal booster transceiver of claim 2, wherein:
    the receive diversity DL node antenna port is coupled to a receive diversity DL amplification and filtering path coupled between the receive diversity DL device antenna port and the receive diversity DL node antenna port.

8. The signal booster transceiver of claim 2, wherein the UL node antenna port, the DL node antenna port, or the receive diversity DL node antenna port are configured to be coupled to one or more of an omnidirectional antenna or a directional antenna.

9. The signal booster transceiver of claim 1, wherein the UL node antenna port is connected to a power amplifier without filtering between the power amplifier and the UL node antenna port.

10. The signal booster transceiver of claim 1, wherein the UL node antenna port is coupled to a power amplifier with low-order filtering coupled between the UL node antenna port and the power amplifier to filter harmonics emitted by the power amplifier.

11. The signal booster transceiver of claim 1, wherein:
    the DL node antenna port is connected to a low-noise amplifier without filtering between the low-noise amplifier and the DL node antenna port; or
    the DL node antenna port is coupled to a low-noise amplifier with a switchable filter between the low-noise amplifier and the DL node antenna port.

12. The signal booster transceiver of claim 1, further comprising one or more of:
    a low-noise amplifier on the UL signal path;
    a low-noise amplifier on the DL amplification and filtering path;
    a power amplifier on the UL signal path;
    a power amplifier on the DL amplification and filtering path;
    a variable attenuator on the UL signal path;
    a variable attenuator on the DL amplification and filtering path;
    a band-pass filter on the UL signal; or
    a band-pass filter on the DL amplification and filtering path.

13. The signal booster transceiver of claim 1, wherein the signal booster is configured to amplify signals in up to six bands, wherein each band comprises a separate amplification and filtering path.

14. The signal booster transceiver of claim 13, wherein the up to six bands are selected from one or more of: Third Generation Partnership Project (3GPP) Long Term Evolution (LTE) frequency bands 1 through 85, 3GPP 5G frequency bands 1 through 86, or 3GPP 5G frequency bands 257 through 261.

15. The signal booster transceiver of claim 1, wherein the signal booster is a Federal Communications Commission (FCC)-compatible consumer signal booster.

16. The signal booster transceiver of claim 1, wherein one or more of the UL signal path or the DL amplification and filtering path is configured to switch between one or more of:
    the UL node antenna port; or
    the DL node antenna port.

17. The signal booster transceiver of claim 1, further comprising one or more of:
    an UL multiband filter on the UL signal path, wherein the UL multiband filter is configured to filter signals on two or more non-spectrally adjacent bands; or a DL multiband filter on the DL amplification and filtering path, wherein the DL multiband filter is configured to filter signals on two or more non-spectrally adjacent bands.

18. The signal booster transceiver of claim 17, wherein the UL multiband filter or the DL multiband filter comprises a plurality of bandpass filters in a single package, wherein the plurality of bandpass filters are impedance matched to enable operation in the single package.

19. The signal booster transceiver of claim 18, wherein the UL multiband filter or the DL multiband filter is a dual-common port multi-bandpass filter.

20. The signal booster transceiver of claim 1, further comprising a multiplexer configured to:
couple the UL signal path to the bi-directional device antenna port; and
couple the DL amplification and filtering path to the bi-directional device antenna port.

21. The signal booster transceiver of claim 20, wherein the multiplexer is a diplexer, a duplexer, a multiplexer, a circulator, or a multi-common port multi-filter package.

22. A transceiver, comprising:
a signal amplifier that includes one or more amplification and filtering signal paths, wherein the one or more amplification and filtering signal paths are configured to amplify and filter signals;
a bi-directional server antenna port;
an uplink (UL) donor antenna port;
a downlink (DL) donor antenna port;
a UL signal path coupled between the bi-directional server antenna port and the UL donor antenna port, wherein the UL donor antenna port is configured to be coupled to an UL donor antenna; and
a DL amplification and filtering path coupled between the bi-directional server antenna port and the DL donor antenna port, wherein the DL donor antenna port is configured to be coupled to a DL donor antenna that is separate from the UL donor antenna.

23. The transceiver of claim 22, further comprising:
a receive diversity DL server antenna port; and
a receive diversity DL donor antenna port configured to be coupled to a receive diversity DL donor antenna to provide a receive diversity signal.

24. The transceiver of claim 23, wherein:
the receive diversity DL donor antenna port is coupled to a receive diversity DL amplification and filtering path coupled between the receive diversity DL server antenna port and the receive diversity DL donor antenna port.

25. The transceiver of claim 23, wherein the UL donor antenna port, the DL donor antenna port, or the receive diversity DL donor antenna port are configured to be coupled to one or more of an omnidirectional antenna or a directional antenna.

26. The transceiver of claim 22, wherein the UL donor antenna port is connected to a power amplifier without filtering between the power amplifier and the UL donor antenna port.

27. The transceiver of claim 22, wherein the UL donor antenna port is coupled to a power amplifier with low-order filtering coupled between the UL donor antenna port and the power amplifier to filter harmonics emitted by the power amplifier.

28. The transceiver of claim 22, wherein:
the DL donor antenna port is connected to a low-noise amplifier without filtering between the low-noise amplifier and the DL donor antenna port; or
the DL donor antenna port is coupled to a low-noise amplifier with a switchable filter between the low-noise amplifier and the DL donor antenna port.

29. The transceiver of claim 22, wherein the transceiver is configured to amplify signals in up to six bands, wherein each band comprises a separate amplification and filtering path, and wherein the up to six bands are selected from one or more of: Third Generation Partnership Project (3GPP) Long Term Evolution (LTE) frequency bands 1 through 85, 3GPP 5G frequency bands 1 through 86, or 3GPP 5G frequency bands 257 through 261.

30. The transceiver of claim 22, wherein one or more of the UL signal path or the DL amplification and filtering path is configured to switch between one or more of:
the UL donor antenna port; or
the DL donor antenna port.

* * * * *